United States Patent
Gao et al.

(10) Patent No.: US 10,831,823 B2
(45) Date of Patent: Nov. 10, 2020

(54) PHOTO DISTRIBUTION METHOD AND TERMINAL

(71) Applicant: Huawei Technologies Co., Ltd., Shenzhen (CN)

(72) Inventors: Wenmei Gao, Beijing (CN); Xiaojuan Li, Beijing (CN); Hao Jing, Shenzhen (CN); Yahui Wang, Beijing (CN); Shunan Fan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 848 days.

(21) Appl. No.: 15/597,385

(22) Filed: May 17, 2017

(65) Prior Publication Data
US 2017/0249341 A1    Aug. 31, 2017

Related U.S. Application Data

(63) Continuation of application No. PCT/CN2015/094584, filed on Nov. 13, 2015.

(30) Foreign Application Priority Data

Nov. 18, 2014 (CN) .......................... 2014 1 0658948

(51) Int. Cl.
*G06F 16/58* (2019.01)
*G06F 16/51* (2019.01)
(Continued)

(52) U.S. Cl.
CPC .......... *G06F 16/5866* (2019.01); *G06F 16/00* (2019.01); *G06F 16/51* (2019.01);
(Continued)

(58) Field of Classification Search
CPC .. G06F 16/51; G06F 16/5866; G06K 9/00221
See application file for complete search history.

(56) References Cited

U.S. PATENT DOCUMENTS

| | | | |
|---|---|---|---|
| 9,112,849 B1 * | 8/2015 | Werkelin Ahlin | ...... H04L 63/10 |
| 2004/0156535 A1 * | 8/2004 | Goldberg | ........... H04N 1/00172 |
| | | | 382/115 |

(Continued)

FOREIGN PATENT DOCUMENTS

| | | |
|---|---|---|
| CN | 102368746 A | 3/2012 |
| CN | 102982064 A | 3/2013 |

(Continued)

OTHER PUBLICATIONS

Mtibaa, Abderrahmen, et al., "Towards Computational Offloading in Mobile Device Clouds", 2013 IEEE International Conference on Cloud Computing Technology and Science, Dec. 2-5, 2013, pp. 331-338.

(Continued)

*Primary Examiner* — Charles E Lu
(74) *Attorney, Agent, or Firm* — Slater Matsil, LLP

(57) ABSTRACT

A photo distribution method and a terminal are disclosed. In an embodiment a method for distributing photos include obtaining, by a first terminal in a photo sharing group, user portrait information and address information of a second terminal in the photo sharing group, obtaining, by the first terminal, first index information created by a third terminal in the photo sharing group, segmenting, by the first terminal, the first index information to obtain second index information, and allocating the second index information to a fourth terminal in the photo sharing group and sending, by the first terminal, the user portrait information and the address information of the second terminal to the fourth terminal.

20 Claims, 21 Drawing Sheets

(51) Int. Cl.
  *G06F 16/583* (2019.01)
  *G06K 9/00* (2006.01)
  *G06F 16/00* (2019.01)
  *H04L 29/06* (2006.01)

(52) U.S. Cl.
  CPC ........ *G06F 16/583* (2019.01); *G06F 16/5854* (2019.01); *G06K 9/00221* (2013.01); *H04L 65/403* (2013.01)

(56) References Cited

U.S. PATENT DOCUMENTS

| | | | | |
|---|---|---|---|---|
| 2008/0281694 | A1* | 11/2008 | Kretz | G06Q 30/0267 705/14.64 |
| 2009/0094317 | A1* | 4/2009 | Venkitaraman | H04L 29/12311 709/203 |
| 2012/0046049 | A1* | 2/2012 | Curtis | H04W 4/025 455/456.3 |
| 2012/0066573 | A1* | 3/2012 | Berger | H04N 1/00196 715/202 |
| 2013/0166503 | A1* | 6/2013 | Chung | G06F 16/148 707/610 |
| 2013/0266193 | A1* | 10/2013 | Tiwari | G06F 16/5854 382/115 |
| 2014/0064572 | A1* | 3/2014 | Panzer | G06Q 10/10 382/115 |
| 2014/0181205 | A1* | 6/2014 | Sherrets | G06Q 50/01 709/204 |
| 2014/0223275 | A1* | 8/2014 | Lin | G06F 16/176 715/205 |
| 2015/0081791 | A1* | 3/2015 | Jacobs | G06F 16/583 709/204 |
| 2015/0163206 | A1* | 6/2015 | McCarthy | G06F 21/10 713/171 |
| 2016/0261669 | A1 | 9/2016 | Elliott | |

FOREIGN PATENT DOCUMENTS

| | | |
|---|---|---|
| CN | 103034714 A | 4/2013 |
| CN | 103635892 A | 3/2014 |
| CN | 103945001 A | 7/2014 |
| CN | 103945105 A | 7/2014 |

OTHER PUBLICATIONS

Nuaimi, K.A., et al., "A Survey of Load Balancing in Cloud Computing: Challenges and Algorithms", 2012 IEEE Second Symposium on Network Cloud Computing and Applications, XP032339562 Dec. 3, 2012, 6 pages.

* cited by examiner

PHOTO DISTRIBUTION METHOD AND TERMINAL

CROSS-REFERENCE TO RELATED APPLICATIONS

This application is a continuation of International Application No. PCT/CN2015/94584, filed on Nov. 13, 2015, which claims priority to Chinese Patent Application No. 201410658948.6, filed on Nov. 18, 2014. The disclosures of the aforementioned applications are hereby incorporated by reference in their entireties.

TECHNICAL FIELD

The present disclosure relates to the field of wireless communications technologies, and more specifically, to a photo distribution method and a terminal.

BACKGROUND

When friends or colleagues go traveling, they may take many photos by using intelligent terminals such as telephones or tablet computers. Then, when they need to obtain respective photos from all the photos, although there are many methods, for example, all photos are uploaded to a network disk, and they download the photos from the network disk, these methods are inconvenient, time- and labor-consuming, and are inefficient.

Currently, there are some methods to implement photo aggregation and sharing, and obtain photos of a terminal user. For example, the user may manually create an online sharing album on a network, and invite friends traveling together to join the album. Then, people may upload respectively taken photos to the sharing album, to implement aggregation and sharing of photos of a particular theme. Although this method implements aggregation and sharing of photos, too many steps need manual operation of the user. For example, after friends join the sharing album, they need to manually upload photos, and need to manually search for and obtain their own photos. Too many steps in a process from sharing and aggregation of photos to obtaining respective photos by terminal users need manual operation, which is not intelligent enough.

SUMMARY

Embodiments of the present disclosure provide a photo distribution method and a terminal, to intelligently distribute photos, which is convenient, fast, and efficient.

A first aspect of the embodiments of the present disclosure provides a photo distribution method, including obtaining, by a first terminal in a photo sharing group, user portrait information and address information of a second terminal in the sharing group, obtaining, by the first terminal, first index information that is created by a sharing terminal and that is of a to-be-shared photo, where the sharing terminal includes at least one of the first terminal or a third terminal in the sharing group, segmenting, by the first terminal, the first index information into N pieces of second index information, and respectively allocating the N pieces of second index information to N processing terminals, where the processing terminals include a fourth terminal in the sharing group or the fourth terminal and the first terminal, and N≥2 and sending, by the first terminal, the user portrait information and the address information of the second terminal to the processing terminals, so that the processing terminals perform facial recognition on the corresponding to-be-shared photo in the second index information according to the second index information and the user portrait information of the second terminal, to determine a photo matching the user portrait information of the second terminal and send the photo to the second terminal.

With reference to the first aspect of the embodiments of the present disclosure, in a first implementation manner of the first aspect of the embodiments of the present disclosure, before the obtaining, by a first terminal in a photo sharing group, user portrait information and address information of a second terminal in the sharing group, the method further includes creating, by the first terminal, the photo sharing group receiving, by the first terminal, a request that is sent by the second terminal and that is of joining the photo sharing group and returning, by the first terminal, a joining response message to the second terminal, where the response message includes address information of the first terminal.

With reference to the first implementation manner of the first aspect of the embodiments of the present disclosure, in a second implementation manner of the first aspect of the embodiments of the present disclosure, when the first terminal creates the photo sharing group, the first terminal establishes a Wi-Fi hotspot, so that after receiving the response message, the second terminal connects to the Wi-Fi hotspot.

With reference to the first aspect of the embodiments of the present disclosure, the first implementation manner of the first aspect, or the second implementation manner of the first aspect, in a third implementation manner of the first aspect of the embodiments of the present disclosure, the sharing terminal includes the first terminal and the obtaining, by the first terminal, first index information that is created by a sharing terminal and that is of a to-be-shared photo includes determining, by the first terminal, a directory of a to-be-shared photo of the first terminal, and creating third index information according to the photo directory, where the third index information includes photo information and the address information of the first terminal, and the photo information includes a quantity of the to-be-shared photos, an ID of each photo, and a path of each photo and obtaining, by the first terminal, the third index information.

With reference to the first aspect of the embodiments of the present disclosure to the third implementation manner of the first aspect, in a fourth implementation manner of the first aspect of the embodiments of the present disclosure, the sharing terminal includes the third terminal and the obtaining, by the first terminal, first index information that is created by a sharing terminal and that is of a to-be-shared photo includes obtaining, by the first terminal, fourth index information created by the third terminal in the sharing group, where the fourth index information includes photo information and address information of the third terminal, and the photo information includes a quantity of to-be-shared photos, an ID of each photo, and a path of each photo.

With reference to the third implementation manner of the first aspect of the embodiments of the present disclosure or the fourth implementation manner of the first aspect, in a fifth implementation manner of the first aspect of the embodiments of the present disclosure, the segmenting, by the first terminal, the first index information into N pieces of second index information, and respectively allocating the N pieces of second index information to N processing terminals includes segmenting, by the first terminal, the first index information into N pieces of second index information equally according to a quantity of photos, and respectively allocating the N pieces of second index information to the N processing terminals.

With reference to the third implementation manner of the first aspect of the embodiments of the present disclosure or the fourth implementation manner of the first aspect, in a sixth implementation manner of the first aspect of the embodiments of the present disclosure, the segmenting, by the first terminal, the first index information into N pieces of second index information, and respectively allocating the N pieces of second index information to N processing terminals includes separately receiving, by the first terminal, terminal processing capability information sent by the processing terminals and segmenting, by the first terminal, the first index information into N pieces of second index information equally according to a quantity of photos and the terminal processing capability information of the processing terminals, and respectively allocating the N pieces of second index information to the N processing terminals.

With reference to the first aspect of the embodiments of the present disclosure to the sixth implementation manner of the first aspect, in a seventh implementation manner of the first aspect of the embodiments of the present disclosure, the processing terminals include the first terminal and the fourth terminal and that the processing terminals perform facial recognition on the corresponding to-be-shared photo in the second index information according to the second index information and the user portrait information of the second terminal, to determine a photo matching the user portrait information of the second terminal and send the photo to the second terminal includes performing, by the first terminal, facial recognition on the corresponding to-be-shared photo in the second index information according to the second index information and the user portrait information of the second terminal, to determine the photo matching the user portrait information of the second terminal and sending, by the first terminal, the photo matching the user portrait information of the second terminal to the second terminal according to the address information of the second terminal.

With reference to the seventh implementation manner of the first aspect of the embodiments of the present disclosure, in an eighth implementation manner of the first aspect of the embodiments of the present disclosure, the performing, by the first terminal, facial recognition on the corresponding to-be-shared photo in the second index information according to the second index information and the user portrait information of the second terminal, to determine the photo matching the user portrait information of the second terminal includes obtaining, by the first terminal, a task photo copy from the sharing terminal according to the second index information and performing, by the first terminal, facial recognition on each task photo copy according to the user portrait information of the second terminal, to determine the photo matching the user portrait information of the second terminal.

With reference to the seventh implementation manner of the first aspect of the embodiments of the present disclosure or the eighth implementation manner of the first aspect, in a ninth implementation manner of the first aspect of the embodiments of the present disclosure, the method further includes sending, by the first terminal, a photo that does not match the user portrait information of the second terminal to the second terminal.

A second aspect of the embodiments of the present disclosure provides a photo distribution method, including: receiving, by a fourth terminal in a photo sharing group, second index information sent by a first terminal in the sharing group, where the second index information is a part of first index information of a to-be-shared photo, receiving, by the fourth terminal, user portrait information and address information of a second terminal that are sent by the first terminal, performing, by the fourth terminal, facial recognition on the corresponding photo in the second index information according to the second index information and the user portrait information of the second terminal, to determine a photo matching the user portrait information of the second terminal and sending, by the fourth terminal, the photo matching the user portrait information of the second terminal to the second terminal according to the address information of the second terminal.

With reference to the second aspect of the embodiments of the present disclosure, in a first implementation manner of the second aspect of the embodiments of the present disclosure, the performing, by the fourth terminal, facial recognition on the corresponding photo in the second index information according to the second index information and the user portrait information of the second terminal, to determine a photo matching the user portrait information of the second terminal includes obtaining, by the fourth terminal, a task photo copy from a sharing terminal according to the second index information and performing, by the fourth terminal, image matching analysis on each task photo copy according to the user portrait information of the second terminal, to determine the photo matching the user portrait information of the second terminal.

A third aspect of the embodiments of the present disclosure provides a photo distribution method, including: obtaining, by a first terminal in a photo sharing group, user portrait information and address information of a second terminal in the sharing group, performing, by the first terminal, image analysis on a to-be-shared photo of the first terminal according to the user portrait information of the second terminal, to determine a photo corresponding to the second terminal in the to-be-shared photo and sending, by the first terminal, the to-be-shared photo to the corresponding second terminal according to the address information of the second terminal.

With reference to the third aspect of the embodiments of the present disclosure, in a first implementation manner of the third aspect of the embodiments of the present disclosure, before the obtaining, by a first terminal in a photo sharing group, user portrait information and address information of a second terminal in the sharing group, the method further includes creating, by the first terminal, the photo sharing group, receiving, by the first terminal, a request that is sent by the second terminal and that is of joining the photo sharing group and returning, by the first terminal, a joining response message to the second terminal, where the response message includes address information of the first terminal.

With reference to the first implementation manner of the third aspect of the embodiments of the present disclosure, in a second implementation manner of the third aspect of the embodiments of the present disclosure, when the first terminal creates the photo sharing group, the first terminal establishes a Wi-Fi hotspot, so that after receiving the response message, the second terminal connects to the Wi-Fi hotspot.

With reference to the third aspect of the embodiments of the present disclosure to the second implementation manner of the third aspect, in a third implementation manner of the third aspect of the embodiments of the present disclosure, the performing, by the first terminal, image analysis on a to-be-shared photo of the first terminal according to the user portrait information of the second terminal, to determine a photo corresponding to the second terminal in the to-be-shared photo includes determining, by the first terminal, a directory of a to-be-shared photo of the first terminal, performing, by the first terminal, image analysis on each photo in the photo directory, to generate multiple photo sub-directories, placing photos having a same facial feature in one photo sub-directory, and generating one associated reference facial picture for each photo sub-directory, performing, by the first terminal according to the user portrait information of the second terminal, image matching analysis on the associated reference facial pictures corresponding to the photo sub-directories, and determining that a photo sub-directory matching the user portrait information of the second terminal is a photo sub-directory corresponding to the second terminal and the sending, by the first terminal, the to-be-shared photo to the corresponding second terminal according to the address information of the second terminal includes sending, by the first terminal, a photo in the photo sub-directory corresponding to the second terminal to the second terminal according to the address information of the second terminal.

With reference to the third aspect of the embodiments of the present disclosure to the second implementation manner of the third aspect, in a fourth implementation manner of the third aspect of the embodiments of the present disclosure, the performing, by the first terminal, image analysis on a to-be-shared photo of the first terminal according to the user portrait information of the second terminal, to determine a photo corresponding to the second terminal in the to-be-shared photo includes determining, by the first terminal, a directory of a to-be-shared photo of the first terminal and performing, by the first terminal, facial searching in the photo directory according to the user portrait information of the second terminal, and sequentially searching for a photo matching the user portrait information of the second terminal in the photo directory, to determine the photo corresponding to the second terminal in the photo directory.

With reference to the third aspect of the embodiments of the present disclosure to the second implementation manner of the third aspect, in a fifth implementation manner of the third aspect of the embodiments of the present disclosure, the performing, by the first terminal, image analysis on a to-be-shared photo of the first terminal according to the user portrait information of the second terminal, to determine a photo corresponding to the second terminal in the to-be-shared photo includes creating, by the first terminal, a photo directory corresponding to the second terminal, obtaining, by the first terminal, a group of a photo taken by the first terminal and performing, by the first terminal, image matching analysis on the photo in the photo group according to the user portrait information of the second terminal, sequentially determining whether the photo in the photo group matches the user portrait information corresponding to the second terminal, and if yes, placing the photo matching the user portrait information corresponding to the second terminal in the photo group, in the photo directory corresponding to the second terminal, and the sending, by the first terminal, the to-be-shared photo to the corresponding second terminal according to the address information of the second terminal includes sending, by the first terminal, the photo in the photo directory corresponding to the second terminal to the second terminal according to the address information of the second terminal.

With reference to the third aspect of the embodiments of the present disclosure to the second implementation manner of the third aspect, in a sixth implementation manner of the third aspect of the embodiments of the present disclosure, the performing, by the first terminal, image analysis on a to-be-shared photo of the first terminal according to the user portrait information of the second terminal, to determine a photo corresponding to the second terminal in the to-be-shared photo includes obtaining, by the first terminal, a photo taken by the first terminal and performing, by the first terminal, image matching analysis on the taken photo according to the user portrait information of the second terminal, determining whether the taken photo matches the user portrait information of the second terminal, and if yes, determining that the taken photo is a photo corresponding to the second terminal, and the sending, by the first terminal, the to-be-shared photo to the corresponding second terminal according to the address information of the second terminal includes when the taken photo matches the user portrait information of the second terminal, sending, by the first terminal, the taken photo to the corresponding second terminal according to the address information of the second terminal.

With reference to the third implementation manner of the third aspect of the embodiments of the present disclosure to the sixth implementation manner of the third aspect, in a seventh implementation manner of the third aspect of the embodiments of the present disclosure, the method further includes receiving, by the first terminal, a request that is sent by a fourth terminal and that is of obtaining the user portrait information and the address information of the second terminal, sending, by the first terminal, the user portrait information and the address information of the second terminal to the fourth terminal and receiving, by the first terminal, a photo sent by the fourth terminal.

With reference to the third aspect of the embodiments of the present disclosure to the seventh implementation manner of the third aspect, in an eighth implementation manner of the third aspect of the embodiments of the present disclosure, the method further includes sending, by the first terminal, a photo that does not correspond to the second terminal in the to-be-shared photo to the second terminal.

A fourth aspect of the embodiments of the present disclosure provides a photo distribution method, including obtaining, by a first terminal in a photo sharing group, address information of a second terminal in the sharing group, determining, by the first terminal, a directory of a to-be-shared photo of the first terminal, performing, by the first terminal, image analysis on each photo in the photo directory, to generate multiple photo sub-directories, placing photos having a same facial feature in one photo sub-directory, and generating one associated reference facial picture for each photo sub-directory, sending, by the first terminal, the associated reference facial pictures to the second terminal, so that the second terminal selects an associated reference facial picture corresponding to the second terminal, and returns associated reference facial picture selection information to the first terminal, receiving, by the first terminal, the associated reference facial picture selection information returned by the second terminal, determining, by the first terminal according to the associated reference facial picture selection information, a photo sub-directory corresponding to the second terminal and sending, by the first terminal, a photo in the photo sub-directory corresponding to the second terminal to the second terminal.

With reference to the fourth aspect of the embodiments of the present disclosure, in a first implementation manner of the fourth aspect of the embodiments of the present disclosure, before the obtaining, by a first terminal in a photo sharing group, address information of a second terminal in the sharing group, the method further includes creating, by the first terminal, the photo sharing group, receiving, by the first terminal, a request that is sent by the second terminal and that is of joining the photo sharing group and returning, by the first terminal, a joining response message to the second terminal, where the response message includes address information of the first terminal.

With reference to the first implementation manner of the fourth aspect of the embodiments of the present disclosure, in a second implementation manner of the fourth aspect of the embodiments of the present disclosure, when the first terminal creates the photo sharing group, the first terminal establishes a Wi-Fi hotspot, so that after receiving the response message, the second terminal connects to the Wi-Fi hotspot.

With reference to the fourth aspect of the embodiments of the present disclosure to the second implementation manner of the fourth aspect, in a third implementation manner of the fourth aspect of the embodiments of the present disclosure, the method further includes receiving, by the first terminal, associated reference facial pictures sent by a third terminal selecting, by the first terminal, an associated reference facial picture corresponding to the first terminal, and returning associated reference facial picture selection information to the third terminal; and receiving, by the first terminal, a photo sent by the third terminal.

With reference to the fourth aspect of the embodiments of the present disclosure to the third implementation manner of the fourth aspect, in a fourth implementation manner of the fourth aspect of the embodiments of the present disclosure, the method further includes: sending, by the first terminal, a photo that does not correspond to the second terminal in the to-be-shared photo to the second terminal.

A fifth aspect of the embodiments of the present disclosure provides a photo distribution method, including creating, by a first terminal, a connection to a second terminal, taking, by the first terminal, a photo of a user of the second terminal, and obtaining user portrait information of the second terminal, determining, by the first terminal, a directory of a to-be-shared photo of the first terminal, performing, by the first terminal, facial searching in the photo directory according to the user portrait information of the second terminal, and sequentially searching for a photo matching the user portrait information of the second terminal in the photo directory, to determine a photo corresponding to the second terminal in the photo directory, and sending, by the first terminal, the photo corresponding to the second terminal to the second terminal.

With reference to the fifth aspect of the embodiments of the present disclosure, in a first implementation manner of the fifth aspect of the embodiments of the present disclosure, the creating, by a first terminal, a connection to a second terminal includes: creating, by the first terminal, a Wi-Fi connection or a Bluetooth connection by means of NFC touching.

With reference to the fifth aspect of the embodiments of the present disclosure, in a second implementation manner of the fifth aspect of the embodiments of the present disclosure, the creating, by a first terminal, a connection to a second terminal includes: creating, by the first terminal, a Wi-Fi connection or a Bluetooth connection by means of an acoustic wave.

With reference to the fifth aspect of the embodiments of the present disclosure to the second implementation manner of the fifth aspect, in a third implementation manner of the fifth aspect of the embodiments of the present disclosure, the method further includes: sending, by the first terminal, a photo that does not correspond to the second terminal in the to-be-shared photo to the second terminal.

A sixth aspect of the embodiments of the present disclosure provides a terminal, including a first obtaining unit, configured to obtain user portrait information and address information of a second terminal in a same photo sharing group of the terminal, a second obtaining unit, configured to obtain first index information that is created by a sharing terminal and that is of a to-be-shared photo, where the sharing terminal includes at least one of the terminal or a third terminal in the sharing group, an allocation unit, configured to: segment the first index information obtained by the second obtaining unit into N pieces of second index information, and respectively allocate the N pieces of second index information to N processing terminals, where the processing terminals include a fourth terminal in the sharing group or the fourth terminal and the first terminal, and N≥2 and a sending unit, configured to send the user portrait information and the address information of the second terminal that are obtained by the first obtaining unit to the processing terminals, so that the processing terminals perform facial recognition on the corresponding to-be-shared photo in the second index information according to the second index information and the user portrait information of the second terminal, to determine a photo matching the user portrait information of the second terminal and send the photo to the second terminal.

With reference to the sixth aspect of the embodiments of the present disclosure, in a first implementation manner of the sixth aspect of the embodiments of the present disclosure, the terminal further includes a creating unit, configured to: before the first obtaining unit obtains the user portrait information and the address information of the second terminal in the sharing group, create the photo sharing group and a receiving unit, configured to receive a request that is sent by the second terminal and that is of joining the photo sharing group, where the sending unit is further configured to return a joining response message to the second terminal, where the response message includes address information of the first terminal.

With reference to the first implementation manner of the sixth aspect of the embodiments of the present disclosure, in a second implementation manner of the sixth aspect of the embodiments of the present disclosure, the terminal further includes an establishment unit, configured to: when the creating unit creates the photo sharing group, establish a Wi-Fi hotspot, so that after receiving the response message, the second terminal connects to the Wi-Fi hotspot.

With reference to the sixth aspect of the embodiments of the present disclosure to the second implementation manner of the sixth aspect, in a third implementation manner of the sixth aspect of the embodiments of the present disclosure, the second obtaining unit is specifically configured to: when the sharing terminal includes the terminal, determine a directory of a to-be-shared photo of the terminal, create third index information according to the photo directory, and obtain the third index information, where the third index information includes photo information and address information of the first terminal, and the photo information includes a quantity of the to-shared-photos, an ID of each photo, and a path of each photo.

With reference to the sixth aspect of the embodiments of the present disclosure to the third implementation manner of the sixth aspect, in a fourth implementation manner of the sixth aspect of the embodiments of the present disclosure, the second obtaining unit is specifically configured to obtain fourth index information created by the third terminal in the sharing group, where the fourth index information includes photo information and address information of the third terminal, and the photo information includes a quantity of to-be-shared photos, an ID of each photo, and a path of each photo.

With reference to the third implementation manner of the sixth aspect of the embodiments of the present disclosure or the fourth implementation manner of the sixth aspect, in a fifth implementation manner of the sixth aspect of the embodiments of the present disclosure, the allocation unit is specifically configured to segment the first index information into N pieces of second index information equally according to the quantity of the to-be-shared photos, and respectively allocate the N pieces of second index information to N processing terminals.

With reference to the third implementation manner of the sixth aspect of the embodiments of the present disclosure or the fourth implementation manner of the sixth aspect, in a sixth implementation manner of the sixth aspect of the embodiments of the present disclosure, the allocation unit is specifically configured to respectively receive terminal processing capability information sent by the processing terminals, segment the first index information into N pieces of second index information according to the quantity of photos and the terminal processing capability information of the N processing terminals, and respectively allocate the N pieces of second index information to the N processing terminals.

With reference to the sixth aspect of the embodiments of the present disclosure to the sixth implementation manner of the sixth aspect, in a seventh implementation manner of the sixth aspect of the embodiments of the present disclosure, the terminal further includes a determining unit, configured to: when the processing terminals include the terminal and the fourth terminal, perform facial recognition on the corresponding photo in the second index information according to the second index information and the user portrait information of the second terminal, to determine the photo matching the user portrait information of the second terminal, where the sending unit is further configured to send the photo matching the user portrait information of the second terminal to the second terminal according to the address information of the second terminal.

With reference to the seventh implementation manner of the sixth aspect of the embodiments of the present disclosure, in an eighth implementation manner of the sixth aspect of the embodiments of the present disclosure, the determining unit is specifically configured to obtain a task photo copy from the sharing terminal according to the second index information, and perform facial recognition on each task photo copy according to the user portrait information of the second terminal, to determine the photo matching the user portrait information of the second terminal.

With reference to the seventh implementation manner of the sixth aspect of the embodiments of the present disclosure or the eighth implementation manner of the sixth aspect, in a ninth implementation manner of the sixth aspect of the embodiments of the present disclosure, the sending unit is further send a photo that does not match the user portrait information of the second terminal to the second terminal.

A seventh aspect of the embodiments of the present disclosure provides a terminal, including a receiving unit, configured to receive second index information sent by a first terminal in a same photo sharing group of the terminal, where the second index information is a part of a first index of a to-be-shared photo, where the receiving unit is further configured to receive user portrait information and address information of a second terminal that are sent by the first terminal; a determining unit, configured to perform facial recognition on the corresponding to-be-shared photo in the second index information according to the second index information and the user portrait information of the second terminal that are received by the receiving unit, to determine a photo matching the user portrait information of the second terminal; and a sending unit, configured to send the photo matching the user portrait information of the second terminal to the second terminal according to the address information of the second terminal.

With reference to the seventh aspect of the embodiments of the present disclosure, in a first implementation manner of the seventh aspect of the embodiments of the present disclosure, the determining unit is specifically configured to obtain a task photo copy from the sharing terminal according to the second index information, and perform facial recognition on each task photo copy according to the user portrait information of the second terminal, to determine the photo matching the user portrait information of the second terminal.

An eighth aspect of the embodiments of the present disclosure provides a terminal, including an obtaining unit, configured to obtain user portrait information and address information of a second terminal in a same photo sharing group of the terminal; a determining unit, configured to perform image analysis on a to-be-shared photo of the terminal according to the user portrait information of the second terminal, to determine a photo corresponding to the second terminal in the to-be-shared photo; and a sending unit, configured to send the to-be-shared photo to the corresponding second terminal according to the address information of the second terminal.

With reference to the eighth aspect of the embodiments of the present disclosure, in a first implementation manner of the eighth aspect of the embodiments of the present disclosure, the terminal further includes: a creating unit, configured to: before the terminal in the photo sharing group obtains the user portrait information and the address information of the second terminal in the sharing group, create the photo sharing group; and a receiving unit, configured to receive a request that is sent by the second terminal and that is of joining the photo sharing group; and the sending unit is further configured to return a joining response message to the second terminal, where the response message includes address information of the terminal.

With reference to the first implementation manner of the eighth aspect of the embodiments of the present disclosure, in a second implementation manner of the eighth aspect of the embodiments of the present disclosure, the terminal further includes an establishment unit, configured to: when the terminal creates the photo sharing group, establish a Wi-Fi hotspot, so that after receiving the response message, the second terminal connects to the Wi-Fi hotspot.

With reference to the eighth aspect of the embodiments of the present disclosure to the second implementation manner of the eighth aspect, in a third implementation manner of the eighth aspect of the embodiments of the present disclosure, the determining unit is specifically configured to determine a directory of a to-be-shared photo of the terminal, perform image analysis on each photo in the photo directory to generate multiple photo sub-directories, place photos having a same facial feature in one photo sub-directory, generate one associated reference facial picture for each photo sub-directory, perform, according to the user portrait information of the second terminal, image matching analysis on the associated reference facial pictures corresponding to the photo sub-directories, and determine that a photo sub-directory matching the user portrait information of the second terminal is a photo sub-directory corresponding to the second terminal and the sending unit is specifically configured to send a photo in the photo sub-directory corresponding to the second terminal to the second terminal according to the address information of the second terminal.

With reference to the eighth aspect of the embodiments of the present disclosure to the second implementation manner of the eighth aspect, in a fourth implementation manner of the eighth aspect of the embodiments of the present disclosure, the determining unit is specifically configured to: determine a directory of a to-be-shared photo of the terminal; perform facial searching in the photo directory according to the user portrait information of the second terminal; and sequentially search for a photo matching the user portrait information of the second terminal in the photo directory, to determine a photo corresponding to the second terminal in the photo directory.

With reference to the eighth aspect of the embodiments of the present disclosure to the second implementation manner of the eighth aspect, in a fifth implementation manner of the eighth aspect of the embodiments of the present disclosure, the determining unit is specifically configured to: create a photo directory corresponding to the second terminal; obtain a group of a photo taken by the terminal; perform image matching analysis on the photo in the photo group according to the user portrait information of the second terminal; sequentially determine whether the photo in the photo group matches the user portrait information corresponding to the second terminal; and if yes, place the photo matching the user portrait information corresponding to the second terminal in the photo group in the photo directory corresponding to the second terminal and the sending unit is specifically configured to send the photo in the photo directory corresponding to the second terminal to the second terminal according to the address information of the second terminal.

With reference to the eighth aspect of the embodiments of the present disclosure to the second implementation manner of the eighth aspect, in a sixth implementation manner of the eighth aspect of the embodiments of the present disclosure, the determining unit is specifically configured to: obtain a photo taken by the first terminal; perform image matching analysis on the taken photo according to the user portrait information of the second terminal; determine whether the taken photo matches the user portrait information of the second terminal; and if yes, determine that the taken photo is a photo corresponding to the second terminal and the sending unit is specifically configured to: when the taken photo matches the user portrait information of the second terminal, send the taken photo to the corresponding second terminal according to the address information of the second terminal.

With reference to the third implementation manner of the eighth aspect of the embodiments of the present disclosure to the sixth implementation manner of the eighth aspect, in a seventh implementation manner of the eighth aspect of the embodiments of the present disclosure, the receiving unit is further configured to receive a request that is sent by a fourth terminal and that is of obtaining the user portrait information and the address information of the second terminal; the sending unit is further configured to send the user portrait information and the address information of the second terminal to the fourth terminal; and the receiving unit is further configured to receive a photo sent by the fourth terminal.

With reference to the eighth aspect of the embodiments of the present disclosure to the seventh implementation manner of the eighth aspect, in an eighth implementation manner of the eighth aspect of the embodiments of the present disclosure, the sending unit is further configured to send a photo that does not correspond to the second terminal in the to-be-shared photo to the second terminal.

A ninth aspect of the embodiments of the present disclosure provides a terminal, including an obtaining unit, configured to obtain address information of a second terminal in a same photo sharing group of the terminal; a first determining unit, configured to determine a directory of a to-be-shared photo of the terminal; a generation unit, configured to: perform image analysis on each photo in the photo directory, to generate multiple photo sub-directories, place photos having a same facial feature in one photo sub-directory, and generate one associated reference facial picture for each photo sub-directory; a sending unit, configured to send the associated reference facial pictures to the second terminal, so that the second terminal selects an associated reference facial picture corresponding to the second terminal, and returns associated reference facial picture selection information to the first terminal; a receiving unit, configured to receive the associated reference facial picture selection information returned by the second terminal; and a second determining unit, configured to determine, according to the associated reference facial picture selection information, a photo sub-directory corresponding to the second terminal, where the sending unit is further configured to send a photo in the photo sub-directory corresponding to the second terminal to the second terminal.

With reference to the ninth aspect of the embodiments of the present disclosure, in a first implementation manner of the ninth aspect of the embodiments of the present disclosure, the terminal further includes a creating unit, configured to create the photo sharing group, where the receiving unit is further configured to receive a request that is sent by the second terminal and that is of joining the photo sharing group; and the sending unit is further configured to return a joining response message to the second terminal, where the response message includes address information of the first terminal.

With reference to the first implementation manner of the ninth aspect of the embodiments of the present disclosure, in a second implementation manner of the ninth aspect of the embodiments of the present disclosure, the terminal further includes an establishment unit, configured to: when the creating unit creates the photo sharing group, establish a Wi-Fi hotspot, so that after receiving the response message, the second terminal connects to the Wi-Fi hotspot.

With reference to the ninth aspect of the embodiments of the present disclosure to the second implementation manner of the ninth aspect, in a third implementation manner of the ninth aspect of the embodiments of the present disclosure, the receiving unit is further configured to receive associated reference facial pictures sent by a third terminal; the sending unit is further configured to: select an associated reference facial picture corresponding to the terminal, and return associated reference facial picture selection information to the third terminal; and the receiving unit is further configured to receive a photo sent by the third terminal.

With reference to the ninth aspect of the embodiments of the present disclosure to the third implementation manner of the ninth aspect, in a fourth implementation manner of the ninth aspect of the embodiments of the present disclosure, the sending unit is further configured to send a photo that does not correspond to the second terminal in the to-be-shared photo to the second terminal.

A tenth aspect of the embodiments of the present disclosure provides a terminal, including an establishment unit, configured to create a connection to a second terminal; an obtaining unit, configured to take a photo of a user of the second terminal and obtain user portrait information of the second terminal; a first determining unit, configured to determine a directory of a to-be-shared photo of the terminal; a second determining unit, configured to perform facial searching in the photo directory according to the user portrait information of the second terminal, and sequentially search for a photo matching the user portrait information of the second terminal in the photo directory, to determine a photo corresponding to the second terminal in the photo directory; and a sending unit, configured to send a photo corresponding to the second terminal to the second terminal.

With reference to the tenth aspect of the embodiments of the present disclosure, in a first implementation manner of the tenth aspect of the embodiments of the present disclosure, the establishment unit is specifically configured to establish a Wi-Fi connection or a Bluetooth connection by means of NFC touching.

With reference to the tenth aspect of the embodiments of the present disclosure, in a second implementation manner of the tenth aspect of the embodiments of the present disclosure, the establishment unit is specifically configured to establish a Wi-Fi connection or a Bluetooth connection by means of an acoustic wave.

With reference to the tenth aspect of the embodiments of the present disclosure to the second implementation manner of the tenth aspect, in a third implementation manner of the tenth aspect of the embodiments of the present disclosure, the sending unit is further configured to send a photo that does not correspond to the second terminal in the to-be-shared photo to the second terminal.

It can be seen from the foregoing technical solutions that, the embodiments of the present disclosure have the following advantages:

In the embodiments of the present disclosure, a terminal in a photo sharing group performs image analysis on a to-be-shared photo of each terminal, determines a terminal corresponding to the to-be-shared photo, and delivers the photo to the corresponding terminal. Because a terminal joining a photo sharing group may automatically perform image analysis on a photo needing to be shared in the sharing group, and intelligently distribute the photo to a corresponding terminal, each terminal can obtain a photo required by the terminal, so that photos can be intelligently distributed, which is convenient, fast, and efficient.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments of the present disclosure provide a photo distribution method and a terminal, to intelligently distribute photos, which is convenient, fast, and efficient.

To make persons skilled in the art understand the technical solutions in the present disclosure better, the following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first", "second", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
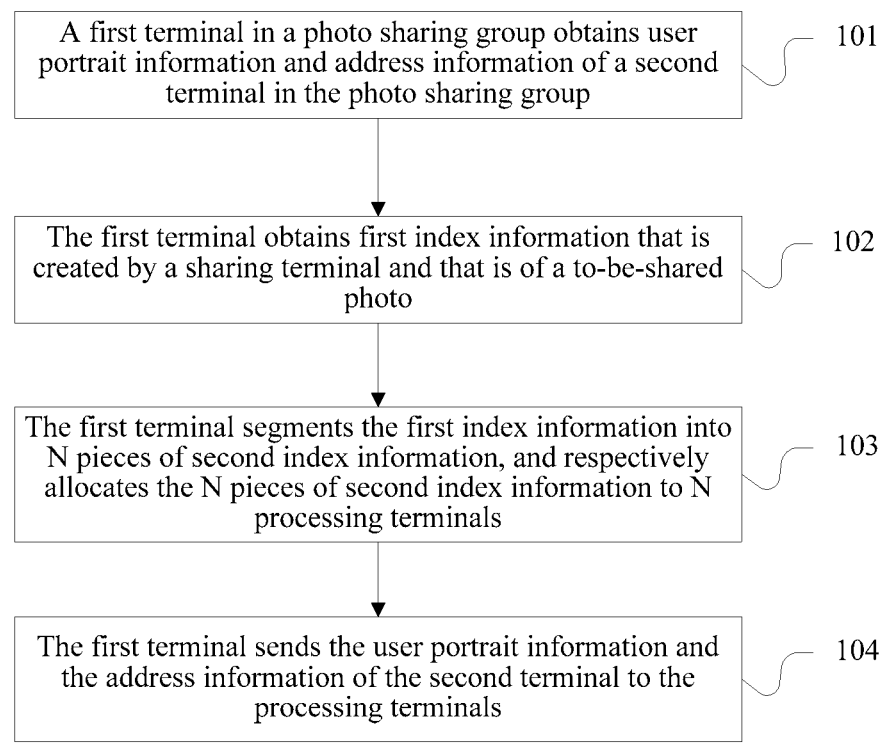
FIG. 1 is a schematic diagram of an embodiment of a photo distribution method according to an embodiment of the present disclosure.

Referring to FIG. 1, an embodiment of a photo distribution method according to an embodiment of the present disclosure includes:

101: A first terminal in a photo sharing group obtains user portrait information and address information of a second terminal in the photo sharing group.

When friends or colleagues go traveling, they separately take many photos by using terminals. If their terminals all join a same photo sharing group, the terminals joining the photo sharing group can send information to and receive information from each other, and the first terminal in the photo sharing group can obtain the user portrait information and the address information of the second terminal in the sharing group.

A manner of obtaining, by the first terminal, the user portrait information and the address information of the second terminal in the photo sharing group may be: The second terminal directly sends the user portrait information and the address information of the second terminal to the first terminal; or the first terminal sends a request of obtaining the user portrait information and the address information of the second terminal to the second terminal, and the second terminal sends the user portrait information and the address information of the second terminal to the first terminal, which is not specifically limited herein.

102: The first terminal obtains first index information that is created by a sharing terminal and that is of a to-be-shared photo.

The sharing terminal includes at least one of the first terminal or a third terminal in the sharing group, and the third terminal may be one or more terminals in the photo sharing group, which is not specifically limited herein.

The sharing terminal needing to share a photo in the photo sharing group creates the first index information according to the to-be-shared photo. The first terminal may obtain the first index information created by the sharing terminal in the photo sharing group, where the first index information may include photo information and address information of the terminal creating the index information, and the photo information may include a quantity of the photos, an ID of each photo, a path of each photo, and the like, which is not specifically limited herein.

103: The first terminal segments the first index information into N pieces of second index information, and respectively allocates the N pieces of second index information to N processing terminals.

After obtaining the first index information, the first terminal segments the first index information to obtain N pieces of second index information, and allocates the second index information to the N processing terminals in the photo sharing group, where the processing terminals include a fourth terminal in the sharing group, or the fourth terminal and the first terminal, and N≥2.

104: The first terminal sends the user portrait information and the address information of the second terminal to the processing terminals.

The first terminal sends the user portrait information and the address information of the second terminal to the processing terminals, so that the processing terminals may perform facial recognition on the corresponding photo in the second index information according to the allocated second index information and the user portrait information of the second terminal, to determine a photo matching the user portrait information of the second terminal, and send the photo to the second terminal. When there is only one second terminal, the processing terminals determine a photo matching user portrait information of the second terminal and send the photo to the second terminal; and when there are multiple second terminals, the processing terminals determine a photo matching user portrait information of each second terminal and send the photo to the corresponding terminal.

In this embodiment, a terminal in a photo sharing group performs image analysis on a to-be-shared photo of each terminal, determines a terminal corresponding to the to-be-shared photo, and delivers the photo to the corresponding terminal. Because a terminal joining a photo sharing group may perform facial recognition on the corresponding photo in second index information, and intelligently distribute the photo to a corresponding terminal, each terminal may obtain a photo required by the terminal, so that photos can be intelligently distributed, which is convenient, fast, and efficient.

Figure 2:
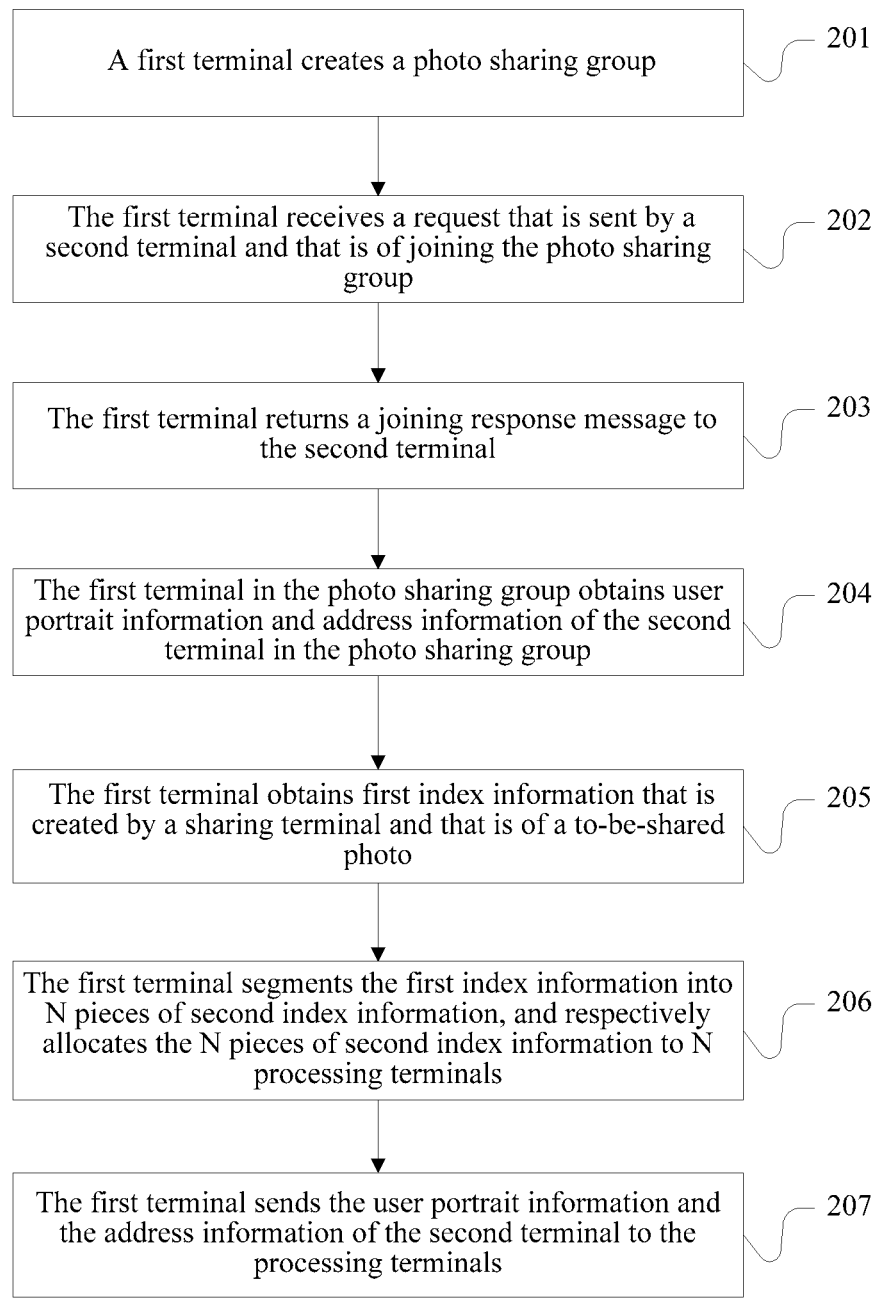
FIG. 2 is a schematic diagram of another embodiment of a photo distribution method according to an embodiment of the present disclosure.

In the embodiment shown in FIG. 1, before a first terminal in a photo sharing group obtains user portrait information and address information of a second terminal in a sharing group, the first terminal may create the photo sharing group, and another terminal needing to share a photo joins the photo sharing group. The following gives a description by using a specific embodiment. Referring to FIG. 2, another embodiment of a photo distribution method according to an embodiment of the present disclosure includes:

201: A first terminal creates a photo sharing group.

The first terminal may be a terminal of any one of people going traveling. The first terminal creates the photo sharing group. Distinguishing information such as a name or a group avatar may be set for the photo sharing group. The photo sharing group may be presented on a network according to location information of the first terminal, so that another terminal obtains the photo sharing group by means of searching on the network or by searching for a nearby photo sharing group, which is not specifically limited herein.

In this embodiment, when creating the photo sharing group, the first terminal may further establish a Wi-Fi hotspot, so that after joining the photo sharing group, another terminal connects to the Wi-Fi hotspot, to form a local area network.

It should be noted that, when creating the photo sharing group, the first terminal creates a temporary buffer at the same time, to save information in the photo sharing group, for example, user portrait information and IP address information of a terminal in the photo sharing group, which is not limited herein.

202: The first terminal receives a request that is sent by a second terminal and that is of joining the photo sharing group.

After the first terminal creates the photo sharing group, another terminal needing to share a photo or the second terminal needing to obtain a photo sends a request of joining the photo sharing group to the first terminal. A manner of sending, by the second terminal, the request may be: The second terminal scans a two-dimensional barcode, generated by the first terminal, of the photo sharing group, and after scanning the two-dimensional barcode, the second terminal sends the request of joining the photo sharing group to the first terminal; or in an actual application, the second terminal obtains the photo sharing group by means of searching on the network according to information such as the name or the group avatar of the photo sharing group, and clicks to join the photo sharing group, that is, the second terminal sends the request of joining the photo sharing group to the first terminal; or the second terminal searches for a nearby photo sharing group according to a positioning apparatus in the terminal, and after finding the photo group, clicks to join the photo sharing group, that is, the second terminal sends the request of joining the photo sharing group to the first terminal. A specific manner of sending, by the second terminal, the request of joining the photo sharing group to the first terminal is not specifically limited.

It should be noted that, the second terminal may be one or more terminals in the photo sharing group, which is not specifically limited herein.

203: The first terminal returns a joining response message to the second terminal.

After receiving the request that is sent by the second terminal and that is of joining the photo sharing group, the first terminal returns the joining response message to the second terminal, where the response message includes address information of the first terminal. In this case, it indicates that the first terminal already agrees that the second terminal joins the photo sharing group. In an actual application, to avoid that an irrelevant terminal joins the photo sharing group, the response message may be joining rejection information. The first terminal judges the received request of joining the photo sharing group, to determine whether the second terminal is a terminal sharing a photo; if yes, the first terminal returns a joining agreement response message; and if not, the first terminal returns a joining rejection response message, which is not limed herein. If there are multiple second terminals, the first terminal separately sends the response message including the address information of the first terminal to the multiple second terminals.

If the first terminal establishes a Wi-Fi hotspot when creating the photo sharing group in step 201, after receiving the response message sent by the first terminal, the second terminal may connect to the Wi-Fi hotspot, to form a local area network with the first terminal.

It should be noted that, step 201 to step 203 describe a process in which the first terminal creates the photo sharing group and each terminal joins the photo group. The photo sharing group may be created by another terminal, and the first terminal sends a request of joining the photo sharing group to the terminal creating the photo sharing group. After receiving the request, the terminal creating the photo sharing group returns a joining response message, and the first terminal joins the photo sharing group. Manners of sending the request and returning the joining response are similar to step 202 and step 203, and details are not described herein again.

204: The first terminal in the photo sharing group obtains user portrait information and address information of the second terminal in the photo sharing group.

The first terminal in the photo sharing group can obtain the user portrait information and the address information of the second terminal in the sharing group. A manner of obtaining, by the first terminal, the user portrait information and the address information of the second terminal in the photo sharing group may be: After joining the photo sharing group, the second terminal directly sends the user portrait information and the address information of the second terminal to the first terminal; or after the second terminal joins the photo sharing group, the first terminal sends a request of obtaining the user portrait information and the address information of the second terminal to the second terminal, and the second terminal sends the user portrait information and the address information of the second terminal to the first terminal, which is not specifically limited herein.

The user portrait information of the second terminal may be a photo including a facial image of a user, where the photo of the facial image of the user may be an avatar that is set by the user in the photo sharing group by using a terminal. When the photo of the facial image of the user is an avatar that is set by the user in the photo sharing group by using the terminal, the first terminal may prompt the second terminal to set a user avatar including the facial image, and after the second terminal completes the setting, the first terminal directly obtains the user avatar including the facial image.

In an actual application, the portrait information of the second terminal may be a facial image, taken by the second terminal, of the user, and the taken facial image is sent to the first terminal, which is not specifically limited herein.

In this embodiment, if the first terminal creates a temporary buffer when creating the photo sharing group, the first terminal may save, into the temporary buffer, the user portrait information and the address information of the second terminal in the photo sharing group that are obtained by the first terminal; if the first terminal does not create a temporary buffer when creating the photo sharing group, the first terminal may create a temporary buffer at this time, and save, into the temporary buffer, the user portrait information and the address information of the second terminal in the photo sharing group that are obtained by the first terminal. In an actual application, it is feasible that the first terminal does not create a temporary buffer, which is not specifically limited herein.

In this embodiment, the address information may be IP address information or MAC address information, which is not limited herein.

205: The first terminal obtains first index information that is created by a sharing terminal and that is of a to-be-shared photo.

The sharing terminal includes at least one of the first terminal or a third terminal in the sharing group. The sharing terminal needing to share a photo in the photo sharing group creates the first index information according to the to-be-shared photo. The first terminal may obtain the first index information created by the sharing terminal in the photo sharing group.

It should be noted that, the third terminal may be one or more terminals in the photo sharing group, which is not specifically limited herein.

206: The first terminal segments the first index information into N pieces of second index information, and respectively allocates the N pieces of second index information to N processing terminals.

After obtaining the first index information, the first terminal segments the first index information to obtain N pieces of second index information, and allocates the second index information to the N processing terminals in the photo sharing group, where the processing terminals include a fourth terminal in the sharing group, or the fourth terminal and the first terminal, and N≥2.

In this embodiment, the second index information may include photo information and address information of the sharing terminal, and the photo information includes a quantity of photos, an ID of each photo, and a path of each photo.

It should be noted that, the fourth terminal may be one or more terminals in the photo sharing group, which is not specifically limited herein.

207: The first terminal sends the user portrait information and the address information of the second terminal to the processing terminals.

The first terminal sends the user portrait information and the address information of the second terminal to the processing terminals, so that the processing terminals perform facial recognition on the corresponding photo in the second index information according to the allocated second index information and the user portrait information of the second terminal, to determine a photo matching the user portrait information of the second terminal, and send the photo to the second terminal. When there is only one second terminal, the processing terminals determine a photo matching user portrait information of the second terminal and send the photo to the second terminal; and when there are multiple second terminals, the processing terminals determine a photo matching user portrait information of each second terminal and send the photo to the corresponding terminal. For example, when the second terminals include a terminal A, a terminal B, and a terminal C, the processing terminals separately determine photos matching user portrait information of the terminal A, the terminal B, and the terminal C, and sends the photo matching the user portrait information of the terminal A to the terminal A, sends the photo matching the user portrait information of the terminal B to the terminal B, and sends the photo matching the user portrait information of the terminal C to the terminal C.

In this embodiment, when there are not many processing terminals, to improve the photo processing efficiency, the processing terminals may further include the first terminal, for example, the processing terminals include the first terminal and the fourth terminal. In this case, that the processing terminals perform facial recognition on the corresponding to-be-shared photo in the second index information according to the second index information and the user portrait information of the second terminal, to determine the photo matching the user portrait information of the second terminal, and send the photo to the second terminal includes: The first terminal performs facial recognition on the corresponding photo in the second index information according to the second index information and the user portrait information of the second terminal, to determine the photo matching the user portrait information of the second terminal; and the first terminal sends the photo matching the user portrait information of the second terminal to the second terminal according to the address information of the second terminal.

It may be understood that, in an actual application, when the processing terminals that can perform facial recognition have sufficient capabilities, the first terminal may not participate in processing of index information, that is, the processing terminals do not include the first terminal, which is not limited herein.

It should be noted that, in this embodiment, the first terminal may directly send the user portrait information and the address information of the second terminal to the processing terminals; or after receiving requests that are sent by the processing terminals and that are of obtaining the user portrait information and the address information of the second terminal, the first terminal sends the user portrait information and the address information of the second terminal to the processing terminals, which is not specifically limited herein.

In this embodiment, after the photo sharing group is created, a terminal (for example, the first terminal) sharing a photo may directly send all to-be-shared photos to the second terminal in the photo sharing group and does not consider whether the photos match the second terminal.

The first terminal in the present disclosure may be referred to as a 'master (master) terminal', and the second terminal, the third terminal, and the fourth terminal in the present disclosure may be one or more 'slave (slave) terminals'.

In this embodiment, a terminal in a photo sharing group performs image analysis on a to-be-shared photo of each terminal, determines a terminal corresponding to the to-be-shared photo, and delivers the photo to the corresponding terminal. Because a terminal joining a photo sharing group may perform facial recognition on the corresponding photo in second index information, and intelligently distribute the photo to a corresponding terminal, each terminal may obtain a photo required by the terminal, so that photos can be intelligently distributed, which is convenient, fast, and efficient.

Second, the first terminal may also create the photo sharing group, so that implementation manners are more diversified.

Figure 3:
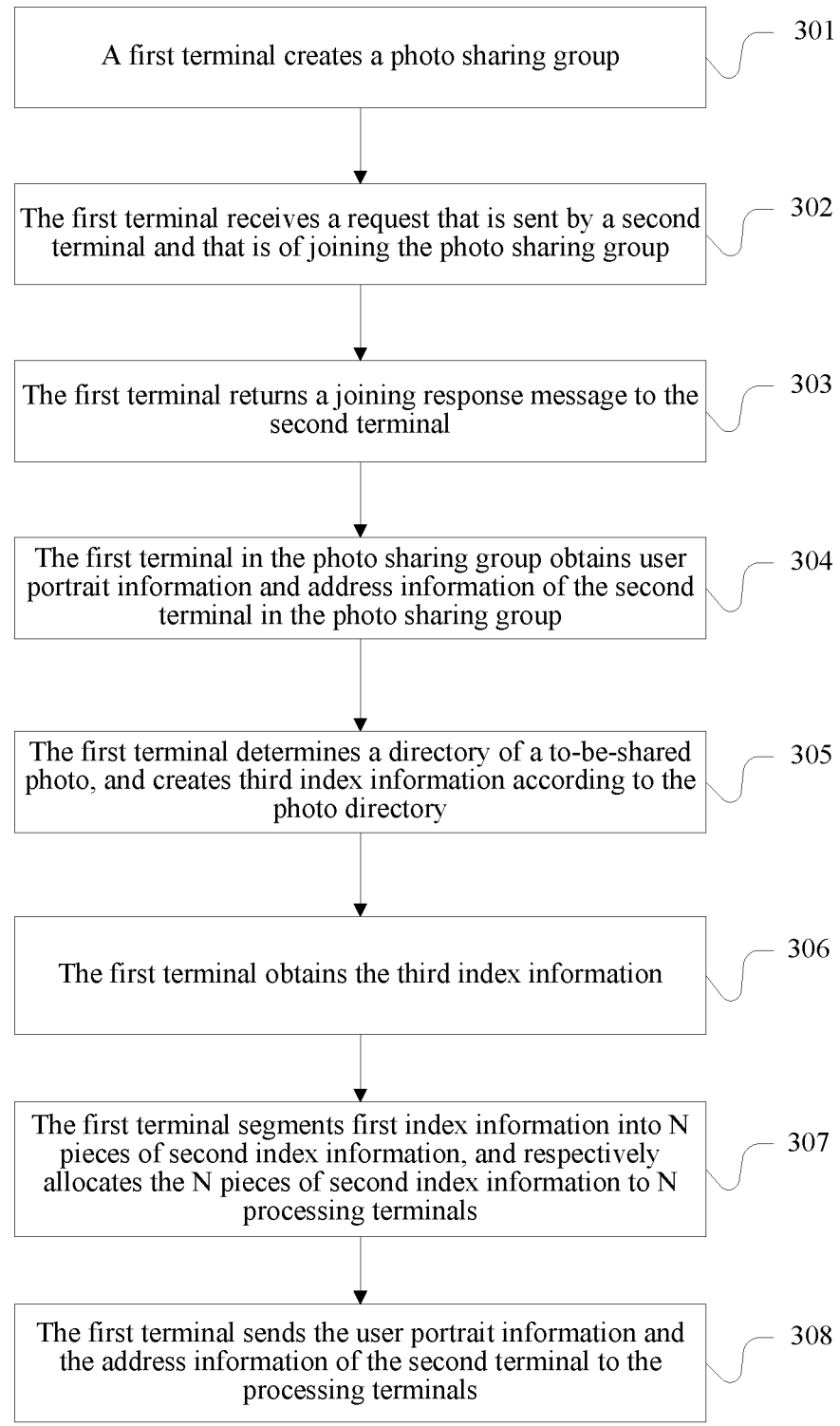
FIG. 3 is a schematic diagram of another embodiment of a photo distribution method according to an embodiment of the present disclosure.

In the embodiment shown in FIG. 1 or FIG. 2, the first terminal may share a photo, that is, the sharing terminal includes the first terminal. The following describes in detail an embodiment in which the sharing terminal includes the first terminal. Referring to FIG. 3, another embodiment of a photo distribution method according to an embodiment of the present disclosure includes:

301: A first terminal creates a photo sharing group.

The first terminal may be a terminal of any one of people going traveling. The first terminal creates the photo sharing group. Distinguishing information such as a name or a group avatar may be set for the photo sharing group. The photo sharing group may be presented on a network according to location information of the first terminal, so that another terminal obtains the photo sharing group by means of searching on the network or by searching for a nearby photo sharing group, which is not specifically limited herein.

In this embodiment, when creating the photo sharing group, the first terminal may further establish a Wi-Fi hotspot, so that after joining the photo sharing group, another terminal connects to the Wi-Fi hotspot, to form a local area network.

It should be noted that, when creating the photo sharing group, the first terminal creates a temporary buffer at the same time, to save information in the photo sharing group, for example, user portrait information and an IP address of a terminal in the photo sharing group, which is not limited herein.

302: The first terminal receives a request that is sent by a second terminal and that is of joining the photo sharing group.

After the first terminal creates the photo sharing group, another terminal needing to share a photo or the second terminal needing to obtain a photo sends a request of joining the photo sharing group to the first terminal. A manner of sending, by the second terminal, the request may be: The second terminal scans a two-dimensional barcode, generated by the first terminal, of the photo sharing group, and after scanning the two-dimensional barcode, the second terminal sends the request of joining the photo sharing group to the first terminal; or in an actual application, the second terminal obtains the photo sharing group by means of searching on the network according to information such as the name or the group avatar of the photo sharing group, and clicks to join the photo sharing group, that is, the second terminal sends the request of joining the photo sharing group to the first terminal; or the second terminal searches for a nearby photo sharing group according to a positioning apparatus in the terminal, and after finding the photo group, clicks to join the photo sharing group, that is, the second terminal sends the request of joining the photo sharing group to the first terminal. A specific manner of sending, by the second terminal, the request of joining the photo sharing group to the first terminal is not specifically limited.

It should be noted that, the second terminal may be one or more terminals in the photo sharing group, which is not specifically limited herein.

303: The first terminal returns a joining response message to the second terminal.

After receiving the request that is sent by the second terminal and that is of joining the photo sharing group, the first terminal returns the joining response message to the second terminal, where the response message includes address information of the first terminal. In this case, it indicates that the first terminal already agrees that the second terminal joins the photo sharing group. In an actual application, to avoid that an irrelevant terminal joins the photo sharing group, the response message may be joining rejection information. The first terminal judges the received request of joining the photo sharing group, to determine whether the second terminal is a terminal sharing a photo; if yes, the first terminal returns a joining agreement response message; and if not, the first terminal returns a joining rejection response message, which is not limed herein. If there are multiple second terminals, the first terminal separately sends the response message including the address information of the first terminal to the multiple second terminals.

If the first terminal establishes a Wi-Fi hotspot when creating the photo sharing group in step 301, after receiving the response message sent by the first terminal, the second terminal may connect to the Wi-Fi hotspot, to form a local area network with the first terminal.

It should be noted that, step 301 to step 303 describe a process in which the first terminal creates the photo sharing group and each terminal joins the photo group. The photo sharing group may be created by another terminal, and the first terminal sends a request of joining the photo sharing group to the terminal creating the photo sharing group. After receiving the request, the terminal creating the photo sharing group returns a joining response message, and the first terminal joins the photo sharing group. Manners of sending the request and returning the joining response are similar to step 302 and step 303, and details are not described herein again.

304: The first terminal in the photo sharing group obtains user portrait information and address information of the second terminal in the photo sharing group.

The first terminal in the photo sharing group can obtain the user portrait information and the address information of the second terminal in the sharing group. A manner of obtaining, by the first terminal, the user portrait information and the address information of the second terminal in the photo sharing group may be: After joining the photo sharing group, the second terminal directly sends the user portrait information and the address information of the second terminal to the first terminal; or after the second terminal joins the photo sharing group, the first terminal sends a request of obtaining the user portrait information and the address information of the second terminal to the second terminal, and the second terminal sends the user portrait information and the address information of the second terminal to the first terminal, which is not specifically limited herein.

The user portrait information of the second terminal may be a photo including a facial image of a user, where the photo of the facial image of the user may be an avatar that is set by the user in the photo sharing group by using a terminal. When the photo of the facial image of the user is an avatar that is set by the user in the photo sharing group by using the terminal, the first terminal may prompt the second terminal to set a user avatar including the facial image, and after the second terminal completes the setting, the first terminal directly obtains the user avatar including the facial image.

In an actual application, the portrait information of the second terminal may be a facial image, taken by the second terminal, of the user, and the taken facial image is sent to the first terminal, which is not specifically limited herein.

In this embodiment, if the first terminal creates a temporary buffer when creating the photo sharing group, the first terminal may save, into the temporary buffer, the user portrait information and the address information of the second terminal in the photo sharing group that are obtained by the first terminal; if the first terminal does not create a temporary buffer when creating the photo sharing group, the first terminal may create a temporary buffer at this time, and save, into the temporary buffer, the user portrait information and the address information of the second terminal in the photo sharing group that are obtained by the first terminal.

In an actual application, it is feasible that the first terminal does not create a temporary buffer, which is not specifically limited herein.

305: The first terminal determines a directory of a to-be-shared photo, and creates third index information according to the photo directory.

In this embodiment, the first terminal has a to-be-shared photo; therefore, the first terminal side may determine the directory of the to-be-shared photo, and create the third index information according to the photo directory, where the third index information includes photo information and the address information of the first terminal, and the photo information includes a quantity of the photos, an ID of each photo, a path of each photo, and the like.

306: The first terminal obtains the third index information.

The first terminal may obtain the third index information created by the first terminal.

It should be noted that, a sharing terminal may be one or more terminals in the photo sharing group, or may include the first terminal. This embodiment uses an example in which the sharing terminal includes the first terminal. In this case, that the first terminal obtains first index information created by a third terminal in the photo sharing group includes: The first terminal obtains the third index information.

It may be understood that, when there is another terminal sharing a photo in the photo sharing group, for example, the sharing terminal includes the third terminal, that the first terminal obtains first index information that is created by the sharing terminal and that is of the to-be-shared photo may further include: The first terminal obtains fourth index information created by the third terminal in the sharing group, which is not limited herein. The third terminal is a terminal except the first terminal and there may be one or more third terminals. The fourth index information may include photo information and address information of the third terminal, and the photo information includes a quantity of photos, an ID of each photo, and a path of each photo.

307: The first terminal segments first index information into N pieces of second index information, and respectively allocates the N pieces of second index information to N processing terminals.

After obtaining the first index information, the first terminal segments the first index information to obtain N pieces of second index information, and allocates the second index information to the N processing terminals in the photo sharing group, where the processing terminals include a fourth terminal in the sharing group, or the fourth terminal and the first terminal, and N≥2.

In this embodiment, the second index information may include photo information and address information of the sharing terminal, and the photo information includes a quantity of photos, an ID of each photo, and a path of each photo.

It should be noted that, the fourth terminal may be one or more terminals in the photo sharing group, which is not specifically limited herein.

308: The first terminal sends the user portrait information and the address information of the second terminal to the processing terminals.

The first terminal sends the user portrait information and the address information of the second terminal to the processing terminals, so that the processing terminals may perform facial recognition on the corresponding photo in the second index information according to the allocated second index information and the user portrait information of the second terminal, to determine a photo matching the user portrait information of the second terminal, and send the photo to the second terminal. When there is only one second terminal, the processing terminals determine a photo matching user portrait information of the second terminal and send the photo to the second terminal; and when there are multiple second terminals, the processing terminals determine a photo matching user portrait information of each second terminal and send the photo to the corresponding terminal.

In this embodiment, when there are not many processing terminals, to improve the photo processing efficiency, the processing terminals may include the first terminal, for example, the processing terminals include the first terminal and the fourth terminal. In this case, that the processing terminals perform facial recognition on the corresponding to-be-shared photo in the second index information according to the second index information and the user portrait information of the second terminal, to determine the photo matching the user portrait information of the second terminal, and send the photo to the second terminal includes: The first terminal performs facial recognition on the corresponding photo in the second index information according to the second index information and the user portrait information of the second terminal, to determine the photo matching the user portrait information of the second terminal; and the first terminal sends the photo matching the user portrait information of the second terminal to the second terminal according to the address information of the second terminal.

It may be understood that, in an actual application, when the processing terminals that can perform facial recognition have sufficient capabilities, the first terminal may not participate in processing of index information, that is, the processing terminals do not include the first terminal, which is not limited herein.

It should be noted that, in this embodiment, the first terminal may directly send the user portrait information and the address information of the second terminal to the processing terminals; or after receiving requests that are sent by the processing terminals and that are of obtaining the user portrait information and the address information of the second terminal, the first terminal sends the user portrait information and the address information of the second terminal to the processing terminals, which is not specifically limited herein.

In this embodiment, after the photo sharing group is created, a terminal (for example, the first terminal) sharing a photo may directly send all to-be-shared photos to the second terminal in the photo sharing group and does not consider whether the photos match the second terminal.

The first terminal in the present disclosure may be referred to as a 'master (master) terminal', and the second terminal, the third terminal, and the fourth terminal in the present disclosure may be one or more 'slave (slave) terminals'.

Based on the embodiment shown in FIG. 2, this embodiment describes in detail a specific scenario in which the first terminal shares a photo, so that implementation manners are more diversified.

In the embodiments shown in FIG. 1 to FIG. 3, there may be multiple implementation manners in which the first terminal segments the first index information to obtain the second index information and allocates the second index information to the fourth terminal in the sharing group. The following gives a description with reference to a specific embodiment.

1. A first terminal segments first index information into N pieces of second index information equally according to a quantity of photos, and respectively allocates the N pieces of second index information to N processing terminals.

Figure 4:
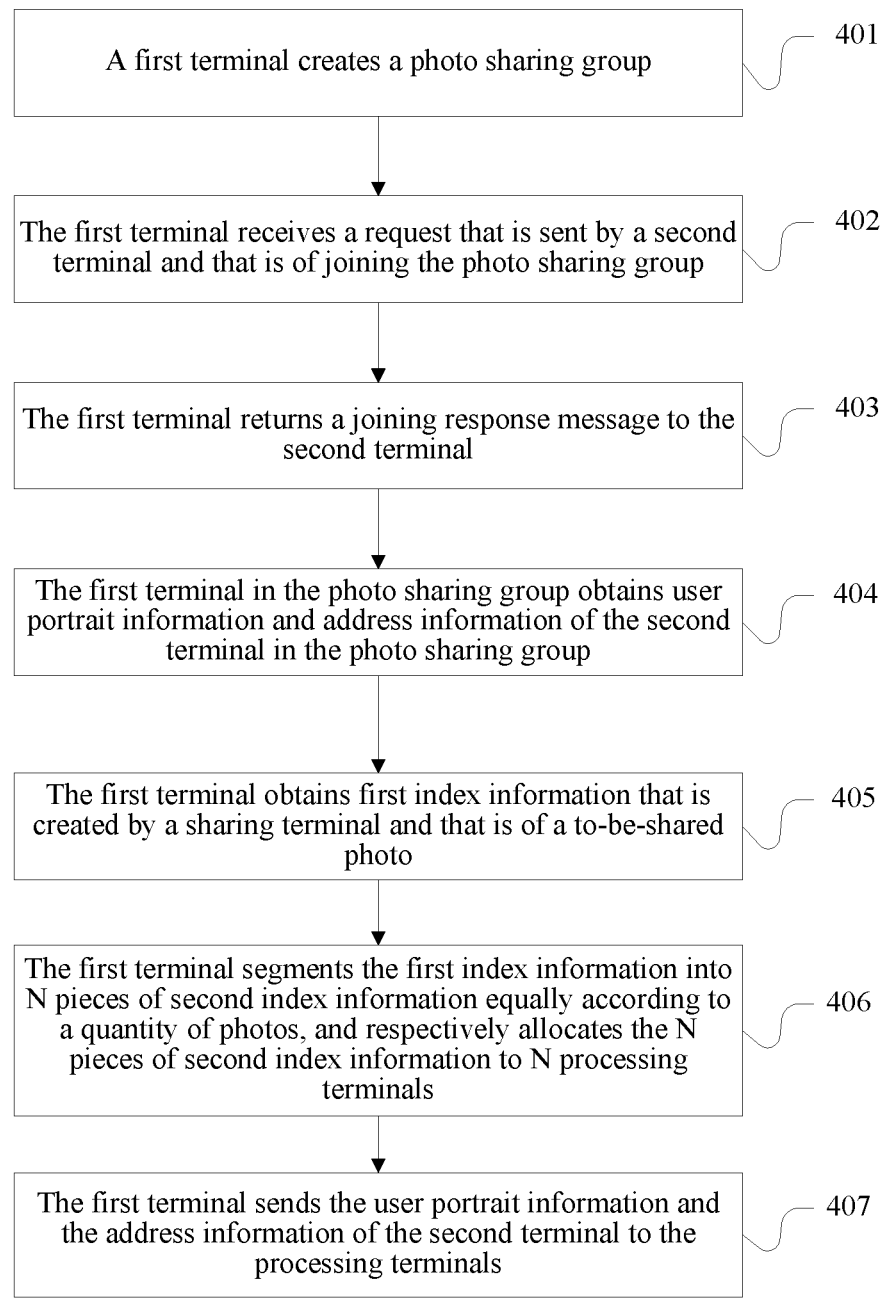
FIG. 4 is a schematic diagram of another embodiment of a photo distribution method according to an embodiment of the present disclosure.

Referring to FIG. 4, another embodiment of a photo distribution method according to an embodiment of the present disclosure includes:

401: A first terminal creates a photo sharing group.

The first terminal may be a terminal of any one of people going traveling. The first terminal creates the photo sharing group. Distinguishing information such as a name or a group avatar may be set for the photo sharing group. The photo sharing group may be presented on a network according to location information of the first terminal, so that another terminal obtains the photo sharing group by means of searching on the network or by searching for a nearby photo sharing group, which is not specifically limited herein.

In this embodiment, when creating the photo sharing group, the first terminal may further establish a Wi-Fi hotspot, so that after joining the photo sharing group, another terminal connects to the Wi-Fi hotspot, to form a local area network.

It should be noted that, when creating the photo sharing group, the first terminal creates a temporary buffer at the same time, to save information in the photo sharing group, for example, user portrait information and an IP address of a terminal in the photo sharing group, which is not limited herein.

402: The first terminal receives a request that is sent by a second terminal and that is of joining the photo sharing group.

After the first terminal creates the photo sharing group, another terminal needing to share a photo or the second terminal needing to obtain a photo sends a request of joining the photo sharing group to the first terminal. A manner of sending, by the second terminal, the request may be: The second terminal scans a two-dimensional barcode, generated by the first terminal, of the photo sharing group, and after scanning the two-dimensional barcode, the second terminal sends the request of joining the photo sharing group to the first terminal; or in an actual application, the second terminal obtains the photo sharing group by means of searching on the network according to information such as the name or the group avatar of the photo sharing group, and clicks to join the photo sharing group, that is, the second terminal sends the request of joining the photo sharing group to the first terminal; or the second terminal searches for a nearby photo sharing group according to a positioning apparatus in the terminal, and after finding the photo group, clicks to join the photo sharing group, that is, the second terminal sends the request of joining the photo sharing group to the first terminal. A specific manner of sending, by the second terminal, the request of joining the photo sharing group to the first terminal is not specifically limited.

It should be noted that, the second terminal may be one or more terminals in the photo sharing group, which is not specifically limited herein.

403: The first terminal returns a joining response message to the second terminal.

After receiving the request that is sent by the second terminal and that is of joining the photo sharing group, the first terminal returns the joining response message to the second terminal, where the response message includes address information of the first terminal. In this case, it indicates that the first terminal already agrees that the second terminal joins the photo sharing group. In an actual application, to avoid that an irrelevant terminal joins the photo sharing group, the response message may be joining rejection information. The first terminal judges the received request of joining the photo sharing group, to determine whether the second terminal is a terminal sharing a photo; if yes, the first terminal returns a joining agreement response message; and if not, the first terminal returns a joining rejection response message, which is not limed herein. If there are multiple second terminals, the first terminal separately sends the response message including the address information of the first terminal to the multiple second terminals.

If the first terminal establishes a Wi-Fi hotspot when creating the photo sharing group in step 401, after receiving the response message sent by the first terminal, the second terminal may connect to the Wi-Fi hotspot, to form a local area network with the first terminal.

It should be noted that, step 401 to step 403 describe a process in which the first terminal creates the photo sharing group and each terminal joins the photo group. The photo sharing group may be created by another terminal, and the first terminal sends a request of joining the photo sharing group to the terminal creating the photo sharing group. After receiving the request, the terminal creating the photo sharing group returns a joining response message, and the first terminal joins the photo sharing group. Manners of sending the request and returning the joining response are similar to step 402 and step 403, and details are not described herein again.

404: The first terminal in the photo sharing group obtains user portrait information and address information of the second terminal in the photo sharing group.

The first terminal in the photo sharing group can obtain the user portrait information and the address information of the second terminal in the sharing group. A manner of obtaining, by the first terminal, the user portrait information and the address information of the second terminal in the photo sharing group may be: After joining the photo sharing group, the second terminal directly sends the user portrait information and the address information of the second terminal to the first terminal; or after the second terminal joins the photo sharing group, the first terminal sends a request of obtaining the user portrait information and the address information of the second terminal to the second terminal, and the second terminal sends the user portrait information and the address information of the second terminal to the first terminal, which is not specifically limited herein.

The user portrait information of the second terminal may be a photo including a facial image of a user, where the photo of the facial image of the user may be an avatar that is set by the user in the photo sharing group by using a terminal. When the photo of the facial image of the user is an avatar that is set by the user in the photo sharing group by using the terminal, the first terminal may prompt the second terminal to set a user avatar including the facial image, and after the second terminal completes the setting, the first terminal directly obtains the user avatar including the facial image.

In an actual application, the portrait information of the second terminal may be a facial image, taken by the second terminal, of the user, and the taken facial image is sent to the first terminal, which is not specifically limited herein.

In this embodiment, if the first terminal creates a temporary buffer when creating the photo sharing group, the first terminal may save, into the temporary buffer, the user portrait information and the address information of the second terminal in the photo sharing group that are obtained by the first terminal; if the first terminal does not create a temporary buffer when creating the photo sharing group, the first terminal may create a temporary buffer at this time, and save, into the temporary buffer, the user portrait information and the address information of the second terminal in the photo sharing group that are obtained by the first terminal. In an actual application, it is feasible that the first terminal does not create a temporary buffer, which is not specifically limited herein.

405: The first terminal obtains first index information that is created by a sharing terminal and that is of a to-be-shared photo.

The sharing terminal includes at least one of the first terminal or a third terminal in the sharing group. The sharing terminal needing to share a photo in the photo sharing group creates the first index information according to the to-be-shared photo. The first terminal may obtain the first index information created by the sharing terminal in the photo sharing group.

It should be noted that, the third terminal may be one or more terminals in the photo sharing group, and corresponding to the sharing terminal in the photo sharing group, the first index information includes one or more pieces of index information. For example, if the sharing terminal includes the first terminal, that the first terminal obtains the first index information that is created by the sharing terminal and that is of the to-be-shared photo may include: The first terminal determines a directory of a to-be-shared photo of the first terminal, and creates third index information according to the photo directory, where the third index information includes photo information and the address information of the first terminal, and the photo information includes a quantity of the to-be-shared photos, an ID of each photo, and a path of each photo; and the first terminal obtains the third index information. When the sharing terminal includes the first terminal, for specific details, refer to a specific process in the embodiment shown in FIG. 3.

If the sharing terminal includes the third terminal, that the first terminal obtains the first index information that is created by the sharing terminal and that is of the to-be-shared photo includes: The first terminal obtains fourth index information created by the third terminal in the sharing group, where the fourth index information includes photo information and address information of the third terminal, and the photo information includes a quantity of to-be-shared photos, an ID of each photo, and a path of each photo.

406: The first terminal segments the first index information into N pieces of second index information equally according to a quantity of photos, and respectively allocates the N pieces of second index information to N processing terminals.

In this embodiment, the second index information includes photo information and address information of the sharing terminal, and the photo information includes a quantity of photos, an ID of each photo, and a path of each photo.

N is a quantity of processing terminals. The first terminal obtains the first index information created by the sharing terminal in the photo sharing group, segments the first index information into N pieces of second index information equally according to a quantity of photos, and respectively allocates the N pieces of second index information to the N processing terminals. When the first index information includes multiple pieces of index information, each piece of index information may be segmented into N pieces of index information, and the N pieces of index information are respectively allocated to the N processing terminals; or a total quantity of photos may be counted for the multiple pieces of index information once, the first index information is segmented into N pieces of second index information equally, and the N pieces of second index information are respectively allocated to the N processing terminals, which is not specifically limited herein.

It should be noted that, the processing terminals may be one or more terminals in the photo sharing group, or may include the first terminal, which is not specifically limited herein.

407: The first terminal sends the user portrait information and the address information of the second terminal to the processing terminals.

The first terminal sends the user portrait information and the address information of the second terminal to the processing terminals, so that the processing terminals may perform facial recognition on the corresponding photo in the second index information according to the allocated second index information and the user portrait information of the second terminal, to determine a photo matching the user portrait information of the second terminal, and send the photo to the second terminal. When there is only one second terminal, the processing terminals determine a photo matching user portrait information of the second terminal and send the photo to the second terminal; and when there are multiple second terminals, the processing terminals determine a photo matching user portrait information of each second terminal and send the photo to the corresponding terminal.

In this embodiment, when there are not many processing terminals, to improve the photo processing efficiency, the processing terminals may include the first terminal, for example, the processing terminals include the first terminal and the fourth terminal. In this case, that the processing terminals perform facial recognition on the corresponding to-be-shared photo in the second index information according to the second index information and the user portrait information of the second terminal, to determine the photo matching the user portrait information of the second terminal, and send the photo to the second terminal includes: The first terminal performs facial recognition on the corresponding photo in the second index information according to the second index information and the user portrait information of the second terminal, to determine the photo matching the user portrait information of the second terminal; and the first terminal sends the photo matching the user portrait information of the second terminal to the second terminal according to the address information of the second terminal.

It may be understood that, in an actual application, when the processing terminals that can perform facial recognition have sufficient capabilities, the first terminal may not participate in processing of index information, that is, the processing terminals do not include the first terminal, which is not limited herein.

It should be noted that, in this embodiment, the first terminal may directly send the user portrait information and the address information of the second terminal to the processing terminals; or after receiving requests that are sent by the processing terminals and that are of obtaining the user portrait information and the address information of the second terminal, the first terminal sends the user portrait information and the address information of the second terminal to the processing terminals, which is not specifically limited herein.

In this embodiment, after the photo sharing group is created, a terminal (for example, the first terminal) sharing a photo may directly send all to-be-shared photos to the second terminal in the photo sharing group and does not consider whether the photos match the second terminal.

The first terminal in the present disclosure may be referred to as a 'master (master) terminal', and the second terminal, the third terminal, and the fourth terminal in the present disclosure may be one or more 'slave (slave) terminals'.

2. A first terminal separately obtains terminal processing capability information sent by N processing terminals, segments first index information into N pieces of second index information according to a quantity of photos and the terminal processing capability information of the N processing terminals, and respectively allocates the N pieces of second index information to the N processing terminals.

Figure 5:
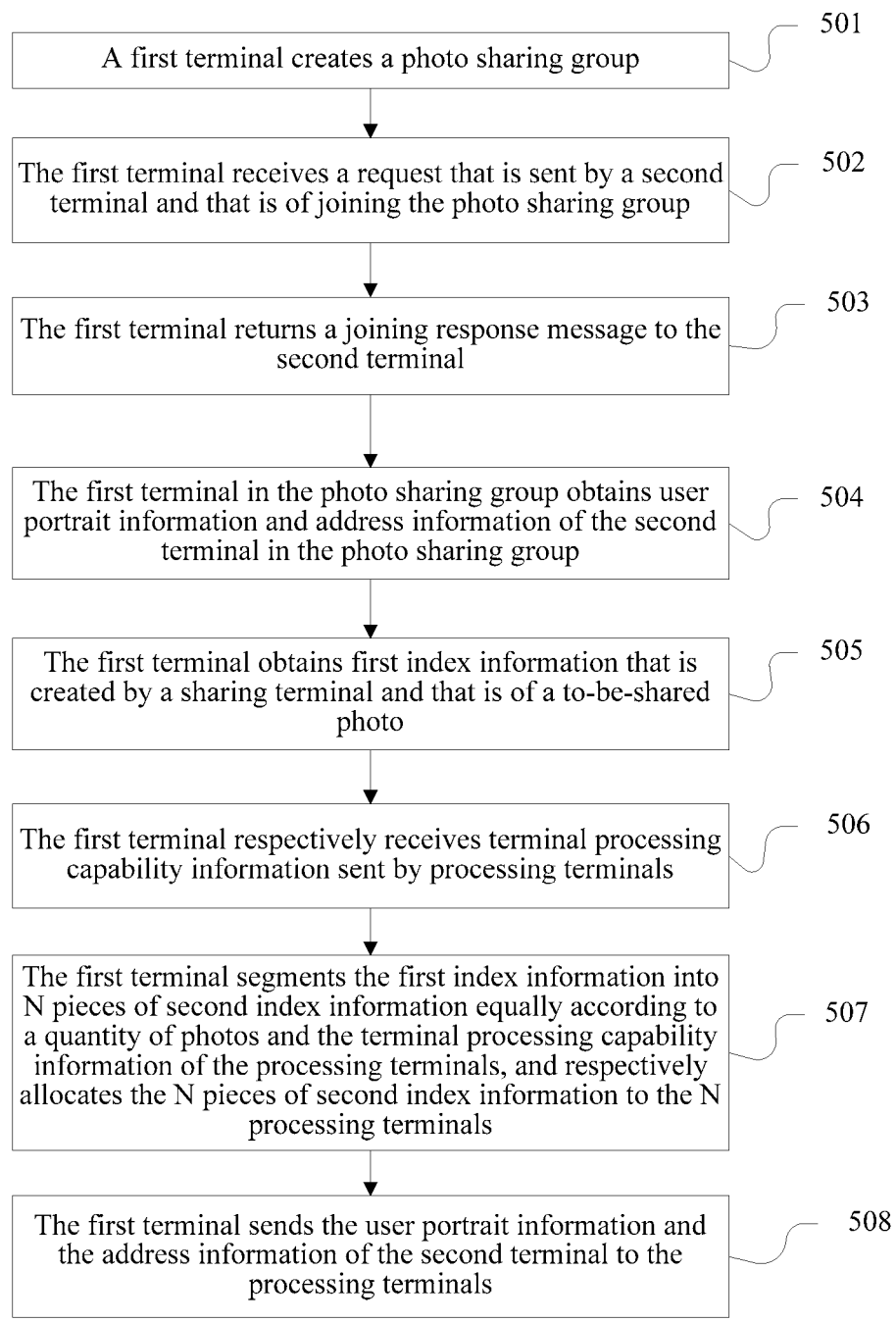
FIG. 5 is a schematic diagram of another embodiment of a photo distribution method according to an embodiment of the present disclosure.

Referring to FIG. 5, another embodiment of a photo distribution method according to an embodiment of the present disclosure includes:

501: A first terminal creates a photo sharing group.

The first terminal may be a terminal of any one of people going traveling. The first terminal creates the photo sharing group. Distinguishing information such as a name or a group avatar may be set for the photo sharing group. The photo sharing group may be presented on a network according to location information of the first terminal, so that another terminal obtains the photo sharing group by means of searching on the network or by searching for a nearby photo sharing group, which is not specifically limited herein.

In this embodiment, when creating the photo sharing group, the first terminal may further establish a Wi-Fi hotspot, so that after joining the photo sharing group, another terminal connects to the Wi-Fi hotspot, to form a local area network.

It should be noted that, when creating the photo sharing group, the first terminal creates a temporary buffer at the same time, to save information in the photo sharing group, for example, user portrait information and an IP address of a terminal in the photo sharing group, which is not limited herein.

502: The first terminal receives a request that is sent by a second terminal and that is of joining the photo sharing group.

After the first terminal creates the photo sharing group, another terminal needing to share a photo or the second terminal needing to obtain a photo sends a request of joining the photo sharing group to the first terminal. A manner of sending, by the second terminal, the request may be: The second terminal scans a two-dimensional barcode, generated by the first terminal, of the photo sharing group, and after scanning the two-dimensional barcode, the second terminal sends the request of joining the photo sharing group to the first terminal; or in an actual application, the second terminal obtains the photo sharing group by means of searching on the network according to information such as the name or the group avatar of the photo sharing group, and clicks to join the photo sharing group, that is, the second terminal sends the request of joining the photo sharing group to the first terminal; or the second terminal searches for a nearby photo sharing group according to a positioning apparatus in the terminal, and after finding the photo group, clicks to join the photo sharing group, that is, the second terminal sends the request of joining the photo sharing group to the first terminal. A specific manner of sending, by the second terminal, the request of joining the photo sharing group to the first terminal is not specifically limited.

It should be noted that, the second terminal may be one or more terminals in the photo sharing group, which is not specifically limited herein.

503: The first terminal returns a joining response message to the second terminal.

After receiving the request that is sent by the second terminal and that is of joining the photo sharing group, the first terminal returns the joining response message to the second terminal, where the response message includes address information of the first terminal. In this case, it indicates that the first terminal already agrees that the second terminal joins the photo sharing group. In an actual application, to avoid that an irrelevant terminal joins the photo sharing group, the response message may be joining rejection information. The first terminal judges the received request of joining the photo sharing group, to determine whether the second terminal is a terminal sharing a photo; if yes, the first terminal returns a joining agreement response message; and if not, the first terminal returns a joining rejection response message, which is not limed herein. If there are multiple second terminals, the first terminal separately sends the response message including the address information of the first terminal to the multiple second terminals.

If the first terminal establishes a Wi-Fi hotspot when creating the photo sharing group in step 501, after receiving the response message sent by the first terminal, the second terminal may connect to the Wi-Fi hotspot, to form a local area network with the first terminal.

It should be noted that, step 501 to step 503 describe a process in which the first terminal creates the photo sharing group and each terminal joins the photo group. The photo sharing group may be created by another terminal, and the first terminal sends a request of joining the photo sharing group to the terminal creating the photo sharing group. After receiving the request, the terminal creating the photo sharing group returns a joining response message, and the first terminal joins the photo sharing group. Manners of sending the request and returning the joining response are similar to step 502 and step 503, and details are not described herein again.

504: The first terminal in the photo sharing group obtains user portrait information and address information of the second terminal in the photo sharing group.

The first terminal in the photo sharing group can obtain the user portrait information and the address information of the second terminal in the sharing group. A manner of obtaining, by the first terminal, the user portrait information and the address information of the second terminal in the photo sharing group may be: After joining the photo sharing group, the second terminal directly sends the user portrait information and the address information of the second terminal to the first terminal; or after the second terminal joins the photo sharing group, the first terminal sends a request of obtaining the user portrait information and the address information of the second terminal to the second terminal, and the second terminal sends the user portrait information and the address information of the second terminal to the first terminal, which is not specifically limited herein.

The user portrait information of the second terminal may be a photo including a facial image of a user, where the photo of the facial image of the user may be an avatar that is set by the user in the photo sharing group by using a terminal. When the photo of the facial image of the user is an avatar that is set by the user in the photo sharing group by using the terminal, the first terminal may prompt the second terminal to set a user avatar including the facial image, and after the second terminal completes the setting, the first terminal directly obtains the user avatar including the facial image.

In an actual application, the portrait information of the second terminal may be a facial image, taken by the second terminal, of the user, and the taken facial image is sent to the first terminal, which is not specifically limited herein.

In this embodiment, if the first terminal creates a temporary buffer when creating the photo sharing group, the first terminal may save, into the temporary buffer, the user portrait information and the address information of the second terminal in the photo sharing group that are obtained by the first terminal; if the first terminal does not create a temporary buffer when creating the photo sharing group, the first terminal may create a temporary buffer at this time, and save, into the temporary buffer, the user portrait information and the address information of the second terminal in the photo sharing group that are obtained by the first terminal. In an actual application, it is feasible that the first terminal does not create a temporary buffer, which is not specifically limited herein.

505: The first terminal obtains first index information that is created by a sharing terminal and that is of a to-be-shared photo.

The sharing terminal includes at least one of the first terminal or a third terminal in the sharing group. The sharing terminal needing to share a photo in the photo sharing group creates the first index information according to the to-be-shared photo. The first terminal may obtain the first index information created by the sharing terminal in the photo sharing group.

It should be noted that, the third terminal may be one or more terminals in the photo sharing group, and corresponding to the sharing terminal in the photo sharing group, the first index information includes one or more pieces of index information. If the sharing terminal includes the first terminal, that the first terminal obtains the first index information that is created by the sharing terminal and that is of the to-be-shared photo may include: The first terminal determines a directory of a to-be-shared photo of the first terminal, and creates third index information according to the photo directory, where the third index information includes photo information and the address information of the first terminal, and the photo information includes a quantity of the to-be-shared photos, an ID of each photo, and a path of each photo; and the first terminal obtains the third index information. When the sharing terminal includes the first terminal, for specific details, refer to a specific process in the embodiment shown in FIG. 3.

If the sharing terminal includes the third terminal, that the first terminal obtains the first index information that is created by the sharing terminal and that is of the to-be-shared photo includes: The first terminal obtains fourth index information created by the third terminal in the sharing group, where the fourth index information includes photo information and address information of the third terminal, and the photo information includes a quantity of to-be-shared photos, an ID of each photo, and a path of each photo.

506: The first terminal respectively receives terminal processing capability information sent by processing terminals.

Before allocating the index information, the first terminal receives the terminal processing capability information sent by the processing terminals. The processing terminals may actively send the terminal processing capability information; or after determining a processing terminal that may perform facial recognition, the first terminal sends a request of obtaining processing terminal processing capability information to the processing terminal, and then, the processing terminal sends the terminal processing capability information of the processing terminal to the first terminal after receiving the request.

It should be noted that, the processing terminal processing capability information may be various information of the processing terminal, for example, one or more of a memory size, a CPU compute capability, a remaining quantity of electric charge of the terminal, a size of storage space, or the like, which is not limited herein. The processing terminal may be one or more terminals in the photo sharing group, or may include the first terminal. When permitted, when as many processing terminals as possible are used, the processing efficiency can be improved, which is not specifically limited herein.

507: The first terminal segments the first index information into N pieces of second index information equally according to a quantity of photos and the terminal processing capability information of the processing terminals, and respectively allocates the N pieces of second index information to the N processing terminals.

In this embodiment, the second index information includes photo information and address information of the sharing terminal, and the photo information includes a quantity of photos, an ID of each photo, and a path of each photo.

N is a quantity of processing terminals. The first terminal obtains the first index information created by the sharing terminal in the photo sharing group, and segments the first index information into N pieces of second index information according to a quantity of photos in the photo information in the first index information and according to the terminal processing capability information of the N processing terminals. When the first index information includes multiple pieces of index information, the first terminal may segment each piece of index information into N pieces of index information according to the terminal processing capability information of the N processing terminals and allocates the N pieces of index information to the processing terminals. For example, the first terminal determines, according to terminal processing capability information of a terminal A, a terminal B, and a terminal C, that the terminal A may process 25 photos, the terminal B may process 20 photos, and the terminal C may process 30 photos, and the first terminal may segment index information, a total quantity of photos being 75, in the first index information into three pieces of index information that respectively include a quantity of photos being 25, a quantity of photos being 20, and a quantity of photos being 30. When a total quantity of photos in the index information exceeds a quantity of photos that can be processed by the processing terminals, multiple times of segmentation may be performed. For example, there are 90 photos, the index information may be first segmented into three pieces of index information that respectively include a quantity of photos being 25, a quantity of photos being 20, and a quantity of photos being 30; after facial recognition, the remaining index information is allocated to a terminal that can still perform photo processing. When a total quantity of photos in the first index information is less than a quantity of photos that can be processed by the processing terminals, allocation may be performed evenly as far as possible according to the terminal processing capability information and the like.

It may be understood that, in this embodiment, a total quantity of photos in multiple pieces of index information may be counted once. The first index information is segmented into N pieces of second index information once according to the terminal processing capability information of the N processing terminals, and the second index information is allocated to the processing terminals. For example, the first index information includes third index information and fourth index information. It is assumed that a quantity of photos in the first index information is 20 and a quantity of photos in the second index information is 25. The index information may be segmented according to the total quantity of photos being 45, which is not specifically limited herein.

508: The first terminal sends the user portrait information and the address information of the second terminal to the processing terminals.

The first terminal sends the user portrait information and the address information of the second terminal to the processing terminals, so that the processing terminals may perform facial recognition on the corresponding photo in the second index information according to the allocated second index information and the user portrait information of the second terminal, to determine a photo matching the user portrait information of the second terminal, and send the photo to the second terminal. When there is only one second terminal, the processing terminals determine a photo matching user portrait information of the second terminal and send the second terminal; and when there are multiple second terminals, the processing terminals determine a photo matching user portrait information of each second terminal and send the photo to the corresponding terminal.

In this embodiment, when there are not many processing terminals, to improve the photo processing efficiency, the processing terminals may include the first terminal, for example, the processing terminals include the first terminal and the fourth terminal. In this case, that the processing terminals perform facial recognition on the corresponding to-be-shared photo in the second index information according to the second index information and the user portrait information of the second terminal, to determine the photo matching the user portrait information of the second terminal, and send the photo to the second terminal includes: The first terminal performs facial recognition on the corresponding photo in the second index information according to the second index information and the user portrait information of the second terminal, to determine the photo matching the user portrait information of the second terminal; and the first terminal sends the photo matching the user portrait information of the second terminal to the second terminal according to the address information of the second terminal.

It may be understood that, in an actual application, when the processing terminals that can perform facial recognition have sufficient capabilities, the first terminal may not participate in processing of index information, that is, the processing terminals do not include the first terminal, which is not limited herein.

It should be noted that, in this embodiment, the first terminal may directly send the user portrait information and the address information of the second terminal to the processing terminals; or after receiving requests that are sent by the processing terminals and that are of obtaining the user portrait information and the address information of the second terminal, the first terminal sends the user portrait information and the address information of the second terminal to the processing terminals, which is not specifically limited herein.

In this embodiment, after the photo sharing group is created, a terminal (for example, the first terminal) sharing a photo may directly send all to-be-shared photos to the second terminal in the photo sharing group and does not consider whether the photos match the second terminal.

The first terminal in the present disclosure may be referred to as a 'master (master) terminal', and the second terminal, the third terminal, and the fourth terminal in the present disclosure may be one or more 'slave (slave) terminals'.

In the embodiments shown in FIG. 4 and FIG. 5, multiple implementation manners in which the first terminal segments the first index information to obtain the second index information and allocates the second index information to the fourth terminal in the sharing group are described in detail, so that the implementation manners are more diversified.

Figure 6:
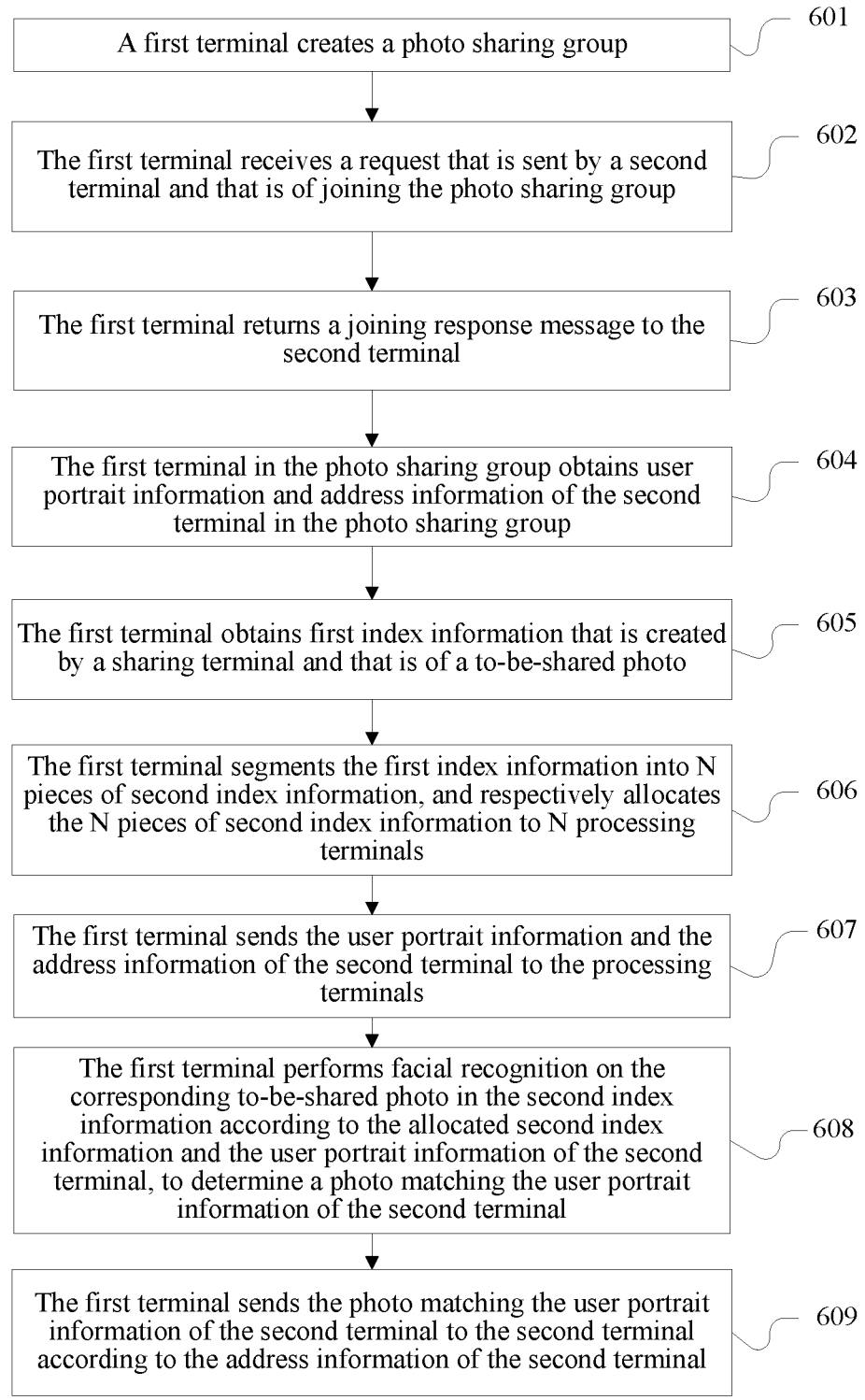
FIG. 6 is a schematic diagram of another embodiment of a photo distribution method according to an embodiment of the present disclosure.

In the embodiments shown in FIG. 1 to FIG. 5, the processing terminals may include the first terminal. The following gives a detailed description with reference to a specific embodiment. Referring to FIG. 6, another embodiment of a photo distribution method according to an embodiment of the present disclosure includes:

601: A first terminal creates a photo sharing group.

The first terminal may be a terminal of any one of people going traveling. The first terminal creates the photo sharing group. Distinguishing information such as a name or a group avatar may be set for the photo sharing group. The photo sharing group may be presented on a network according to location information of the first terminal, so that another terminal obtains the photo sharing group by means of searching on the network or by searching for a nearby photo sharing group, which is not specifically limited herein.

In this embodiment, when creating the photo sharing group, the first terminal may further establish a Wi-Fi hotspot, so that after joining the photo sharing group, another terminal connects to the Wi-Fi hotspot, to form a local area network.

It should be noted that, when creating the photo sharing group, the first terminal creates a temporary buffer at the same time, to save information in the photo sharing group, for example, user portrait information and an IP address of a terminal in the photo sharing group, which is not limited herein.

602: The first terminal receives a request that is sent by a second terminal and that is of joining the photo sharing group.

After the first terminal creates the photo sharing group, another terminal needing to share a photo or the second terminal needing to obtain a photo sends a request of joining the photo sharing group to the first terminal. A manner of sending, by the second terminal, the request may be: The second terminal scans a two-dimensional barcode, generated by the first terminal, of the photo sharing group, and after scanning the two-dimensional barcode, the second terminal sends the request of joining the photo sharing group to the first terminal; or in an actual application, the second terminal obtains the photo sharing group by means of searching on the network according to information such as the name or the group avatar of the photo sharing group, and clicks to join the photo sharing group, that is, the second terminal sends the request of joining the photo sharing group to the first terminal; or the second terminal searches for a nearby photo sharing group according to a positioning apparatus in the terminal, and after finding the photo group, clicks to join the photo sharing group, that is, the second terminal sends the request of joining the photo sharing group to the first terminal. A specific manner of sending, by the second terminal, the request of joining the photo sharing group to the first terminal is not specifically limited.

It should be noted that, the second terminal may be one or more terminals in the photo sharing group, which is not specifically limited herein.

603: The first terminal returns a joining response message to the second terminal.

After receiving the request that is sent by the second terminal and that is of joining the photo sharing group, the first terminal returns the joining response message to the second terminal, where the response message includes address information of the first terminal. In this case, it indicates that the first terminal already agrees that the second terminal joins the photo sharing group. In an actual application, to avoid that an irrelevant terminal joins the photo sharing group, the response message may be joining rejection information. The first terminal judges the received request of joining the photo sharing group, to determine whether the second terminal is a terminal sharing a photo; if yes, the first terminal returns a joining agreement response message; and if not, the first terminal returns a joining rejection response message, which is not limed herein. If there are multiple second terminals, the first terminal separately sends the response message including the address information of the first terminal to the multiple second terminals.

If the first terminal establishes a Wi-Fi hotspot when creating the photo sharing group in step 601, after receiving the response message sent by the first terminal, the second terminal may connect to the Wi-Fi hotspot, to form a local area network with the first terminal.

It should be noted that, step 601 to step 603 describe a process in which the first terminal creates the photo sharing group and each terminal joins the photo group. The photo sharing group may be created by another terminal, and the first terminal sends a request of joining the photo sharing group to the terminal creating the photo sharing group. After receiving the request, the terminal creating the photo sharing group returns a joining response message, and the first terminal joins the photo sharing group. Manners of sending the request and returning the joining response are similar to step 602 and step 603, and details are not described herein again.

604: The first terminal in the photo sharing group obtains user portrait information and address information of the second terminal in the photo sharing group.

The first terminal in the photo sharing group can obtain the user portrait information and the address information of the second terminal in the sharing group. A manner of obtaining, by the first terminal, the user portrait information and the address information of the second terminal in the photo sharing group may be: After joining the photo sharing group, the second terminal directly sends the user portrait information and the address information of the second terminal to the first terminal; or after the second terminal joins the photo sharing group, the first terminal sends a request of obtaining the user portrait information and the address information of the second terminal to the second terminal, and the second terminal sends the user portrait information and the address information of the second terminal to the first terminal, which is not specifically limited herein.

The user portrait information of the second terminal may be a photo including a facial image of a user, where the photo of the facial image of the user may be an avatar that is set by the user in the photo sharing group by using a terminal. When the photo of the facial image of the user is an avatar that is set by the user in the photo sharing group by using the terminal, the first terminal may prompt the second terminal to set a user avatar including the facial image, and after the second terminal completes the setting, the first terminal directly obtains the user avatar including the facial image.

In an actual application, the portrait information of the second terminal may be a facial image, taken by the second terminal, of the user, and the taken facial image is sent to the first terminal, which is not specifically limited herein.

In this embodiment, if the first terminal creates a temporary buffer when creating the photo sharing group, the first terminal may save, into the temporary buffer, the user portrait information and the address information of the second terminal in the photo sharing group that are obtained by the first terminal; if the first terminal does not create a temporary buffer when creating the photo sharing group, the first terminal may create a temporary buffer at this time, and save, into the temporary buffer, the user portrait information and the address information of the second terminal in the photo sharing group that are obtained by the first terminal. In an actual application, it is feasible that the first terminal does not create a temporary buffer, which is not specifically limited herein.

605: The first terminal obtains first index information that is created by a sharing terminal and that is of a to-be-shared photo.

The sharing terminal includes at least one of the first terminal or a third terminal in the sharing group. The sharing terminal needing to share a photo in the photo sharing group creates the first index information according to the to-be-shared photo. The first terminal may obtain the first index information created by the sharing terminal in the photo sharing group.

It should be noted that, the third terminal may be one or more terminals in the photo sharing group, and corresponding to the sharing terminal in the photo sharing group, the first index information includes one or more pieces of index information. If the sharing terminal includes the first terminal, that the first terminal obtains the first index information that is created by the sharing terminal and that is of the to-be-shared photo may include: The first terminal determines a directory of a to-be-shared photo of the first terminal, and creates third index information according to the photo directory, where the third index information includes photo information and the address information of the first terminal, and the photo information includes a quantity of the to-be-shared photos, an ID of each photo, and a path of each photo; and the first terminal obtains the third index information. When the sharing terminal includes the first terminal, for specific details, refer to a specific process in the embodiment shown in FIG. 3.

If the sharing terminal includes the third terminal, that the first terminal obtains the first index information that is created by the sharing terminal and that is of the to-be-shared photo includes: The first terminal obtains fourth index information created by the third terminal in the sharing group, where the fourth index information includes photo information and address information of the third terminal, and the photo information includes a quantity of to-be-shared photos, an ID of each photo, and a path of each photo.

606: The first terminal segments the first index information into N pieces of second index information, and respectively allocates the N pieces of second index information to N processing terminals.

In this embodiment, a fourth terminal includes the first terminal. After obtaining the first index information, the first terminal segments the first index information to obtain N pieces of second index information, and allocates the second index information to the N processing terminals in the photo sharing group, where the processing terminals include the fourth terminal in the sharing group, or the fourth terminal and the first terminal, and N≥2.

In this embodiment, the second index information includes photo information and address information of the sharing terminal, and the photo information includes a quantity of photos, an ID of each photo, and a path of each photo.

For an implementation manner in which the first terminal segments the first index information to obtain the second index information, and allocates the second index information to the photo sharing group, refer to the implementation method in the embodiments shown in FIG. 4 and FIG. 5, and details are not described herein again.

607: The first terminal sends the user portrait information and the address information of the second terminal to the processing terminals.

The first terminal sends the user portrait information and the address information of the second terminal to the processing terminals, so that the processing terminals may perform facial recognition on the corresponding photo in the second index information according to the second index information and the user portrait information of the second terminal, to determine a photo matching the user portrait information of the second terminal, and send the photo to the second terminal. When there is only one second terminal, the processing terminals determine a photo matching user portrait information of the second terminal and send the photo to the second terminal; and when there are multiple second terminals, the processing terminals determine a photo matching user portrait information of each second terminal and send the photo to the corresponding terminal.

It should be noted that, in this embodiment, the first terminal may directly send the user portrait information and the address information of the second terminal to the processing terminals; or after receiving requests that are sent by the processing terminals and that are of obtaining the user portrait information and the address information of the second terminal, the first terminal sends the user portrait information and the address information of the second terminal to the processing terminals, which is not specifically limited herein.

608: The first terminal performs facial recognition on a corresponding to-be-shared photo in the second index information according to the allocated second index information and the user portrait information of the second terminal, to determine a photo matching the user portrait information of the second terminal.

In this embodiment, the processing terminal includes the first terminal; therefore, the first terminal also allocates the second index information to the first terminal, and the first terminal performs facial recognition on the corresponding photo in the second index information according to the second index information allocated to the first terminal and the user portrait information of the second terminal, to determine the photo matching the user portrait information of the second terminal.

In this embodiment, that the first terminal performs facial recognition on the corresponding to-be-shared photo in the second index information according to the allocated second index information and the user portrait information of the second terminal, to determine the photo matching the user portrait information of the second terminal may include:

(1) The first terminal obtains a task photo copy from the sharing terminal according to the allocated second index information.

Because the allocated second index information includes the photo information and the address information of the sharing terminal, and the photo information includes a quantity of photos, an ID of each photo, and a path of each photo, the first terminal may determine, according to the second index information allocated to the first terminal, a photo that the first terminal needs to analyze, and learn a photo source terminal of each to-be-shared photo, that is, a sharing terminal sharing the photo. There may be one or more sharing terminals, for example, the sharing terminal includes at least one of the first terminal or the third terminal. There may be multiple third terminals. After the address information of the sharing terminal is learned, the task photo copy may be obtained from the sharing terminal according to the address information of the sharing terminal in the index information.

(2) The first terminal performs facial recognition on each task photo copy according to the user portrait information of the second terminal, to determine a photo matching the user portrait information of the second terminal.

When the processing terminals include the first terminal, the first terminal also allocates the second index information to the first terminal, and the first terminal performs facial recognition on the corresponding photo in the second index information according to the second index information allocated to the first terminal and the user portrait information of the second terminal, to determine the photo matching the user portrait information of the second terminal. When there is only one second terminal, the first terminal determines a photo matching user portrait information of the second terminal; and when there are multiple second terminals, the first terminal determines a photo matching user portrait information of each second terminal.

The foregoing uses an example in which the first terminal obtains the task photo copy from the sharing terminal. The obtained task photo copy may be a thumbnail or a compressed picture of the photo. It should be noted that, in a case in which a network transmission speed is fast, and the terminal processing capability and the storage capability are sufficient, an original photo may be obtained for facial recognition, which is not limited herein.

(3) The first terminal sends the photo matching the user portrait information of the second terminal to the second terminal according to the address information of the second terminal.

When there is only one second terminal, a photo matching user portrait information of the second terminal is determined and is sent to the second terminal; and when there are multiple second terminals, a photo matching user portrait information of each second terminal is determined and is sent to the corresponding terminal.

It should be noted that, the first terminal may further send a photo that does not match the user portrait information of the second terminal to the second terminal. When there is one second terminal, the first terminal sends a photo that does not match user portrait information of the second terminal to the second terminal; and when there are multiple second terminals, the first terminal separately sends a photo that does not match user portrait information of any one of the second terminals to the multiple second terminals, which is not specifically limited herein.

609: The first terminal sends the photo matching the user portrait information of the second terminal to the second terminal according to the address information of the second terminal.

When there is only one second terminal, the first terminal sends a photo matching user portrait information of the second terminal to the second terminal; and when there are multiple second terminals, the first terminal sends a photo matching user portrait information of each second terminal to the corresponding terminal.

In this embodiment, after the photo sharing group is created, a terminal (for example, the first terminal) sharing a photo may directly send all to-be-shared photos to the second terminal in the photo sharing group and does not consider whether the photos match the second terminal.

The first terminal in the present disclosure may be referred to as a 'master (master) terminal', and the second terminal, the third terminal, and the fourth terminal in the present disclosure may be one or more 'slave (slave) terminals'.

In this embodiment, a terminal in a photo sharing group performs facial recognition on a to-be-shared photo of each terminal, determines a terminal corresponding to the to-be-shared photo, and delivers the photo to the corresponding terminal. Because a terminal joining a photo sharing group may automatically perform facial recognition on a photo needing to be shared in the sharing group, and intelligently distribute the photo to a corresponding terminal, each terminal may obtain a photo required by the terminal, so that photos can be intelligently distributed, which is convenient, fast, and efficient.

Second, in this embodiment, the first terminal also participates in facial recognition, so that image analysis on the to-be-shared photo is performed faster.

Figure 7:
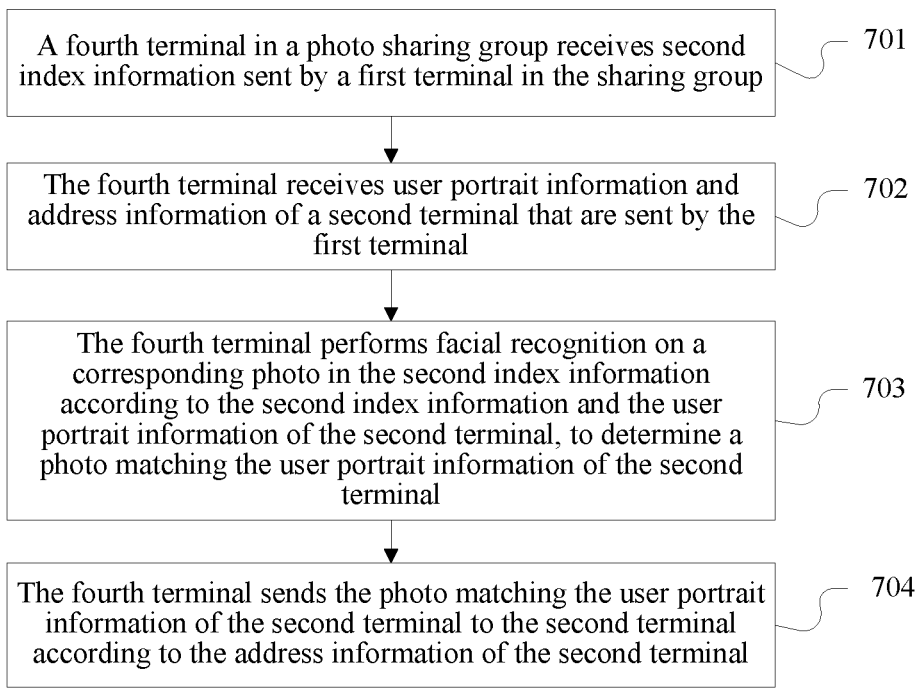
FIG. 7 is a schematic diagram of another embodiment of a photo distribution method according to an embodiment of the present disclosure.

The following describes the photo distribution method in the embodiments of the present disclosure on another side (a fourth terminal side). Referring to FIG. 7, another embodiment of a photo distribution method according to an embodiment of the present disclosure includes the following steps.

701: A fourth terminal in a photo sharing group receives second index information sent by a first terminal in the sharing group.

In the embodiments shown in FIG. 1 to FIG. 6, after obtaining first index information created by a sharing terminal in the photo sharing group, the first terminal segments the first index information into N pieces of second index information, and respectively allocates the second index information to N processing terminals in the photo sharing group. The processing terminals include the fourth terminal in the sharing group, and the second index information is a part of the first index information of a to-be-shared photo, that is, the second index information is one of N pieces of second index information obtained after the first index information is segmented.

702: The fourth terminal receives user portrait information and address information of a second terminal that are sent by the first terminal.

After sending the second index information to the fourth terminal, the first terminal sends the user portrait information and the address information of the second terminal to the fourth terminal.

703: The fourth terminal performs facial recognition on a corresponding photo in the second index information according to the second index information and the user portrait information of the second terminal, to determine a photo matching the user portrait information of the second terminal.

The fourth terminal performs facial recognition according to the second index information allocated by the first terminal to the first terminal and the user portrait information of the second terminal, to determine the photo matching the user portrait information of the second terminal. When there is only one second terminal, the first terminal determines a photo matching user portrait information of the second terminal; and when there are multiple second terminals, the first terminal separately determines a photo matching user portrait information of each second terminal.

704: The fourth terminal sends the photo matching the user portrait information of the second terminal to the second terminal according to the address information of the second terminal.

When there is only one second terminal, the first terminal sends a photo matching user portrait information of the second terminal to the second terminal; and when there are multiple second terminals, the first terminal sends a photo matching user portrait information of each second terminal to the corresponding terminal.

In this embodiment, the fourth terminal performs facial recognition according to the second index information allocated by the first terminal, so that photos can be intelligently distributed, which is simple, fast, and efficient.

Figure 8:
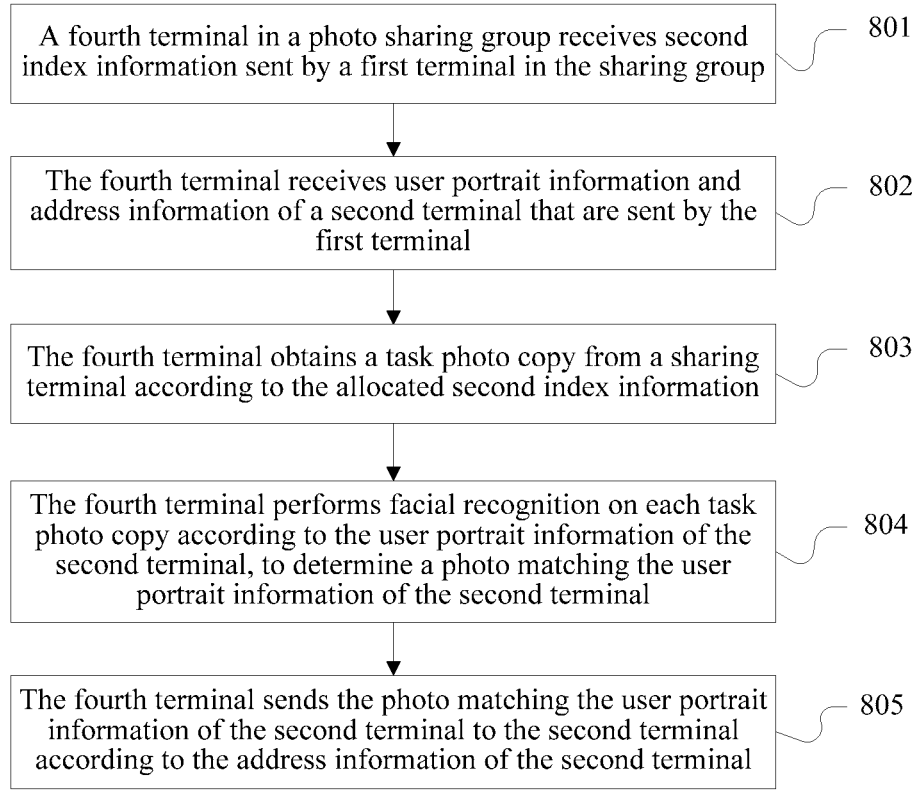
FIG. 8 is a schematic diagram of another embodiment of a photo distribution method according to an embodiment of the present disclosure.

In the embodiment shown in FIG. 7, there may be multiple implementation manners in which the first terminal performs facial recognition according to the second index information and the user portrait information of the second terminal, to determine the photo matching the user portrait information of the second terminal. The following gives a detailed description with reference to a specific embodiment. Referring to FIG. 8, another embodiment of a photo distribution method according to an embodiment of the present disclosure includes the following steps

801: A fourth terminal in a photo sharing group receives second index information sent by a first terminal in the sharing group.

In the embodiments shown in FIG. 1 to FIG. 6, after obtaining first index information created by a sharing terminal in the photo sharing group, the first terminal segments the first index information into N pieces of second index information, and respectively allocates the second index information to N processing terminals in the photo sharing group. The processing terminals include the fourth terminal in the sharing group, and the second index information is a part of the first index information of a to-be-shared photo, that is, the second index information is one of N pieces of second index information obtained after the first index information is segmented.

In this embodiment, the second index information includes photo information and address information of the sharing terminal, and the photo information includes a quantity of photos, an ID of each photo, and a path of each photo.

802: The fourth terminal receives user portrait information and address information of a second terminal that are sent by the first terminal.

After sending the second index information to the fourth terminal, the first terminal sends the user portrait information and the address information of the second terminal to the fourth terminal.

The first terminal can obtain the user portrait information and the address information of the second terminal in the sharing group. A manner of sending, by the first terminal, the user portrait information and the address information of the second terminal to the fourth terminal may be: The first terminal directly sends the user portrait information and the address information of the second terminal to the fourth terminal; or the fourth terminal sends a request of obtaining the user portrait information and the address information of the second terminal to the first terminal, and the second terminal sends the user portrait information and the address information of the second terminal to the fourth terminal, which is not specifically limited herein.

In this embodiment, the address information may be IP address information or MAC address information, which is not limited herein.

803: The fourth terminal obtains a task photo copy from a sharing terminal according to the allocated second index information.

Because the allocated second index information includes the photo information and the address information of the sharing terminal and the photo information includes the quantity of photos, the ID of each photo, and the path of each photo, the fourth terminal may learn, according to the second index information allocated by the first terminal, a sharing terminal of each photo needing to be shared, and obtain the task photo copy from the sharing terminal according to the address information of the sharing terminal in the index information.

804: The fourth terminal performs facial recognition on each task photo copy according to the user portrait information of the second terminal, to determine a photo matching the user portrait information of the second terminal.

The fourth terminal performs facial recognition on each task photo copy according to the user portrait information of the second terminal, to determine the photo matching the user portrait information of the second terminal. When there is only one second terminal, the fourth terminal determines a photo matching user portrait information of the second terminal; and when there are multiple second terminals, the fourth terminal separately determines a photo matching user portrait information of each second terminal.

This embodiment uses an example in which the fourth terminal obtains the task photo copy from the sharing terminal. The obtained task photo copy may be a thumbnail or a compressed picture of the photo. It should be noted that, in a case in which a network transmission speed is fast, and a terminal processing capability and a storage capability are sufficient, an original photo may be obtained for facial recognition, which is not limited herein.

805: The fourth terminal sends the photo matching the user portrait information of the second terminal to the second terminal according to the address information of the second terminal.

When there is only one second terminal, the first terminal sends a photo matching user portrait information of the second terminal to the second terminal; and when there are multiple second terminals, the first terminal sends a photo matching user portrait information of each second terminal to the corresponding terminal.

It should be noted that, the fourth terminal may further send a photo that does not match the user portrait information of the second terminal to the second terminal. When there is one second terminal, the fourth terminal sends a photo that does not match user portrait information of the second terminal to the second terminal; and when there are multiple second terminals, the fourth terminal separately sends a photo that does not match user portrait information of any one of the second terminals to the multiple second terminals, which is not specifically limited herein.

In this embodiment, after the photo sharing group is created, a terminal (for example, the first terminal) sharing a photo may directly send all to-be-shard photos to the second terminal in the photo sharing group and does not consider whether the photos match the second terminal.

The first terminal in the present disclosure may be referred to as a 'master (master) terminal', and the second terminal, the third terminal, and the fourth terminal in the present disclosure may be one or more 'slave (slave) terminals'.

In this embodiment, the fourth terminal performs facial recognition according to the second index information allocated by the first terminal, so that photos can be intelligently distributed, which is simple, fast, and efficient. Second, that the fourth terminal performs image matching analysis is described in detail, so that implementation manners are more diversified.

For the convenience of understanding, the following embodiment describes, in detail by using a specific application scenario, the photo distribution method described in the foregoing embodiment. Specifically:

A user A, a user B, and a user C going traveling each take a terminal, namely, a terminal A, a terminal B, and a terminal C. During traveling, the user A, the user B, and the user C take many photos respectively by using the terminal A, the terminal B, and the terminal C. During photo sharing, a photo sharing group is created by means of the terminal A, a name "travel sharing" is set for the sharing group, a group avatar is further set, and the group name and the avatar are notified to the user B and the user C.

The terminal B and the terminal C may search for a nearby photo sharing group according to the positioning apparatuses, find the photo sharing group created by the terminal A, in a search result list of photo sharing groups according to the group name and the avatar, and click to join the photo sharing group. In this case, the terminal B and the terminal C send requests of joining the photo sharing group to the terminal A, and the terminal A separately returns a joining agreement response message to the terminal B and the terminal C. In this case, the terminal B and the terminal C join the photo sharing group.

Alternatively, the terminal A generates a two-dimensional barcode according to group information, for example, the group name. The terminal A sends, by using a network or various instant messaging tools, the generated two-dimensional barcode to the terminal B and the terminal C for scanning, or presents, on a network, the two-dimensional barcode to the terminal B and the terminal C for scanning, or the user A, the user B, and the user C gather together, and the terminal A presents the two-dimensional barcode to the terminal B and the terminal C for scanning. After scanning, in any one of the foregoing manners, the two-dimensional barcode generated by the terminal A, the terminal B and the terminal C send requests of joining the photo sharing group to the terminal A, and the terminal A separately returns a joining agreement response message to the terminal B and the terminal C. In this case, the terminal B and the terminal C join the photo sharing group.

It is assumed that the terminal A first obtains user portrait information and IP address information of all terminals in the photo sharing group. The terminal A obtains user portrait information and IP address information of the terminal B and the terminal C. A manner of obtaining, by the terminal A, the user portrait information and the IP address information of the terminal B and the terminal C in the photo sharing group may be: After joining the photo sharing group, the terminal B and the terminal C directly send the user portrait information and the IP address information of the terminal B and the terminal C to the terminal A; or after the terminal B and the terminal C join the photo sharing group, the terminal A sends requests of obtaining the user portrait information and the IP address information of the terminal B and the terminal C to the terminal B and the terminal C, and the terminal B and the terminal C sends the user portrait information and the IP address information of the terminal B and the terminal C to the terminal A, which is not specifically limited herein.

It is assumed that the terminal A, the terminal B, and the terminal C all have to-be-shred photos (that is, the sharing terminal in the foregoing embodiment includes the terminal A, the terminal B, and the terminal C). In this case, the terminal A, the terminal B, and the terminal C respectively create index information A, index information B, and index information C according to the to-be-shared photos. Each piece of index information includes IP address information of the terminal and photo information, and the photo information includes a quantity of to-be-shared photos, an ID of a photo, and a path of a photo.

In this case, the terminal B and the terminal C send the created index information B and index information C to the terminal A. The terminal A performs segmentation according to the received index information B, the received index information C, and the index information A that is obtained from the terminal A. A segmentation policy may be: each piece of index information is segmented according to the quantity of photos in the index information, that is, the index information A, the index information B, and the index information C are separately segmented, or the three pieces of index information are segmented once.

A specific segmentation manner may be: the index information is segmented according to a quantity of terminals that can perform image analysis in the three terminals. For example, if the three terminals all participate in segmentation, the index information is segmented into three pieces. The segmentation may be performed equally according to a quantity of photos. For example, if the quantity of photos in the index information is 90, the index information is segmented equally, to obtain three pieces of index information, where a quantity of photos in each piece of index information is 30. If segmentation is performed once, assuming that the quantity of photos in the index information A is 90, the quantity of photos in the index information B is 60, and the quantity of photos in the index information C is 30, the terminal A performs segmentation according to (30+60+90)/3=60, and allocates index information including an analysis task of 60 photos to each terminal in the photo sharing group.

The index information may be segmented according to a terminal processing capability. For example, before segmentation, the terminal B and the terminal C sends CPU processing capability information (for example, one or more of a memory size, a remaining quantity of electric charge, or a size of storage space) of the terminal B and the terminal C to the terminal A, and the terminal A determines, according to a preset determining standard, quantities of photos that can be processed by the terminal B and the terminal C (for example, if the memory size is 2 GB, and 80% of electric charge remains, a maximum of 100 photos can be processed). The terminal A may determine a quantity of photos that can be processed by the terminal A. The terminal A allocates the index information according to the processing capabilities of the three terminals. When a total quantity of photos that can be processed by the three terminals exceeds a total quantity of photos to be shared by the three terminals, segmentation may be performed on the three pieces of index information once. If the three terminals each can process a maximum of 90 photos, during allocation of the index information, an analysis task of 60 photos are allocated to each terminal. When the total quantity of photos that can be processed by the three terminals does not exceed the total quantity of photos to be shared by the three terminals, three pieces of index information may be segmented separately. For example, after the index information A is segmented equally, the index information is allocated to each terminal, and the terminal performs image analysis on the allocated index information; then, the index information B and the index information C are segmented sequentially.

It is assumed that all terminals in the photo sharing group participate in the image analysis task (that is, the processing terminals in the foregoing embodiment include the terminal A, the terminal B, and the terminal C). The terminal A sends the obtained user portrait information and IP address information of the terminal A and the terminal B to the terminal C, and sends the obtained user portrait information and IP address information of the terminal A and the terminal C to the terminal B. The terminal A may send the user portrait information and the IP address information actively, or may send the user portrait information and the IP address information after receiving a request of the terminal B or the terminal C, which is not specifically limited herein.

The following describes that the terminal B performs image analysis. After receiving the user portrait information and the IP address information of the terminal A and the terminal C, the terminal B performs image analysis according to index information allocated by the terminal A. Image analysis steps may be:

The allocated index information is created by the terminal A. The terminal may determine a to-be-analyzed photo according to the allocated index information, and obtain a photo copy of each photo from a photo source terminal (the terminal A), where the photo copy may be a thumbnail or a compressed picture of the photo. The terminal B performs facial image matching analysis on each task photo copy according to the user portrait information of the terminal A, the terminal B, and the terminal C (the second terminal in the foregoing embodiment includes the terminal A, the terminal B, and the terminal C), to determine a photo matching the user portrait information of each of the terminal A, the terminal B, and the terminal C, and respectively sends the photos of the terminal A and the terminal C to the terminal A and the terminal C by using the IP address information of the terminal A and the terminal C. At the same time, the terminal B obtains a photo matching the user portrait information of the terminal B. Preferably, the terminal B may send a photo (for example, a landscape photo or a photo of a passerby) that does not match any one of the terminal A, the terminal B, or the terminal C to the terminal A and the terminal C, and the terminal B may also obtain the photo.

Figure 9:
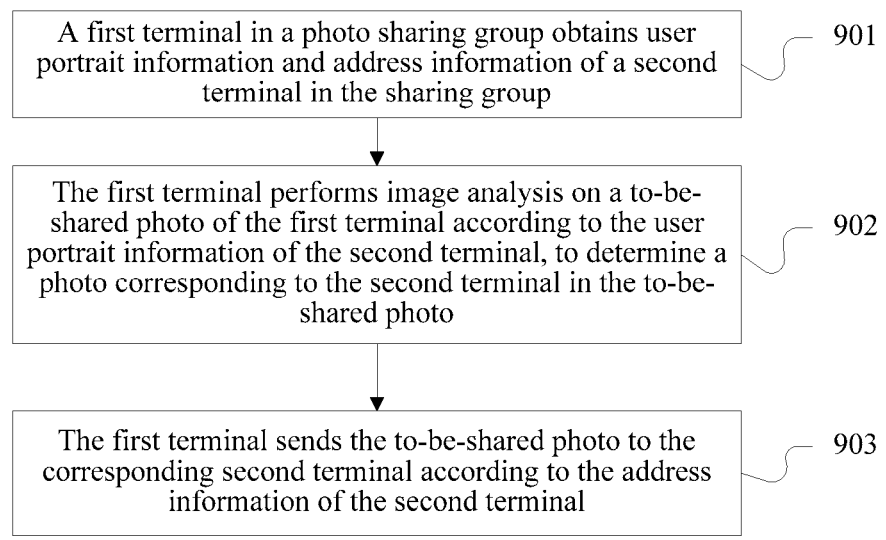
FIG. 9 is a schematic diagram of another embodiment of a photo distribution method according to an embodiment of the present disclosure.

The embodiments shown in FIG. 1 to FIG. 8 describe the photo distribution method in the present disclosure from the perspective that image analysis is performed in a distributed manner. The following describes the photo distribution method in the present disclosure from the perspective that image analysis is performed in an undistributed manner. Referring to FIG. 9, another embodiment of a photo distribution method according to an embodiment of the present disclosure includes the following steps

901: A first terminal in a photo sharing group obtains user portrait information and address information of a second terminal in the sharing group.

When friends or colleagues go traveling, they separately take many photos by using terminals. When people want to obtain respective photos, they join a same created photo sharing group, the terminals joining the photo sharing group can send information to and receive information from each other, and the first terminal in the photo sharing group can obtain the user portrait information and the address information of the second terminal in the sharing group.

A manner of obtaining, by the first terminal, the user portrait information and the address information of the second terminal in the photo sharing group may be: After joining the photo sharing group, the second terminal directly sends the user portrait information and the address information of the second terminal to the first terminal; or after the second terminal joins the photo sharing group, the first terminal sends a request of obtaining the user portrait information and the address information of the second terminal to the second terminal, and the second terminal sends the user portrait information and the address information of the second terminal to the first terminal, which is not specifically limited herein.

The user portrait information of the second terminal may be a photo including a facial image of a user, where the photo of the facial image of the user may be an avatar that is set by the user in the photo sharing group by using a terminal. When the photo of the facial image of the user is an avatar that is set by the user in the photo sharing group by using the terminal, the first terminal may prompt the second terminal to set a user avatar including the facial image, and after the second terminal completes the setting, the first terminal directly obtains the user avatar including the facial image.

In an actual application, the portrait information of the second terminal may be a facial image, taken by the second terminal, of the user, and the taken facial image is sent to the first terminal, which is not specifically limited herein.

902: The first terminal performs image analysis on a to-be-shared photo of the first terminal according to the user portrait information of the second terminal, to determine a photo corresponding to the second terminal in the to-be-shared photo.

In this embodiment, the first terminal has a photo to be shared. After the first terminal determines the to-be-shared photo of the first terminal, the first terminal performs image analysis on the to-be-shared photo of the first terminal according to the user portrait information of the second terminal, to determine the photo corresponding to the second terminal in the to-be-shared photo. In this embodiment, when there is only one second terminal, the first terminal determines a photo matching user portrait information of the second terminal; and when there are multiple second terminals, the first terminal determines a photo matching user portrait information of each second terminal.

903: The first terminal sends the to-be-shared photo to the corresponding second terminal according to the address information of the second terminal.

The first terminal obtains the address information of the second terminal. When there is only one second terminal, the first terminal sends a photo matching user portrait information of the second terminal in the to-be-shared photo to the second terminal according to address information of the second terminal; and when there are multiple second terminals, the first terminal sends a photo matching user portrait information of each second terminal in the to-be-shared photo to the corresponding terminal according to address information of the second terminal.

In this embodiment of the present disclosure, a terminal performs image analysis on a to-be-shared photo of the terminal, determines a second terminal corresponding to the to-be-shared photo, and delivers the photo to the second terminal. Because a first terminal in a photo sharing group may automatically perform image analysis on a photo needing to be shared in the sharing group, and intelligently distribute the photo to a corresponding terminal, each terminal may obtain a photo required by the terminal, so that photos can be intelligently distributed, which is convenient, fast, and efficient.

Figure 10:
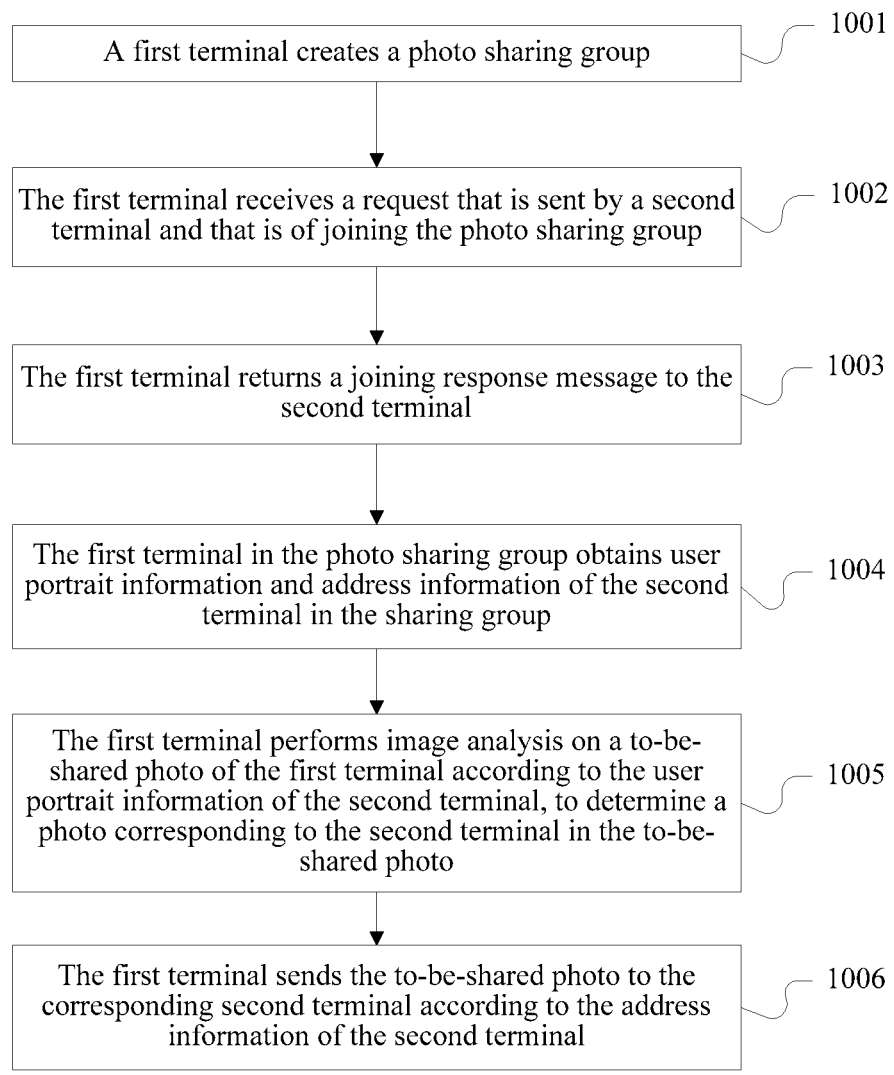
FIG. 10 is a schematic diagram of another embodiment of a photo distribution method according to an embodiment of the present disclosure.

In the embodiment shown in FIG. 1, before a first terminal in a photo sharing group obtains address information of a second terminal in a sharing group, the first terminal may create the photo sharing group, and another terminal needing to share a photo joins the photo sharing group. The following gives a description by using a specific embodiment. Referring to FIG. 10, another embodiment of a photo distribution method according to an embodiment of the present disclosure includes the following steps

1001: A first terminal creates a photo sharing group.

The first terminal may be a terminal of any one of people going traveling. The first terminal creates the photo sharing group. Distinguishing information such as a name or a group avatar may be set for the photo sharing group. The photo sharing group may be presented on a network according to location information of the first terminal, so that another terminal obtains the photo sharing group by means of searching on the network or by searching for a nearby photo sharing group, which is not specifically limited herein.

In this embodiment, when creating the photo sharing group, the first terminal may further establish a Wi-Fi hotspot, so that after joining the photo sharing group, another terminal connects to the Wi-Fi hotspot, to form a local area network.

It should be noted that, when creating the photo sharing group, the first terminal creates a temporary buffer at the same time, to save information in the photo sharing group, for example, user portrait information and an IP address of a terminal in the photo sharing group, which is not limited herein.

1002: The first terminal receives a request that is sent by a second terminal and that is of joining the photo sharing group.

After the first terminal creates the photo sharing group, another terminal needing to share a photo or the second terminal needing to obtain a photo sends a request of joining the photo sharing group to the first terminal. A manner of sending, by the second terminal, the request may be: The second terminal scans a two-dimensional barcode, generated by the first terminal, of the photo sharing group, and after scanning the two-dimensional barcode, the second terminal sends the request of joining the photo sharing group to the first terminal; or in an actual application, the second terminal obtains the photo sharing group by means of searching on the network according to information such as the name or the group avatar of the photo sharing group, and clicks to join the photo sharing group, that is, the second terminal sends the request of joining the photo sharing group to the first terminal; or the second terminal searches for a nearby photo sharing group according to a positioning apparatus in the terminal, and after finding the photo group, clicks to join the photo sharing group, that is, the second terminal sends the request of joining the photo sharing group to the first terminal. A specific manner of sending, by the second terminal, the request of joining the photo sharing group to the first terminal is not specifically limited.

It should be noted that, the second terminal may be one or more terminals in the photo sharing group, which is not specifically limited herein.

1003: The first terminal returns a joining response message to the second terminal.

After receiving the request that is sent by the second terminal and that is of joining the photo sharing group, the first terminal returns the joining response message to the second terminal, where the response message includes address information of the first terminal. In this case, it indicates that the first terminal already agrees that the second terminal joins the photo sharing group. In an actual application, to avoid that an irrelevant terminal joins the photo sharing group, the response message may be joining rejection information. The first terminal judges the received request of joining the photo sharing group, to determine whether the second terminal is a terminal sharing a photo; if yes, the first terminal returns a joining agreement response message; and if not, the first terminal returns a joining rejection response message, which is not limed herein. If there are multiple second terminals, the first terminal separately sends the response message including the address information of the first terminal to the multiple second terminals.

If the first terminal establishes a Wi-Fi hotspot when creating the photo sharing group in step 1001, after receiving the response message sent by the first terminal, the second terminal may connect to the Wi-Fi hotspot, to form a local area network with the first terminal.

It should be noted that, step 1001 to step 1003 describe a process in which the first terminal creates the photo sharing group and each terminal joins the photo group. The photo sharing group may be created by another terminal, and the first terminal sends a request of joining the photo sharing group to the terminal creating the photo sharing group. After receiving the request, the terminal creating the photo sharing group returns a joining response message, and the first terminal joins the photo sharing group. Manners of sending the request and returning the joining response are similar to step 1002 and step 1003, and details are not described herein again.

1004: The first terminal in the photo sharing group obtains user portrait information and address information of the second terminal in the sharing group.

When friends or colleagues go traveling, they separately take many photos by using terminals. When people want to obtain respective photos, they join a same created photo sharing group, the terminals joining the photo sharing group can send information to and receive information from each other, and the first terminal in the photo sharing group can obtain the user portrait information and the address information of the second terminal in the sharing group.

A manner of obtaining, by the first terminal, the user portrait information and the address information of the second terminal in the photo sharing group may be: After joining the photo sharing group, the second terminal directly sends the user portrait information and the address information of the second terminal to the first terminal; or after the second terminal joins the photo sharing group, the first terminal sends a request of obtaining the user portrait information and the address information of the second terminal to the second terminal, and the second terminal sends the user portrait information and the address information of the second terminal to the first terminal, which is not specifically limited herein.

The user portrait information of the second terminal may be a photo including a facial image of a user, where the photo of the facial image of the user may be an avatar that is set by the user in the photo sharing group by using a terminal. When the photo of the facial image of the user is an avatar that is set by the user in the photo sharing group by using the terminal, the first terminal may prompt the second terminal to set a user avatar including the facial image, and after the second terminal completes the setting, the first terminal directly obtains the user avatar including the facial image.

In an actual application, the portrait information of the second terminal may be a facial image, taken by the second terminal, of the user, and the taken facial image is sent to the first terminal, which is not specifically limited herein.

In this embodiment, the user portrait information and the address information of the second terminal may be obtained by means of NFC, an acoustic wave, or the like, which is not limited herein.

1005: The first terminal performs image analysis on a to-be-shared photo of the first terminal according to the user portrait information of the second terminal, to determine a photo corresponding to the second terminal in the to-be-shared photo.

In this embodiment, the first terminal has a photo to be shared. After the first terminal determines the to-be-shared photo of the first terminal, the first terminal performs image analysis on the to-be-shared photo of the first terminal according to the user portrait information of the second terminal, to determine the photo corresponding to the second terminal in the to-be-shared photo. In this embodiment, when there is only one second terminal, the first terminal determines a photo matching user portrait information of the second terminal; and when there are multiple second terminals, the first terminal determines a photo matching user portrait information of each second terminal.

1006: The first terminal sends the to-be-shared photo to the corresponding second terminal according to the address information of the second terminal.

The first terminal obtains the address information of the second terminal. When there is only one second terminal, the first terminal sends a photo matching user portrait information of the second terminal in the to-be-shared photo to the second terminal according to address information of the second terminal; and when there are multiple second terminals, the first terminal sends a photo matching user portrait information of each second terminal in the to-be-shared photo to the corresponding terminal according to address information of the second terminal.

In this embodiment, after the photo sharing group is created, a terminal (for example, the first terminal) sharing a photo may directly send all to-be-shard photos to the second terminal in the photo sharing group and does not consider whether the photos match the second terminal.

The first terminal in the present disclosure may be referred to as a 'master (master) terminal', and the second terminal in the present disclosure may be one or more 'slave (slave) terminals'.

In this embodiment of the present disclosure, a terminal performs image analysis on a to-be-shared photo of the terminal, determines a second terminal corresponding to the to-be-shared photo, and delivers the photo to the corresponding terminal. Because a first terminal in a photo sharing group may automatically perform image analysis on a photo needing to be shared in the sharing group, and intelligently distribute the photo to a corresponding terminal, each terminal may obtain a photo required by the terminal, so that photos can be intelligently distributed, which is convenient, fast, and efficient.

Second, a specific process in which the first terminal creates the photo sharing group is described in detail, so that the implementation manners are more diversified.

In this embodiment, the first terminal may further send a photo that does not correspond to the second terminal in the to-be-shared photo to the second terminal. When there is one second terminal, the first terminal sends a photo that does not correspond to the second terminal in the to-be-shared photo to the terminal; and when there are multiple second terminals, the first terminal separately sends a photo that does not correspond to any one of the second terminals to the multiple second terminals, which is not limited herein.

In the foregoing embodiment, there are multiple specific implementation manners in which the first terminal performs images analysis on the to-be-shared photo of the first terminal according to the user portrait information of the second terminal, to determine the photo corresponding to the second terminal in the to-be-shared photo. The following gives a detailed description with reference to a specific embodiment. Details are as follows:

1. A first terminal determines a directory of a to-be-shared photo of the terminal; performs image analysis on each photo in the photo directory to generate multiple photo sub-directories; places photos having a same facial feature in one photo sub-directory; generates one associated reference facial picture for each photo sub-directory; performs, according to user portrait information of a second terminal, image matching analysis on the associated reference facial pictures corresponding to the photo sub-directories; determines that a photo sub-directory matching the user portrait information of the second terminal is a photo sub-directory corresponding to the second terminal; and sends a photo in the photo sub-directory corresponding to the second terminal to the second terminal.

Figure 11:
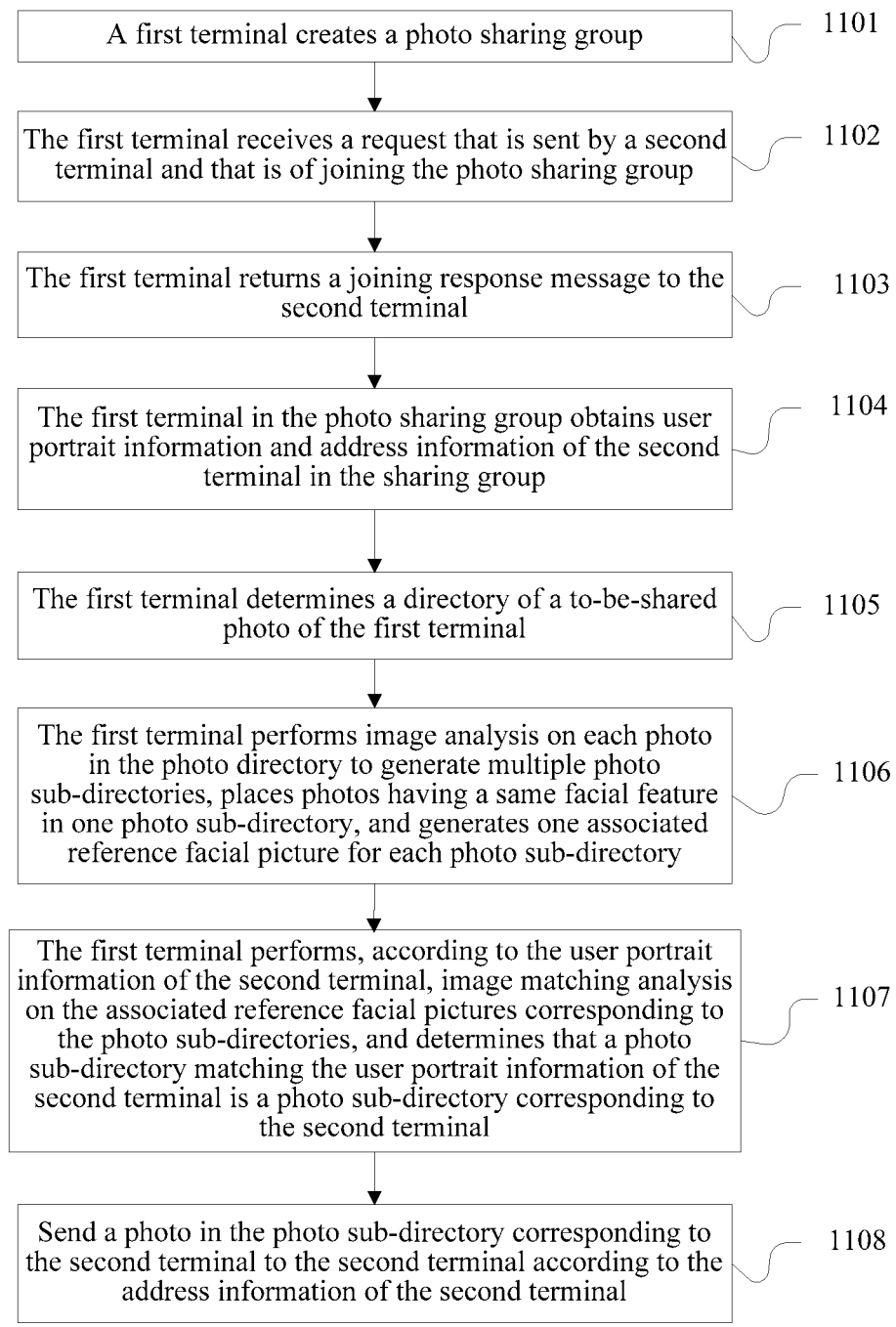
FIG. 11 is a schematic diagram of another embodiment of a photo distribution method according to an embodiment of the present disclosure.

Referring to FIG. 11, another embodiment of a photo distribution method according to an embodiment of the present disclosure includes the following steps

1101: A first terminal creates a photo sharing group.

The first terminal may be a terminal of any one of people going traveling. The first terminal creates the photo sharing group. Distinguishing information such as a name or a group avatar may be set for the photo sharing group. The photo sharing group may be presented on a network according to location information of the first terminal, so that another terminal obtains the photo sharing group by means of searching on the network or by searching for a nearby photo sharing group, which is not specifically limited herein.

In this embodiment, when creating the photo sharing group, the first terminal may further establish a Wi-Fi hotspot, so that after joining the photo sharing group, another terminal connects to the Wi-Fi hotspot, to form a local area network.

It should be noted that, when creating the photo sharing group, the first terminal creates a temporary buffer at the same time, to save information in the photo sharing group, for example, user portrait information and an IP address of a terminal in the photo sharing group, which is not limited herein.

1102: The first terminal receives a request that is sent by a second terminal and that is of joining the photo sharing group.

After the first terminal creates the photo sharing group, another terminal needing to share a photo or the second terminal needing to obtain a photo sends a request of joining the photo sharing group to the first terminal. A manner of sending, by the second terminal, the request may be: The second terminal scans a two-dimensional barcode, generated by the first terminal, of the photo sharing group, and after scanning the two-dimensional barcode, the second terminal sends the request of joining the photo sharing group to the first terminal; or in an actual application, the second terminal obtains the photo sharing group by means of searching on the network according to information such as the name or the group avatar of the photo sharing group, and clicks to join the photo sharing group, that is, the second terminal sends the request of joining the photo sharing group to the first terminal; or the second terminal searches for a nearby photo sharing group according to a positioning apparatus in the terminal, and after finding the photo group, clicks to join the photo sharing group, that is, the second terminal sends the request of joining the photo sharing group to the first terminal. A specific manner of sending, by the second terminal, the request of joining the photo sharing group to the first terminal is not specifically limited.

It should be noted that, the second terminal may be one or more terminals in the photo sharing group, which is not specifically limited herein.

1103: The first terminal returns a joining response message to the second terminal.

After receiving the request that is sent by the second terminal and that is of joining the photo sharing group, the first terminal returns the joining response message to the second terminal, where the response message includes address information of the first terminal. In this case, it indicates that the first terminal already agrees that the second terminal joins the photo sharing group. In an actual application, to avoid that an irrelevant terminal joins the photo sharing group, the response message may be joining rejection information. The first terminal judges the received request of joining the photo sharing group, to determine whether the second terminal is a terminal sharing a photo; if yes, the first terminal returns a joining agreement response message; and if not, the first terminal returns a joining rejection response message, which is not limed herein. If there are multiple second terminals, the first terminal separately sends the response message including the address information of the first terminal to the multiple second terminals.

If the first terminal establishes a Wi-Fi hotspot when creating the photo sharing group in step 1101, after receiving the response message sent by the first terminal, the second terminal may connect to the Wi-Fi hotspot, to form a local area network with the first terminal.

It should be noted that, step 1101 to step 1103 describe a process in which the first terminal creates the photo sharing group and each terminal joins the photo group. The photo sharing group may be created by another terminal, and the first terminal sends a request of joining the photo sharing group to the terminal creating the photo sharing group. After receiving the request, the terminal creating the photo sharing group returns a joining response message, and the first terminal joins the photo sharing group. Manners of sending the request and returning the joining response are similar to step 1102 and step 1103, and details are not described herein again.

1104: The first terminal in the photo sharing group obtains user portrait information and address information of the second terminal in the sharing group.

When friends or colleagues go traveling, they separately take many photos by using terminals. When people want to obtain respective photos, they join a same created photo sharing group, the terminals joining the photo sharing group can send information to and receive information from each other, and the first terminal in the photo sharing group can obtain the user portrait information and the address information of the second terminal in the sharing group.

A manner of obtaining, by the first terminal, the user portrait information and the address information of the second terminal in the photo sharing group may be: After joining the photo sharing group, the second terminal directly sends the user portrait information and the address information of the second terminal to the first terminal; or after the second terminal joins the photo sharing group, the first terminal sends a request of obtaining the user portrait information and the address information of the second terminal to the second terminal, and the second terminal sends the user portrait information and the address information of the second terminal to the first terminal, which is not specifically limited herein.

In this embodiment, the user portrait information and the address information of the second terminal may be obtained by means of NFC, an acoustic wave, or the like, which is not limited herein.

The user portrait information of the second terminal may be a photo including a facial image of a user, where the photo of the facial image of the user may be an avatar that is set by the user in the photo sharing group by using a terminal. When the photo of the facial image of the user is an avatar that is set by the user in the photo sharing group by using the terminal, the first terminal may prompt the second terminal to set a user avatar including the facial image, and after the second terminal completes the setting, the first terminal directly obtains the user avatar including the facial image.

In this embodiment, the user portrait information and the address information of the second terminal may be obtained by means of NFC, an acoustic wave, or the like, which is not limited herein.

In an actual application, the portrait information of the second terminal may be a facial image, taken by the second terminal, of the user, and the taken facial image is sent to the first terminal, which is not specifically limited herein.

1105: The first terminal determines a directory of a to-be-shared photo of the first terminal.

The first terminal has a to-be-shared photo, and may determine the directory of the to-be-shared photo of the first terminal.

1106: The first terminal performs image analysis on each photo in the photo directory to generate multiple photo sub-directories, places photos having a same facial feature in one photo sub-directory, and generates one associated reference facial picture for each photo sub-directory.

After determining the directory of the to-be-shared photo of the first terminal, the first terminal performs image analysis, such as facial recognition or facial detection, on each picture in the photo directory, may determine whether a face recognized on the photo matches, generate a photo sub-directory for a photo matching the face recognized on the photo, place photos having a same facial feature in one photo sub-directory, and generate one associated reference facial picture for each photo sub-directory. When multiple faces are recognized on the photo, the photo may be placed in multiple corresponding photo sub-directories.

When the photo is a photo on which no facial image can be recognized, for example, a landscape photo, the first terminal may directly collect the photo and generate a photo sub-directory, which is not limited herein.

1107: The first terminal performs, according to the user portrait information of the second terminal, image matching analysis on the associated reference facial pictures corresponding to the photo sub-directories, and determines that a photo sub-directory matching the user portrait information of the second terminal is a photo sub-directory corresponding to the second terminal.

In this embodiment, the first terminal performs, according to the user portrait information of the second terminal, image matching analysis on the associated reference facial pictures corresponding to the photo sub-directories. When there is only one second terminal, the first terminal determines that a photo sub-directory corresponding to an associated reference facial picture matching user portrait information of the second terminal is a photo sub-directory corresponding to the second terminal; and when there are multiple second terminals, the first terminal separately determines that a photo sub-directory corresponding to user portrait information of each second terminal is a corresponding photo sub-directory.

1108: The first terminal sends a photo in the photo sub-directory corresponding to the second terminal to the second terminal according to the address information of the second terminal.

The first terminal obtains the address information of the second terminal. When there is only one second terminal, the first terminal sends a photo in a photo sub-directory matching user portrait information of the second terminal in the to-be-shared photo to the second terminal according to address information of the second terminal; and when there are multiple second terminals, the first terminal sends a photo in a photo sub-directory matching user portrait information of each second terminal in the to-be-shared photo to the corresponding terminal according to address information of the second terminal.

In this embodiment, when a photo sub-directory does not correspond to any one of the second terminals, the first terminal may send a photo in the photo sub-directory to the second terminal. When there is one second terminal, the first terminal sends the photo in the photo sub-directory to the terminal; and when there are multiple second terminals, the first terminal separately sends the photo in the photo sub-directory to the multiple second terminals, which is not limited herein.

In this embodiment, the address information may be IP address information or MAC address information, which is not limited herein.

In this embodiment, after the photo sharing group is created, a terminal (for example, the first terminal) sharing a photo may directly send all to-be-shard photos to the second terminal in the photo sharing group and does not consider whether the photos match the second terminal.

The first terminal in the present disclosure may be referred to as a 'master (master) terminal', and the second terminal, the third terminal, and the fourth terminal in the present disclosure may be one or more 'slave (slave) terminals'.

In this embodiment of the present disclosure, a terminal performs image analysis on a to-be-shared photo of the terminal, determines a second terminal corresponding to the to-be-shared photo, and delivers the photo to the corresponding terminal. Because a first terminal in a photo sharing group may automatically perform image analysis on a photo needing to be shared in the sharing group, and intelligently distribute the photo to a corresponding terminal, each terminal may obtain a photo required by the terminal, so that photos can be intelligently distributed, which is convenient, fast, and efficient.

Second, a specific process in which the first terminal performs image analysis on a to-be-shared photo of the first terminal, to determine a photo corresponding to the second terminal in the to-be-shared photo is described in detail, so that implementation manners are more diversified.

2. A first terminal determines a directory of a to-be-shared photo of the first terminal; the first terminal receives user portrait information of a second terminal; the first terminal performs facial searching in the photo directory according to the user portrait information of the second terminal, and sequentially searches for a photo matching the user portrait information of the second terminal in the photo directory, to determine the photo corresponding to the second terminal in the photo directory.

Figure 12:
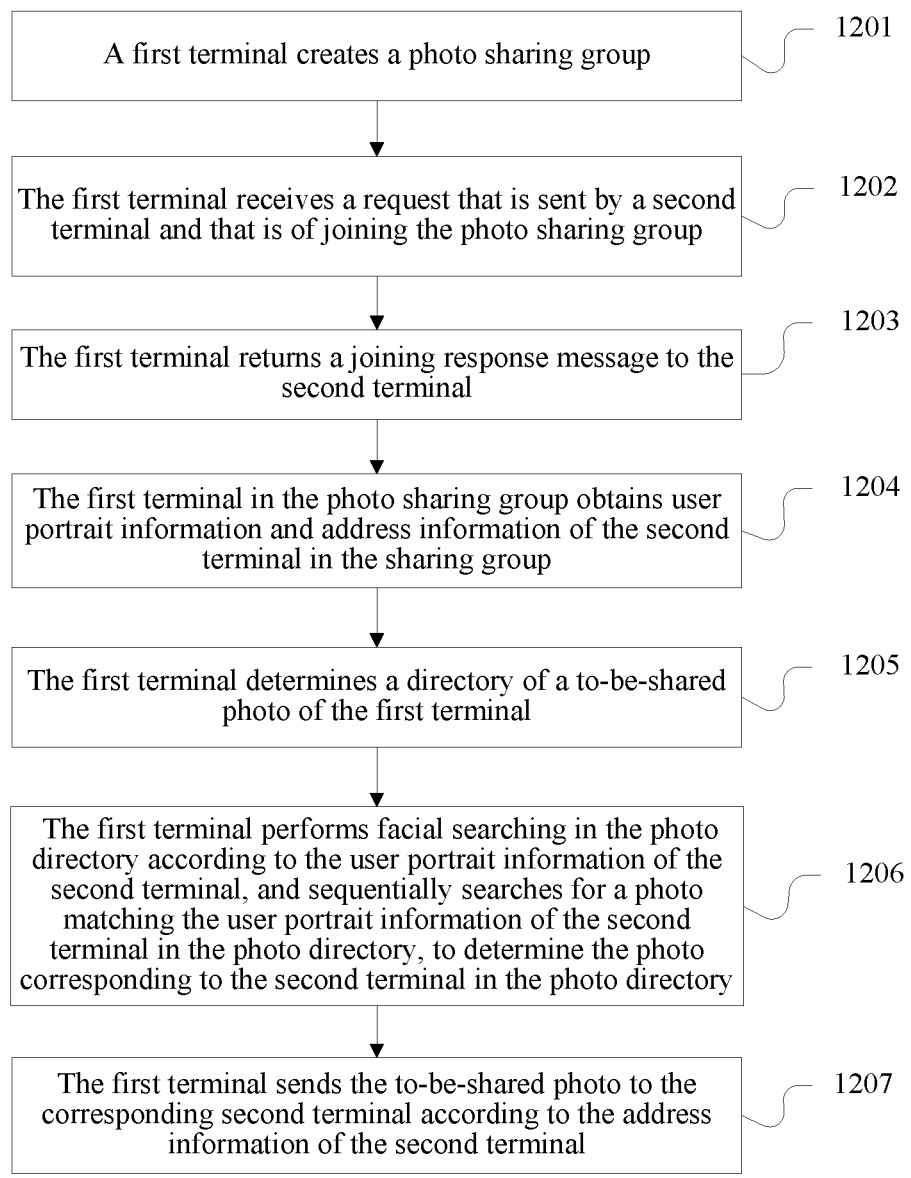
FIG. 12 is a schematic diagram of another embodiment of a photo distribution method according to an embodiment of the present disclosure.

Referring to FIG. 12, another embodiment of a photo distribution method according to an embodiment of the present disclosure includes the following steps

1201: A first terminal creates a photo sharing group.

The first terminal may be a terminal of any one of people going traveling. The first terminal creates the photo sharing group. Distinguishing information such as a name or a group avatar may be set for the photo sharing group. The photo sharing group may be presented on a network according to location information of the first terminal, so that another terminal obtains the photo sharing group by means of searching on the network or by searching for a nearby photo sharing group, which is not specifically limited herein.

In this embodiment, when creating the photo sharing group, the first terminal may further establish a Wi-Fi hotspot, so that after joining the photo sharing group, another terminal connects to the Wi-Fi hotspot, to form a local area network.

It should be noted that, when creating the photo sharing group, the first terminal creates a temporary buffer at the same time, to save information in the photo sharing group, for example, user portrait information and an IP address of a terminal in the photo sharing group, which is not limited herein.

1202: The first terminal receives a request that is sent by a second terminal and that is of joining the photo sharing group.

After the first terminal creates the photo sharing group, another terminal needing to share a photo or the second terminal needing to obtain a photo sends a request of joining the photo sharing group to the first terminal. A manner of sending, by the second terminal, the request may be: The second terminal scans a two-dimensional barcode, generated by the first terminal, of the photo sharing group, and after scanning the two-dimensional barcode, the second terminal sends the request of joining the photo sharing group to the first terminal; or in an actual application, the second terminal obtains the photo sharing group by means of searching on the network according to information such as the name or the group avatar of the photo sharing group, and clicks to join the photo sharing group, that is, the second terminal sends the request of joining the photo sharing group to the first terminal; or the second terminal searches for a nearby photo sharing group according to a positioning apparatus in the terminal, and after finding the photo group, clicks to join the photo sharing group, that is, the second terminal sends the request of joining the photo sharing group to the first terminal. A specific manner of sending, by the second terminal, the request of joining the photo sharing group to the first terminal is not specifically limited.

It should be noted that, the second terminal may be one or more terminals in the photo sharing group, which is not specifically limited herein.

1203: The first terminal returns a joining response message to the second terminal.

After receiving the request that is sent by the second terminal and that is of joining the photo sharing group, the first terminal returns the joining response message to the second terminal, where the response message includes address information of the first terminal. In this case, it indicates that the first terminal already agrees that the second terminal joins the photo sharing group. In an actual application, to avoid that an irrelevant terminal joins the photo sharing group, the response message may be joining rejection information. The first terminal judges the received request of joining the photo sharing group, to determine whether the second terminal is a terminal sharing a photo; if yes, the first terminal returns a joining agreement response message; and if not, the first terminal returns a joining rejection response message, which is not limed herein. If there are multiple second terminals, the first terminal separately sends the response message including the address information of the first terminal to the multiple second terminals.

If the first terminal establishes a Wi-Fi hotspot when creating the photo sharing group in step 1201, after receiving the response message sent by the first terminal, the second terminal may connect to the Wi-Fi hotspot, to form a local area network with the first terminal.

It should be noted that, step 1201 to step 1203 describe a process in which the first terminal creates the photo sharing group and each terminal joins the photo group. The photo sharing group may be created by another terminal, and the first terminal sends a request of joining the photo sharing group to the terminal creating the photo sharing group. After receiving the request, the terminal creating the photo sharing group returns a joining response message, and the first terminal joins the photo sharing group. Manners of sending the request and returning the joining response are similar to step 1202 and step 1203, and details are not described herein again.

1204: The first terminal in the photo sharing group obtains user portrait information and address information of the second terminal in the sharing group.

When friends or colleagues go traveling, they separately take many photos by using terminals. When people want to obtain respective photos, they join a same created photo sharing group, the terminals joining the photo sharing group can send information to and receive information from each other, and the first terminal in the photo sharing group can obtain the user portrait information and the address information of the second terminal in the sharing group.

A manner of obtaining, by the first terminal, the user portrait information and the address information of the second terminal in the photo sharing group may be: After joining the photo sharing group, the second terminal directly sends the user portrait information and the address information of the second terminal to the first terminal; or after the second terminal joins the photo sharing group, the first terminal sends a request of obtaining the user portrait information and the address information of the second terminal to the second terminal, and the second terminal sends the user portrait information and the address information of the second terminal to the first terminal, which is not specifically limited herein.

The user portrait information of the second terminal may be a photo including a facial image of a user, where the photo of the facial image of the user may be an avatar that is set by the user in the photo sharing group by using a terminal. When the photo of the facial image of the user is an avatar that is set by the user in the photo sharing group by using the terminal, the first terminal may prompt the second terminal to set a user avatar including the facial image, and after the second terminal completes the setting, the first terminal directly obtains the user avatar including the facial image.

In an actual application, the portrait information of the second terminal may be a facial image, taken by the second terminal, of the user, and the taken facial image is sent to the first terminal, which is not specifically limited herein.

In this embodiment, the user portrait information and the address information of the second terminal may be obtained by means of NFC, an acoustic wave, or the like, which is not limited herein.

In this embodiment, the address information may be IP address information or MAC address information, which is not limited herein.

1205: The first terminal determines a directory of a to-be-shared photo of the first terminal.

The first terminal has a to-be-shared photo, and may determine the directory of the to-be-shared photo of the first terminal.

1206: The first terminal performs facial searching in the photo directory according to the user portrait information of the second terminal, and sequentially searches for a photo matching the user portrait information of the second terminal in the photo directory, to determine the photo corresponding to the second terminal in the photo directory.

In this embodiment, the first terminal performs facial searching in the photo directory according to the user portrait information of the second terminal. When there is only one second terminal, the first terminal sequentially searches for a photo matching user portrait information of the second terminal in the photo directory, to determine the photo corresponding to the second terminal in the photo directory; and when there are multiple second terminals, the first terminal sequentially searches for a photo matching user portrait information of each second terminal in the photo directory, to determine the photo corresponding to each second terminal in the photo directory, and after the searching, the first terminal may determine the photo corresponding to the second terminal in the photo directory.

1207: The first terminal sends the to-be-shared photo to the corresponding second terminal according to the address information of the second terminal.

The first terminal obtains the address information of the second terminal. When there is only one second terminal, the first terminal sends a photo matching user portrait information of the second terminal in the to-be-shared photo to the second terminal according to address information of the second terminal; and when there are multiple second terminals, the first terminal sends a photo matching user portrait information of each second terminal in the to-be-shared photo to the corresponding terminal according to address information of the second terminal.

In this embodiment, the first terminal may send a photo that does not correspond to the second terminal in the to-be-shared photo to the second terminal. When there is one second terminal, the first terminal sends a photo that does not correspond to the second terminal in the to-be-shared photo to the terminal; and when there are multiple second terminals, the first terminal separately sends a photo that does not correspond to any one of the second terminals to the multiple second terminals, which is not limited herein.

3. A first terminal creates a photo directory corresponding to a second terminal; obtains a group of a photo taken by the first terminal; performs image matching analysis on the photo in the photo group according to user portrait information of the second terminal; sequentially determines whether the photo in the photo group matches the user portrait information corresponding to the second terminal; and if yes, places a photo matching the user portrait information corresponding to the second terminal in the photo group, in the photo directory corresponding to the second terminal; and sends a photo in the photo directory corresponding to the second terminal to the second terminal.

Figure 13:
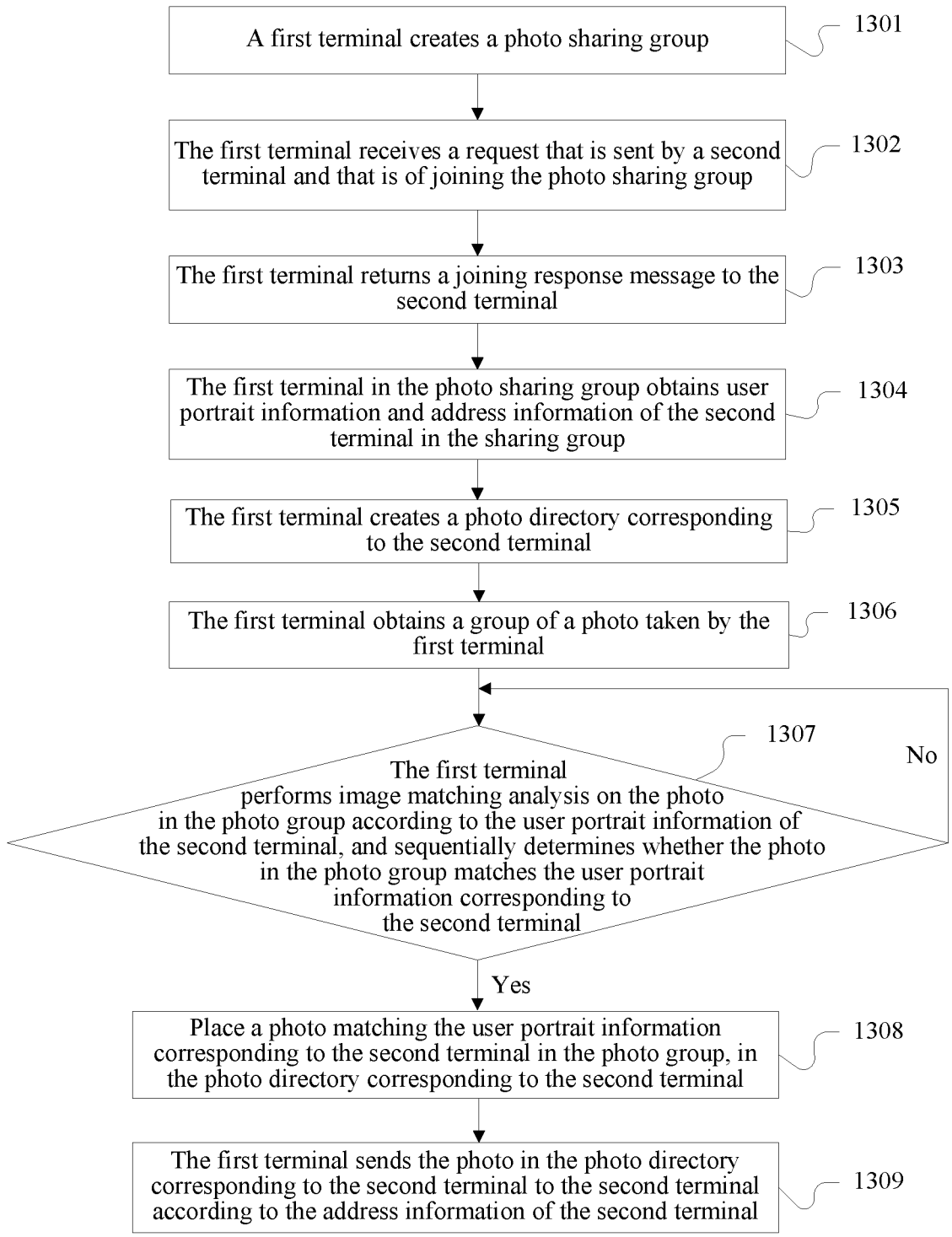
FIG. 13 is a schematic diagram of another embodiment of a photo distribution method according to an embodiment of the present disclosure.

Referring to FIG. 13, another embodiment of a photo distribution method according to an embodiment of the present disclosure includes the following steps

1301: A first terminal creates a photo sharing group.

The first terminal may be a terminal of any one of people going traveling. The first terminal creates the photo sharing group. Distinguishing information such as a name or a group avatar may be set for the photo sharing group. The photo sharing group may be presented on a network according to location information of the first terminal, so that another terminal obtains the photo sharing group by means of searching on the network or by searching for a nearby photo sharing group, which is not specifically limited herein.

In this embodiment, when creating the photo sharing group, the first terminal may further establish a Wi-Fi hotspot, so that after joining the photo sharing group, another terminal connects to the Wi-Fi hotspot, to form a local area network.

It should be noted that, when creating the photo sharing group, the first terminal creates a temporary buffer at the same time, to save information in the photo sharing group, for example, user portrait information and an IP address of a terminal in the photo sharing group, which is not limited herein.

1302: The first terminal receives a request that is sent by a second terminal and that is of joining the photo sharing group.

After the first terminal creates the photo sharing group, another terminal needing to share a photo or the second terminal needing to obtain a photo sends a request of joining the photo sharing group to the first terminal. A manner of sending, by the second terminal, the request may be: The second terminal scans a two-dimensional barcode, generated by the first terminal, of the photo sharing group, and after scanning the two-dimensional barcode, the second terminal sends the request of joining the photo sharing group to the first terminal; or in an actual application, the second terminal obtains the photo sharing group by means of searching on the network according to information such as the name or the group avatar of the photo sharing group, and clicks to join the photo sharing group, that is, the second terminal sends the request of joining the photo sharing group to the first terminal; or the second terminal searches for a nearby photo sharing group according to a positioning apparatus in the terminal, and after finding the photo group, clicks to join the photo sharing group, that is, the second terminal sends the request of joining the photo sharing group to the first terminal. A specific manner of sending, by the second terminal, the request of joining the photo sharing group to the first terminal is not specifically limited.

It should be noted that, the second terminal may be one or more terminals in the photo sharing group, which is not specifically limited herein.

1303: The first terminal returns a joining response message to the second terminal.

After receiving the request that is sent by the second terminal and that is of joining the photo sharing group, the first terminal returns the joining response message to the second terminal, where the response message includes address information of the first terminal. In this case, it indicates that the first terminal already agrees that the second terminal joins the photo sharing group. In an actual application, to avoid that an irrelevant terminal joins the photo sharing group, the response message may be joining rejection information. The first terminal judges the received request of joining the photo sharing group, to determine whether the second terminal is a terminal sharing a photo; if yes, the first terminal returns a joining agreement response message; and if not, the first terminal returns a joining rejection response message, which is not limed herein. If there are multiple second terminals, the first terminal separately sends the response message including the address information of the first terminal to the multiple second terminals.

If the first terminal establishes a Wi-Fi hotspot when creating the photo sharing group in step 1301, after receiving the response message sent by the first terminal, the second terminal may connect to the Wi-Fi hotspot, to form a local area network with the first terminal.

It should be noted that, step 1301 to step 1303 describe a process in which the first terminal creates the photo sharing group and each terminal joins the photo group. The photo sharing group may be created by another terminal, and the first terminal sends a request of joining the photo sharing group to the terminal creating the photo sharing group. After receiving the request, the terminal creating the photo sharing group returns a joining response message, and the first terminal joins the photo sharing group. Manners of sending the request and returning the joining response are similar to step 1302 and step 1303, and details are not described herein again.

1304: The first terminal in the photo sharing group obtains user portrait information and address information of the second terminal in the sharing group.

When friends or colleagues go traveling, they separately take many photos by using terminals. When people want to obtain respective photos, they join a same created photo sharing group, the terminals joining the photo sharing group can send information to and receive information from each other, and the first terminal in the photo sharing group can obtain the user portrait information and the address information of the second terminal in the sharing group.

A manner of obtaining, by the first terminal, the user portrait information and the address information of the second terminal in the photo sharing group may be: After joining the photo sharing group, the second terminal directly sends the user portrait information and the address information of the second terminal to the first terminal; or after the second terminal joins the photo sharing group, the first terminal sends a request of obtaining the user portrait information and the address information of the second terminal to the second terminal, and the second terminal sends the user portrait information and the address information of the second terminal to the first terminal, which is not specifically limited herein.

The user portrait information of the second terminal may be a photo including a facial image of a user, where the photo of the facial image of the user may be an avatar that is set by the user in the photo sharing group by using a terminal. When the photo of the facial image of the user is an avatar that is set by the user in the photo sharing group by using the terminal, the first terminal may prompt the second terminal to set a user avatar including the facial image, and after the second terminal completes the setting, the first terminal directly obtains the user avatar including the facial image.

In an actual application, the portrait information of the second terminal may be a facial image, taken by the second terminal, of the user, and the taken facial image is sent to the first terminal, which is not specifically limited herein.

In this embodiment, the user portrait information and the address information of the second terminal may be obtained by means of NFC, an acoustic wave, or the like, which is not limited herein.

In this embodiment, the address information may be IP address information or MAC address information, which is not limited herein.

1305: The first terminal creates a photo directory corresponding to the second terminal.

The first terminal creates the corresponding photo directory for the second terminal. When there is one second terminal, the first terminal creates one photo directory; and when there are multiple second terminals, the first terminal separately creates multiple corresponding photo directories.

1306: The first terminal obtains a group of a photo taken by the first terminal.

In this embodiment, using an example in which all photos in the group of the photo taken by the first terminal are shared, the first terminal directly obtains the group of the photo taken by the first terminal, and the group of the photo may include a photo that is taken by the first terminal after the traveling.

1307: The first terminal performs image matching analysis on the photo in the photo group according to the user portrait information of the second terminal, and sequentially determines whether the photo in the photo group matches the user portrait information corresponding to the second terminal; if yes, performs step 1308; and if not, determines whether a next photo matches the user portrait information of the second terminal, until the step is performed on all photos in the photo group.

The first terminal performs image matching analysis on the photo in the photo group according to the user portrait information of the second terminal, and sequentially determines whether the photo in the photo group matches the user portrait information corresponding to the second terminal. When there is only one second terminal, the first terminal determines whether a photo in the photo group matches user portrait information of the second terminal, until this step is performed on all photos in the photo group; and when there are multiple second terminals, the first terminal sequentially determines whether a photo in the photo group matches user portrait information corresponding to a second terminal, and after this step is performed on all photos in the photo group for the second terminal, the step is performed for a next second terminal, until the step is performed for all second terminals.

1308: Place a photo matching the user portrait information corresponding to the second terminal in the photo group, in the photo directory corresponding to the second terminal.

1309: The first terminal sends the photo in the photo directory corresponding to the second terminal to the second terminal according to the address information of the second terminal.

The first terminal obtains the address information of the second terminal. When there is only one second terminal, the first terminal sends a photo in a photo directory corresponding to the second terminal to the second terminal according to address information of the second terminal; and when there are multiple second terminals, the first terminal sends a photo in a photo directory corresponding to each second terminal to the corresponding terminal according to address information of the second terminal.

In this embodiment, when s photo directory does not correspond to any one of the second terminals, the first terminal may send a photo in the photo directory to the second terminal. When there is one second terminal, the first terminal sends the photo in the photo directory to the terminal; and when there are multiple second terminals, the first terminal separately sends the photo in the photo directory to the multiple second terminals, which is not limited herein.

4. A first terminal determines that all taken photos are shared; during photographing, each time after taking a photo, the first terminal analyzes the photo to determine whether the taken photo matches user portrait information of a second terminal.

Figure 14:
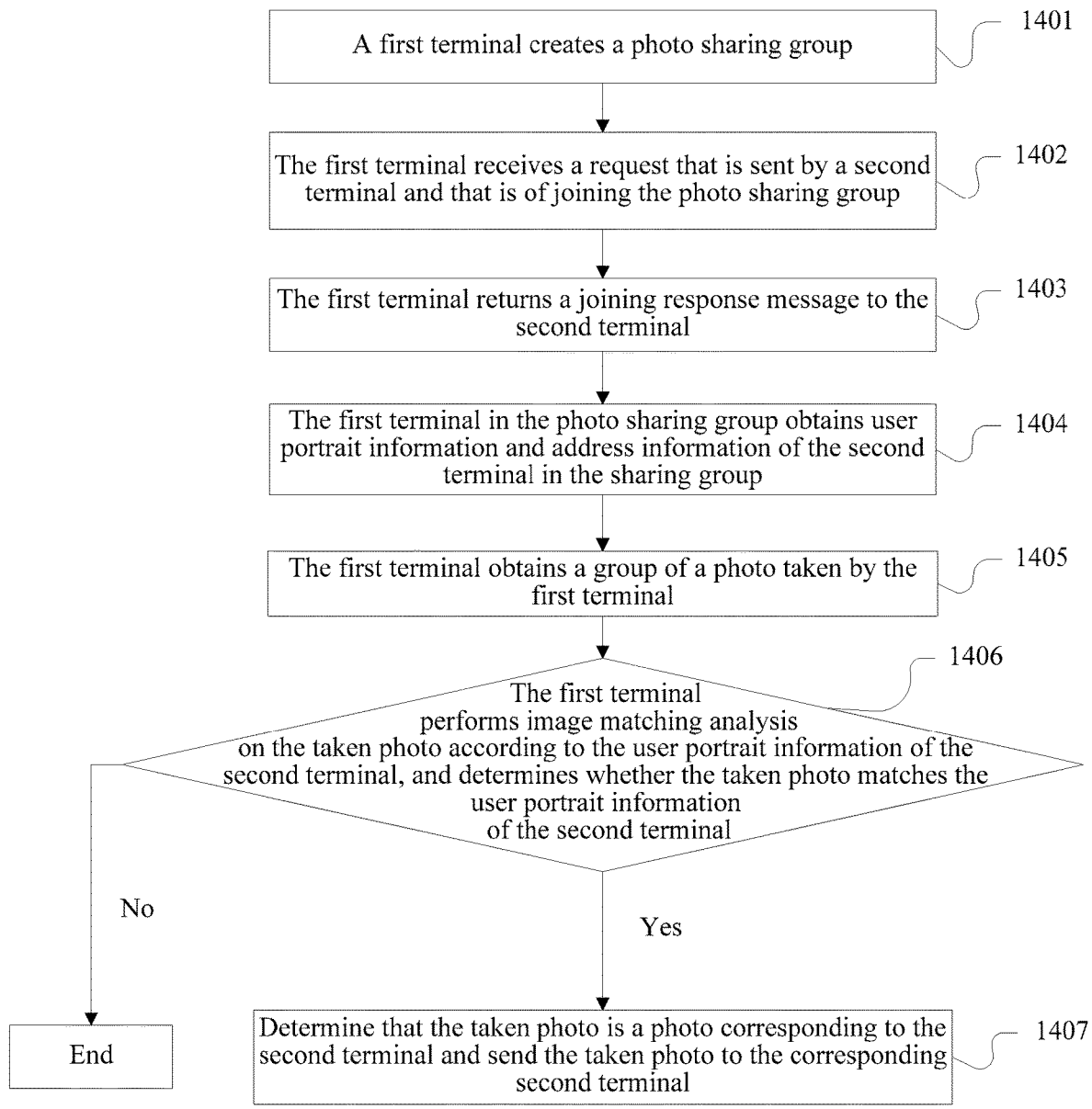
FIG. 14 is a schematic diagram of another embodiment of a photo distribution method according to an embodiment of the present disclosure.

Referring to FIG. 14, another embodiment of a photo distribution method according to an embodiment of the present disclosure includes the following steps

1401: A first terminal creates a photo sharing group.

The first terminal may be a terminal of any one of people going traveling. The first terminal creates the photo sharing group. Distinguishing information such as a name or a group avatar may be set for the photo sharing group. The photo sharing group may be presented on a network according to location information of the first terminal, so that another terminal obtains the photo sharing group by means of searching on the network or by searching for a nearby photo sharing group, which is not specifically limited herein.

In this embodiment, when creating the photo sharing group, the first terminal may further establish a Wi-Fi hotspot, so that after joining the photo sharing group, another terminal connects to the Wi-Fi hotspot, to form a local area network.

It should be noted that, when creating the photo sharing group, the first terminal creates a temporary buffer at the same time, to save information in the photo sharing group, for example, user portrait information and an IP address of a terminal in the photo sharing group, which is not limited herein.

1402: The first terminal receives a request that is sent by a second terminal and that is of joining the photo sharing group.

After the first terminal creates the photo sharing group, another terminal needing to share a photo or the second terminal needing to obtain a photo sends a request of joining the photo sharing group to the first terminal. A manner of sending, by the second terminal, the request may be: The second terminal scans a two-dimensional barcode, generated by the first terminal, of the photo sharing group, and after scanning the two-dimensional barcode, the second terminal sends the request of joining the photo sharing group to the first terminal; or in an actual application, the second terminal obtains the photo sharing group by means of searching on the network according to information such as the name or the group avatar of the photo sharing group, and clicks to join the photo sharing group, that is, the second terminal sends the request of joining the photo sharing group to the first terminal; or the second terminal searches for a nearby photo sharing group according to a positioning apparatus in the terminal, and after finding the photo group, clicks to join the photo sharing group, that is, the second terminal sends the request of joining the photo sharing group to the first terminal. A specific manner of sending, by the second terminal, the request of joining the photo sharing group to the first terminal is not specifically limited.

It should be noted that, the second terminal may be one or more terminals in the photo sharing group, which is not specifically limited herein.

1403: The first terminal returns a joining response message to the second terminal.

After receiving the request that is sent by the second terminal and that is of joining the photo sharing group, the first terminal returns the joining response message to the second terminal, where the response message includes address information of the first terminal. In this case, it indicates that the first terminal already agrees that the second terminal joins the photo sharing group. In an actual application, to avoid that an irrelevant terminal joins the photo sharing group, the response message may be joining rejection information. The first terminal judges the received request of joining the photo sharing group, to determine whether the second terminal is a terminal sharing a photo; if yes, the first terminal returns a joining agreement response message; and if not, the first terminal returns a joining rejection response message, which is not limed herein. If there are multiple second terminals, the first terminal separately sends the response message including the address information of the first terminal to the multiple second terminals.

If the first terminal establishes a Wi-Fi hotspot when creating the photo sharing group in step 1401, after receiving the response message sent by the first terminal, the second terminal may connect to the Wi-Fi hotspot, to form a local area network with the first terminal.

It should be noted that, step 1401 to step 1403 describe a process in which the first terminal creates the photo sharing group and each terminal joins the photo group. The photo sharing group may be created by another terminal, and the first terminal sends a request of joining the photo sharing group to the terminal creating the photo sharing group. After receiving the request, the terminal creating the photo sharing group returns a joining response message, and the first terminal joins the photo sharing group. Manners of sending the request and returning the joining response are similar to step 1402 and step 1403, and details are not described herein again.

1404: The first terminal in the photo sharing group obtains user portrait information and address information of the second terminal in the sharing group.

When friends or colleagues go traveling, they separately take many photos by using terminals. When people want to obtain respective photos, they join a same created photo sharing group, the terminals joining the photo sharing group can send information to and receive information from each other, and the first terminal in the photo sharing group can obtain the user portrait information and the address information of the second terminal in the sharing group.

A manner of obtaining, by the first terminal, the user portrait information and the address information of the second terminal in the photo sharing group may be: After joining the photo sharing group, the second terminal directly sends the user portrait information and the address information of the second terminal to the first terminal; or after the second terminal joins the photo sharing group, the first terminal sends a request of obtaining the user portrait information and the address information of the second terminal to the second terminal, and the second terminal sends the user portrait information and the address information of the second terminal to the first terminal, which is not specifically limited herein.

The user portrait information of the second terminal may be a photo including a facial image of a user, where the photo of the facial image of the user may be an avatar that is set by the user in the photo sharing group by using a terminal. When the photo of the facial image of the user is an avatar that is set by the user in the photo sharing group by using the terminal, the first terminal may prompt the second terminal to set a user avatar including the facial image, and after the second terminal completes the setting, the first terminal directly obtains the user avatar including the facial image.

In an actual application, the portrait information of the second terminal may be a facial image, taken by the second terminal, of the user, and the taken facial image is sent to the first terminal, which is not specifically limited herein.

In this embodiment, the user portrait information and the address information of the second terminal may be obtained by means of NFC, an acoustic wave, or the like, which is not limited herein.

In this embodiment, the address information may be IP address information or MAC address information, which is not limited herein.

1405: The first terminal obtains a group of a photo taken by the first terminal.

When the first terminal takes a photo, the first terminal obtains the photo that is just taken by the first terminal, to perform image matching analysis.

1406: The first terminal performs image matching analysis on the taken photo according to the user portrait information of the second terminal, and determines whether the taken photo matches the user portrait information of the second terminal; if yes, performs step 1407; and if not, ends the process.

The first terminal performs image matching analysis on the taken photo according to the user portrait information of the second terminal, and determines whether the taken photo matches the user portrait information of the second terminal. When there is only one terminal, the first terminal determines whether the taken photo matches user portrait information of the second terminal; and when there are multiple second terminals, the first terminal sequentially determines whether the taken photo matches user portrait information of each second terminal.

In this embodiment, after one picture is taken and analyzed, a next picture may be taken and analyzed.

1407: Determine that the taken photo is a photo corresponding to the second terminal and send the taken photo to the corresponding second terminal.

When the taken photo is the photo corresponding to the second terminal, the taken photo is sent to the corresponding second terminal.

In this embodiment, the first terminal may send a photo that does not correspond to the second terminal in the taken photo to the second terminal. When there is one second terminal, the first terminal sends a photo that does not correspond to the second terminal in the taken photo to the terminal; and when there are multiple second terminals, the first terminal separately sends a photo that does not correspond to any one of the second terminals in the taken photo to the multiple second terminals, which is not limited herein.

In this embodiment, after a photo that is just taken is analyzed, the first terminal continues to take a photo, and each time after taking a photo, the first terminal performs image matching analysis on the photo until photographing ends.

In this embodiment, each time after a photo is taken, image matching analysis is performed on the photo, and the photo is delivered to a corresponding second terminal intelligently, which is intelligent, simple, and efficient.

Figure 15:
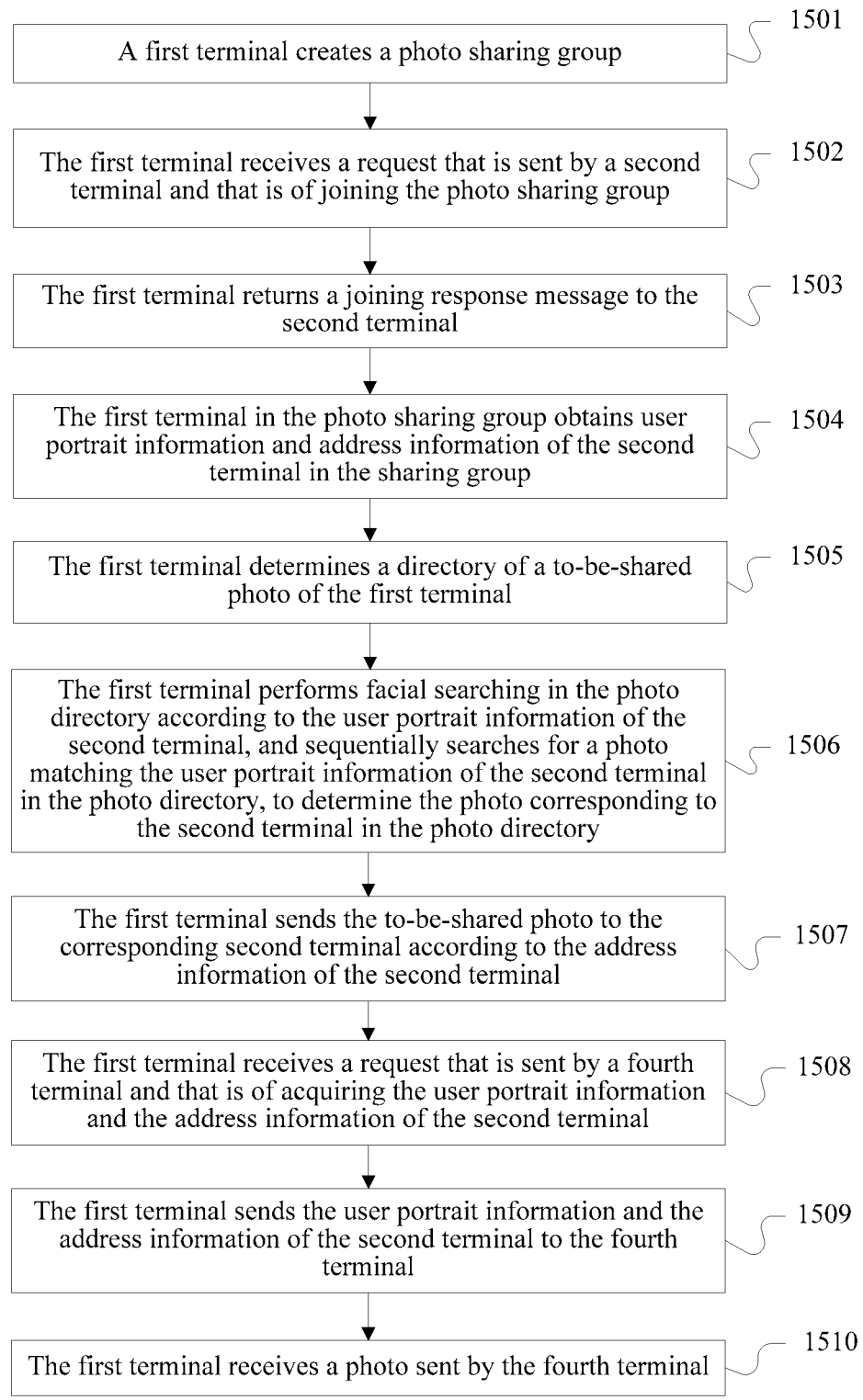
FIG. 15 is a schematic diagram of another embodiment of a photo distribution method according to an embodiment of the present disclosure.

In the embodiments shown in FIG. 11 to FIG. 14, in addition to the first terminal, another terminal also shares a photo. The following gives a description with reference to the embodiment shown in FIG. 12 by using an example. Referring to FIG. 15, another embodiment of a photo distribution method according to an embodiment of the present disclosure includes the following steps

1501: A first terminal creates a photo sharing group.

The first terminal may be a terminal of any one of people going traveling. The first terminal creates the photo sharing group. Distinguishing information such as a name or a group avatar may be set for the photo sharing group. The photo sharing group may be presented on a network according to location information of the first terminal, so that another terminal obtains the photo sharing group by means of searching on the network or by searching for a nearby photo sharing group, which is not specifically limited herein.

In this embodiment, when creating the photo sharing group, the first terminal may further establish a Wi-Fi hotspot, so that after joining the photo sharing group, another terminal connects to the Wi-Fi hotspot, to form a local area network.

It should be noted that, when creating the photo sharing group, the first terminal creates a temporary buffer at the same time, to save information in the photo sharing group, for example, user portrait information and an IP address of a terminal in the photo sharing group, which is not limited herein.

1502: The first terminal receives a request that is sent by a second terminal and that is of joining the photo sharing group.

After the first terminal creates the photo sharing group, another terminal needing to share a photo or the second terminal needing to obtain a photo sends a request of joining the photo sharing group to the first terminal. A manner of sending, by the second terminal, the request may be: The second terminal scans a two-dimensional barcode, generated by the first terminal, of the photo sharing group, and after scanning the two-dimensional barcode, the second terminal sends the request of joining the photo sharing group to the first terminal; or in an actual application, the second terminal obtains the photo sharing group by means of searching on the network according to information such as the name or the group avatar of the photo sharing group, and clicks to join the photo sharing group, that is, the second terminal sends the request of joining the photo sharing group to the first terminal; or the second terminal searches for a nearby photo sharing group according to a positioning apparatus in the terminal, and after finding the photo group, clicks to join the photo sharing group, that is, the second terminal sends the request of joining the photo sharing group to the first terminal. A specific manner of sending, by the second terminal, the request of joining the photo sharing group to the first terminal is not specifically limited.

It should be noted that, the second terminal may be one or more terminals in the photo sharing group, which is not specifically limited herein.

1503: The first terminal returns a joining response message to the second terminal.

After receiving the request that is sent by the second terminal and that is of joining the photo sharing group, the first terminal returns the joining response message to the second terminal, where the response message includes address information of the first terminal. In this case, it indicates that the first terminal already agrees that the second terminal joins the photo sharing group. In an actual application, to avoid that an irrelevant terminal joins the photo sharing group, the response message may be joining rejection information. The first terminal judges the received request of joining the photo sharing group, to determine whether the second terminal is a terminal sharing a photo; if yes, the first terminal returns a joining agreement response message; and if not, the first terminal returns a joining rejection response message, which is not limed herein. If there are multiple second terminals, the first terminal separately sends the response message including the address information of the first terminal to the multiple second terminals.

If the first terminal establishes a Wi-Fi hotspot when creating the photo sharing group in step 1501, after receiving the response message sent by the first terminal, the second terminal may connect to the Wi-Fi hotspot, to form a local area network with the first terminal.

It should be noted that, step 1501 to step 1503 describe a process in which the first terminal creates the photo sharing group and each terminal joins the photo group. The photo sharing group may be created by another terminal, and the first terminal sends a request of joining the photo sharing group to the terminal creating the photo sharing group. After receiving the request, the terminal creating the photo sharing group returns a joining response message, and the first terminal joins the photo sharing group. Manners of sending the request and returning the joining response are similar to step 1502 and step 1503, and details are not described herein again.

1504: The first terminal in the photo sharing group obtains user portrait information and address information of the second terminal in the sharing group.

When friends or colleagues go traveling, they separately take many photos by using terminals. When people want to obtain respective photos, they join a same created photo sharing group, the terminals joining the photo sharing group can send information to and receive information from each other, and the first terminal in the photo sharing group can obtain the user portrait information and the address information of the second terminal in the sharing group.

A manner of obtaining, by the first terminal, the user portrait information and the address information of the second terminal in the photo sharing group may be: After joining the photo sharing group, the second terminal directly sends the user portrait information and the address information of the second terminal to the first terminal; or after the second terminal joins the photo sharing group, the first terminal sends a request of obtaining the user portrait information and the address information of the second terminal to the second terminal, and the second terminal sends the user portrait information and the address information of the second terminal to the first terminal, which is not specifically limited herein.

The user portrait information of the second terminal may be a photo including a facial image of a user, where the photo of the facial image of the user may be an avatar that is set by the user in the photo sharing group by using a terminal. When the photo of the facial image of the user is an avatar that is set by the user in the photo sharing group by using the terminal, the first terminal may prompt the second terminal to set a user avatar including the facial image, and after the second terminal completes the setting, the first terminal directly obtains the user avatar including the facial image.

In an actual application, the portrait information of the second terminal may be a facial image, taken by the second terminal, of the user, and the taken facial image is sent to the first terminal, which is not specifically limited herein.

In this embodiment, the user portrait information and the address information of the second terminal may be obtained by means of NFC, an acoustic wave, or the like, which is not limited herein.

In this embodiment, the address information may be IP address information or MAC address information, which is not limited herein.

1505: The first terminal determines a directory of a to-be-shared photo of the first terminal.

The first terminal has a to-be-shared photo, and may determine the directory of the to-be-shared photo of the first terminal.

1506: The first terminal performs facial searching in the photo directory according to the user portrait information of the second terminal, and sequentially searches for a photo matching the user portrait information of the second terminal in the photo directory, to determine the photo corresponding to the second terminal in the photo directory.

In this embodiment, the first terminal performs facial searching in the photo directory according to the user portrait information of the second terminal. When there is only one second terminal, the first terminal sequentially searches for a photo matching user portrait information of the second terminal in the photo directory, to determine the photo corresponding to the second terminal in the photo directory; and when there are multiple second terminals, the first terminal sequentially searches for a photo matching user portrait information of each second terminal in the photo directory, to determine the photo corresponding to each second terminal in the photo directory, and after the searching, the first terminal may determine the photo corresponding to the second terminal in the photo directory.

1507: The first terminal sends the to-be-shared photo to the corresponding second terminal according to the address information of the second terminal.

The first terminal obtains the address information of the second terminal. When there is only one second terminal, the first terminal sends a photo matching user portrait information of the second terminal in the to-be-shared photo to the second terminal according to address information of the second terminal; and when there are multiple second terminals, the first terminal sends a photo matching user portrait information of each second terminal in the to-be-shared photo to the corresponding terminal according to address information of the second terminal.

In this embodiment, the first terminal may send a photo that does not correspond to the second terminal in the to-be-shared photo to the second terminal. When there is one second terminal, the first terminal sends a photo that does not correspond to the second terminal in the to-be-shared photo to the terminal; and when there are multiple second terminals, the first terminal separately sends a photo that does not correspond to any one of the second terminals to the multiple second terminals, which is not limited herein.

1508: The first terminal receives a request that is sent by a fourth terminal and that is of obtaining the user portrait information and the address information of the second terminal.

In this embodiment, in addition to the first terminal, the fourth terminal also has a to-be-shared photo. In this case, the fourth terminal sends a request of obtaining the user portrait information and the address information of the second terminal to the first terminal.

In this embodiment, there may be one fourth terminal, or multiple fourth terminals, which is not limited herein.

1509: The first terminal sends the user portrait information and the address information of the second terminal to the fourth terminal.

In this embodiment, the first terminal sends the user portrait information and the address information of the second terminal to the fourth terminal, so that the fourth terminal performs image analysis on the to-be-shared photo of the fourth terminal, to determine a photo corresponding to the first terminal in the to-be-shared photo. When there are multiple second terminals, the first terminal may determine a photo corresponding to another terminal in the to-be-shared photo. After determining the photo corresponding to the first terminal in the to-be-shared photo, the fourth terminal sends the photo corresponding to the first terminal to the first terminal.

It should be noted that, in this embodiment, the first terminal may directly send the user portrait information and the address information of the second terminal to the fourth terminal; or after receiving the request that is sent by the fourth terminal and that is of obtaining the user portrait information and the address information of the second terminal, the first terminal sends the user portrait information and the address information of the second terminal to the fourth terminal, which is not specifically limited herein.

The user portrait information of the second terminal may be a photo including a facial image of a user, where the photo of the facial image of the user may be an avatar that is set by the user in the photo sharing group by using a terminal. When the photo of the facial image of the user is an avatar that is set by the user in the photo sharing group by using the terminal, the first terminal may prompt the second terminal to set a user avatar including the facial image, and after the second terminal completes the setting, the first terminal directly obtains the user avatar including the facial image.

In an actual application, the portrait information of the second terminal may be a facial image, taken by the second terminal, of the user, and the taken facial image is sent to the first terminal, which is not specifically limited herein.

1510: The first terminal receives a photo sent by the fourth terminal.

It should be noted that, in this embodiment, step 1506 to step 1508 and steps before step 1506 are two independent processes, and it is not limited that step 1506 to step 1508 are performed after step 1505.

This embodiment describes in detail a photo distribution process when multiple terminals share photos in a case in which both the first terminal and the fourth terminal share photos, which is intelligent, simple, and efficient.

In some embodiments of the present disclosure, the first terminal may not obtain the user portrait information of the second terminal in the photo sharing group, the first terminal may determine a directory of a to-be-shared photo of the first terminal, perform image analysis on each photo in the photo directory to generate multiple photo sub-directories, place photos having a same facial feature in one photo sub-directory, generate one associated reference facial picture for each photo sub-directory, and send the associated reference facial pictures to the second terminal, so that the second terminal selects an associated reference facial picture corresponding to the second terminal, and returns associated reference facial picture selection information to the first terminal, and the first terminal determines, according to the associated reference facial picture selection information, a photo sub-directory corresponding to the second terminal. The following gives a description by using a specific embodiment.

Figure 16:
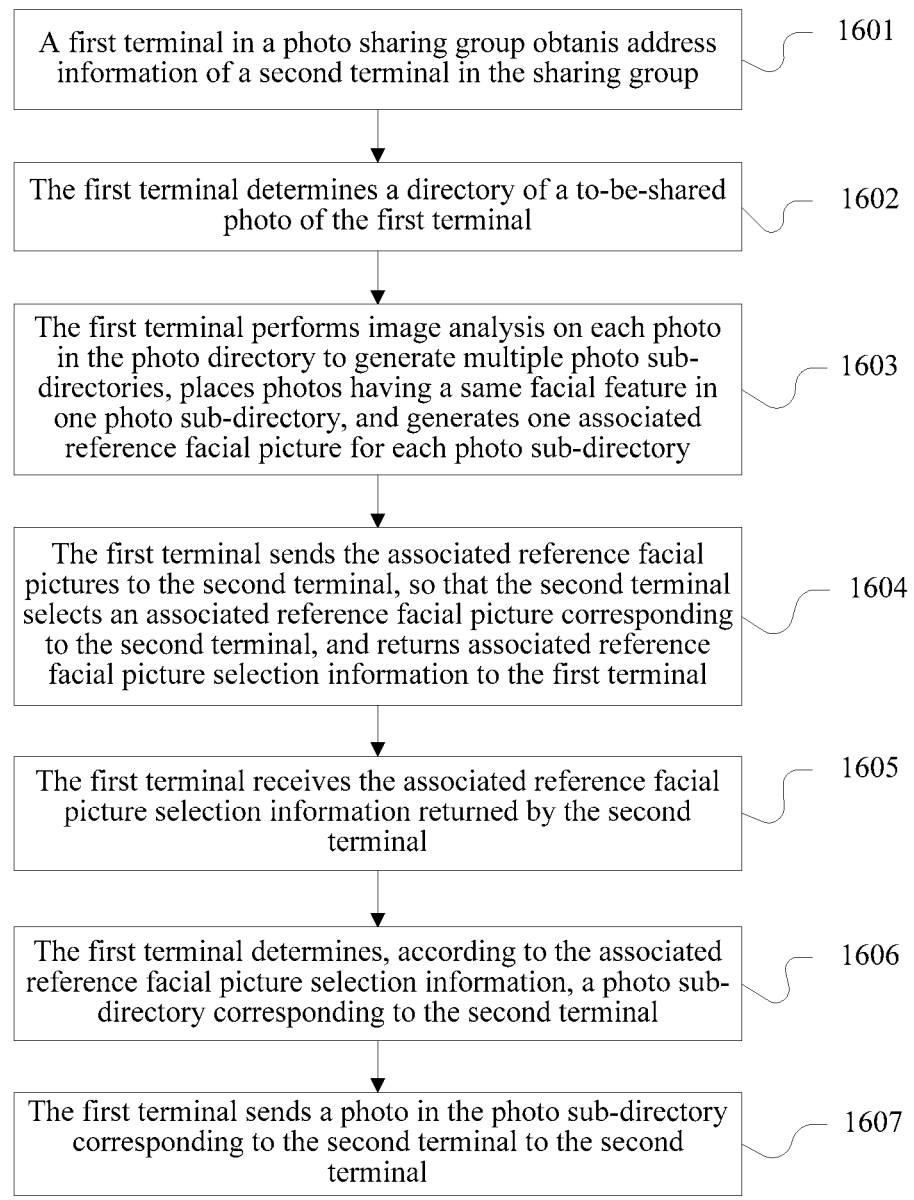
FIG. 16 is a schematic diagram of another embodiment of a photo distribution method according to an embodiment of the present disclosure.

Referring to FIG. 16, another embodiment of a photo distribution method according to an embodiment of the present disclosure includes the following steps

1601: A first terminal in a photo sharing group obtains address information of a second terminal in the sharing group.

When friends or colleagues go traveling, they separately take many photos by using terminals. When people want to obtain respective photos, they join a same created photo sharing group, the terminals joining the photo sharing group can send information to and receive information from each other, and the first terminal in the photo sharing group can obtain the address information of the second terminal in the sharing group.

The first terminal in the photo sharing group can obtain the address information of the second terminal in the sharing group. A manner of obtaining, by the first terminal, the address information of the second terminal in the photo sharing group may be: After joining the photo sharing group, the second terminal directly sends the address information of the second terminal to the first terminal; or after the second terminal joins the photo sharing group, the first terminal sends a request of obtaining the address information of the second terminal to the second terminal, and the second terminal sends the address information of the second terminal to the first terminal, which is not specifically limited herein.

1602: The first terminal determines a directory of a to-be-shared photo of the first terminal.

The first terminal has a to-be-shared photo, and may determine the directory of the to-be-shared photo of the first terminal.

1603: The first terminal performs image analysis on each photo in the photo directory to generate multiple photo sub-directories, places photos having a same facial feature in one photo sub-directory, and generates one associated reference facial picture for each photo sub-directory.

After determining the directory of the to-be-shared photo of the first terminal, the first terminal performs image analysis on each photo in the photo directory to generate multiple photo sub-directories, places photos having a same facial feature in one photo sub-directory, and generates one associated reference facial picture for each photo sub-directory. For example, the first terminal may perform facial recognition on each photo in the photo directory, generate multiple photo sub-directories of different faces, and place photos having a same facial feature in one photo sub-directory. When multiple faces are recognized on a photo, the photo may be placed in multiple corresponding photo sub-directories.

When the photo is a photo on which no facial image can be recognized, for example, a landscape photo, the first terminal may directly collect the photo and generate a photo sub-directory, which is not limited herein.

1604: The first terminal sends the associated reference facial pictures to the second terminal, so that the second terminal selects an associated reference facial picture corresponding to the second terminal, and returns associated reference facial picture selection information to the first terminal.

In this embodiment, the first terminal sends the generated associated reference facial picture corresponding to each photo sub-directory to the second terminal according to the address information of the second terminal. The second terminal selects the associated reference facial picture corresponding to the second terminal, and then, the second terminal returns the associated reference facial picture selection information to the first terminal.

In this embodiment, when there is only one second terminal, the second terminal selects an associated reference facial picture corresponding to the second terminal, and returns associated reference facial picture selection information to the first terminal; and when there are multiple second terminals, the first terminal separately sends associated reference facial pictures to multiple second terminals, and each of the multiple second terminals selects an associated reference facial picture corresponding to the second terminal, and returns associated reference facial picture selection information to the first terminal.

1605: The first terminal receives the associated reference facial picture selection information returned by the second terminal.

1606: The first terminal determines, according to the associated reference facial picture selection information, a photo sub-directory corresponding to the second terminal.

The first terminal may determine, according to the associated reference facial picture selection information, the photo sub-directory corresponding to the second terminal.

When there are multiple second terminals, the first terminal respectively receives associated reference facial picture selection information returned by the multiple second terminals, and determines photo sub-directories corresponding to the multiple second terminals.

1607: The first terminal sends a photo in the photo sub-directory corresponding to the second terminal to the second terminal.

Because the first terminal obtains the address information of the second terminal, the first terminal may send the photo in the photo sub-directory corresponding to the second terminal to the second terminal according to the address information of the second terminal.

When there is one second terminal, the first terminal sends a photo in a photo sub-directory corresponding to the second terminal to the second terminal; and when there are multiple second terminals, the first terminal sends a photo sub-directory corresponding to each second terminal to the corresponding terminal.

In this embodiment, when a photo sub-directory does not correspond to any one of the second terminals, the first terminal may send a photo in the photo sub-directory to the second terminal. When there is one second terminal, the first terminal sends the photo in the photo sub-directory to the terminal; and when there are multiple second terminals, the first terminal separately sends the photo in the photo sub-directory to the multiple second terminals, which is not limited herein.

In this embodiment, a terminal performs image analysis on a to-be-shared photo of the terminal to generate multiple photo sub-directories, and sends associated reference facial pictures to a second terminal, so that the second terminal selects an associated reference facial picture corresponding to the second terminal and returns associated reference facial picture selection information to the first terminal. The first terminal determines, according to the associated reference facial picture selection information, a photo sub-directory corresponding to the second terminal, and delivers the photo sub-directory to the second terminal. Because a first terminal in a photo sharing group may automatically perform image analysis on a to-be-shared photo in the sharing group and intelligently distribute the photo to a corresponding terminal, each terminal can obtain a photo required by the terminal, so that photos can be intelligently distributed, which is simple, convenient, and efficient.

Figure 17:
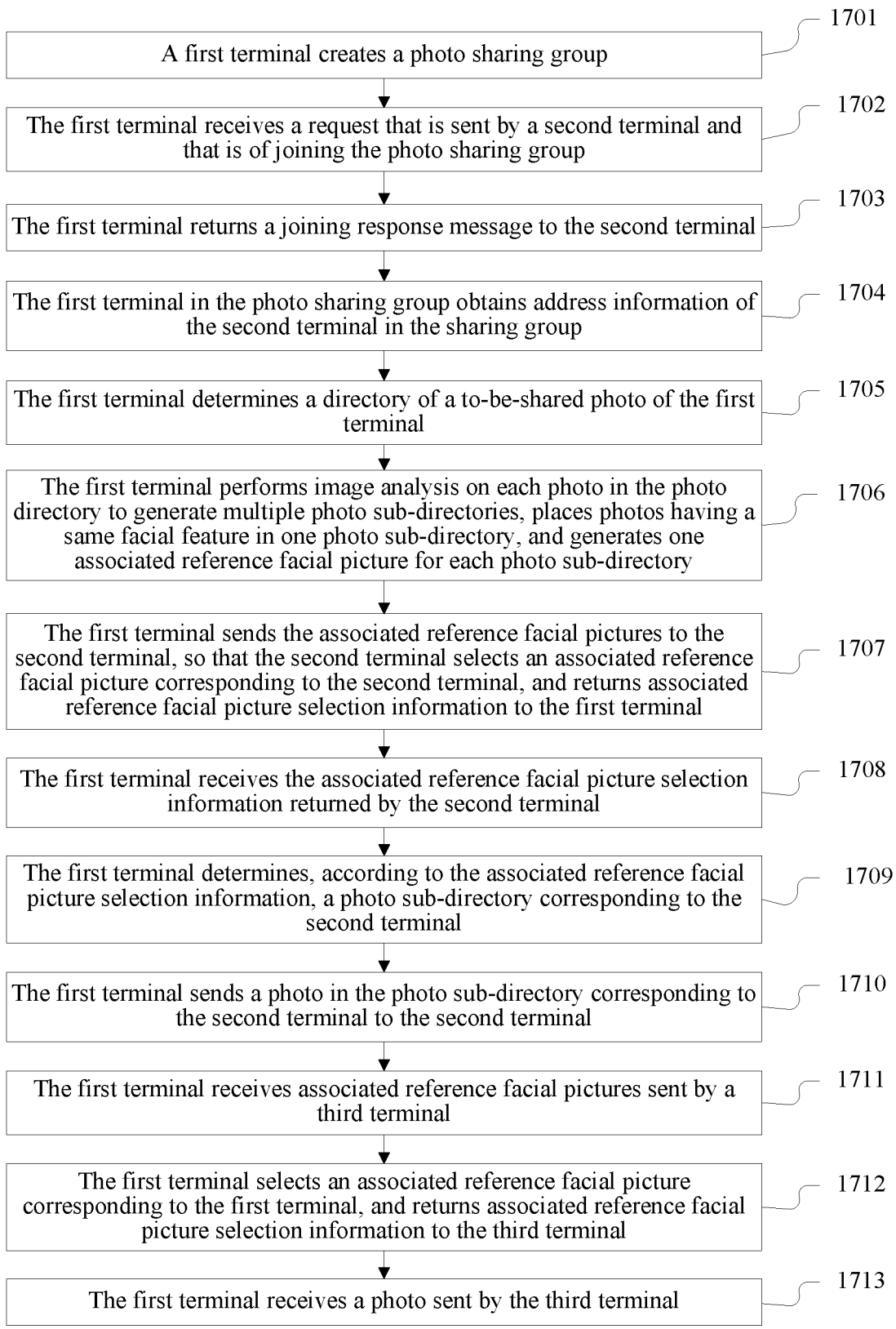
FIG. 17 is a schematic diagram of another embodiment of a photo distribution method according to an embodiment of the present disclosure.

In the embodiment shown in FIG. 16, in addition to the first terminal, another terminal also shares a photo. The following gives a description by using a specific embodiment. Referring to FIG. 17, another embodiment of a photo distribution method according to an embodiment of the present disclosure includes the following steps

1701: A first terminal creates a photo sharing group.

The first terminal may be a terminal of any one of people going traveling. The first terminal creates the photo sharing group. Distinguishing information such as a name or a group avatar may be set for the photo sharing group. The photo sharing group may be presented on a network according to location information of the first terminal, so that another terminal obtains the photo sharing group by means of searching on the network or by searching for a nearby photo sharing group, which is not specifically limited herein.

In this embodiment, when creating the photo sharing group, the first terminal may further establish a Wi-Fi hotspot, so that after joining the photo sharing group, another terminal connects to the Wi-Fi hotspot, to form a local area network.

It should be noted that, when creating the photo sharing group, the first terminal creates a temporary buffer at the same time, to save information in the photo sharing group, for example, user portrait information and an IP address of a terminal in the photo sharing group, which is not limited herein.

1702: The first terminal receives a request that is sent by a second terminal and that is of joining the photo sharing group.

After the first terminal creates the photo sharing group, another terminal needing to share a photo or the second terminal needing to obtain a photo sends a request of joining the photo sharing group to the first terminal. A manner of sending, by the second terminal, the request may be: The second terminal scans a two-dimensional barcode, generated by the first terminal, of the photo sharing group, and after scanning the two-dimensional barcode, the second terminal sends the request of joining the photo sharing group to the first terminal; or in an actual application, the second terminal obtains the photo sharing group by means of searching on the network according to information such as the name or the group avatar of the photo sharing group, and clicks to join the photo sharing group, that is, the second terminal sends the request of joining the photo sharing group to the first terminal; or the second terminal searches for a nearby photo sharing group according to a positioning apparatus in the terminal, and after finding the photo group, clicks to join the photo sharing group, that is, the second terminal sends the request of joining the photo sharing group to the first terminal. A specific manner of sending, by the second terminal, the request of joining the photo sharing group to the first terminal is not specifically limited.

It should be noted that, the second terminal may be one or more terminals in the photo sharing group, which is not specifically limited herein.

1703: The first terminal returns a joining response message to the second terminal.

After receiving the request that is sent by the second terminal and that is of joining the photo sharing group, the first terminal returns the joining response message to the second terminal, where the response message includes address information of the first terminal. In this case, it indicates that the first terminal already agrees that the second terminal joins the photo sharing group. In an actual application, to avoid that an irrelevant terminal joins the photo sharing group, the response message may be joining rejection information. The first terminal judges the received request of joining the photo sharing group, to determine whether the second terminal is a terminal sharing a photo; if yes, the first terminal returns a joining agreement response message; and if not, the first terminal returns a joining rejection response message, which is not limed herein. If there are multiple second terminals, the first terminal separately sends the response message including the address information of the first terminal to the multiple second terminals.

If the first terminal establishes a Wi-Fi hotspot when creating the photo sharing group in step 1701, after receiving the response message sent by the first terminal, the second terminal may connect to the Wi-Fi hotspot, to form a local area network with the first terminal.

It should be noted that, step 1701 to step 1703 describe a process in which the first terminal creates the photo sharing group and each terminal joins the photo group. The photo sharing group may be created by another terminal, and the first terminal sends a request of joining the photo sharing group to the terminal creating the photo sharing group. After receiving the request, the terminal creating the photo sharing group returns a joining response message, and the first terminal joins the photo sharing group. Manners of sending the request and returning the joining response are similar to step 1702 and step 1703, and details are not described herein again.

1704: The first terminal in the photo sharing group obtains address information of the second terminal in the sharing group.

When friends or colleagues go traveling, they separately take many photos by using terminals. When people want to obtain respective photos, they join a same created photo sharing group, the terminals joining the photo sharing group can send information to and receive information from each other, and the first terminal in the photo sharing group can obtain the address information of the second terminal in the sharing group.

The first terminal in the photo sharing group can obtain the address information of the second terminal in the sharing group. A manner of obtaining, by the first terminal, the address information of the second terminal in the photo sharing group may be: After joining the photo sharing group, the second terminal directly sends the address information of the second terminal to the first terminal; or after the second terminal joins the photo sharing group, the first terminal sends a request of obtaining the address information of the second terminal to the second terminal, and the second terminal sends the address information of the second terminal to the first terminal, which is not specifically limited herein.

1705: The first terminal determines a directory of a to-be-shared photo of the first terminal.

The first terminal has a to-be-shared photo, and may determine the directory of the to-be-shared photo of the first terminal.

1706: The first terminal performs image analysis on each photo in the photo directory to generate multiple photo sub-directories, places photos having a same facial feature in one photo sub-directory, and generates one associated reference facial picture for each photo sub-directory.

After determining the directory of the to-be-shared photo of the first terminal, the first terminal performs image analysis on each photo in the photo directory to generate multiple photo sub-directories, places photos having a same facial feature in one photo sub-directory, and generates one associated reference facial picture for each photo sub-directory. For example, the first terminal may perform facial recognition on each photo in the photo directory, generate multiple photo sub-directories of different faces, and place photos having a same facial feature in one photo sub-directory. When multiple faces are recognized on a photo, the photo may be placed in multiple corresponding photo sub-directories.

When the photo is a photo on which no facial image can be recognized, for example, a landscape photo, the first terminal may directly collect the photo and generate a photo sub-directory, which is not limited herein.

1707: The first terminal sends the associated reference facial pictures to the second terminal, so that the second terminal selects an associated reference facial picture corresponding to the second terminal, and returns associated reference facial picture selection information to the first terminal.

In this embodiment, the first terminal sends the generated associated reference facial picture corresponding to each photo sub-directory to the second terminal according to the address information of the second terminal. The second terminal selects the associated reference facial picture corresponding to the second terminal, and then, the second terminal returns the associated reference facial picture selection information to the first terminal.

In this embodiment, when there is only one second terminal, the second terminal selects an associated reference facial picture corresponding to the second terminal, and returns associated reference facial picture selection information to the first terminal; and when there are multiple second terminals, the first terminal separately sends the associated reference facial pictures to multiple second terminals, and each of the multiple second terminals selects an associated reference facial picture corresponding to the second terminal, and returns associated reference facial picture selection information to the first terminal.

1708: The first terminal receives the associated reference facial picture selection information returned by the second terminal.

1709: The first terminal determines, according to the associated reference facial picture selection information, a photo sub-directory corresponding to the second terminal.

The first terminal may determine, according to the associated reference facial picture selection information, the photo sub-directory corresponding to the second terminal.

When there are multiple second terminals, the first terminal respectively receives associated reference facial picture selection information returned by the multiple second terminals, and determines photo sub-directories corresponding to the multiple second terminals.

1710: The first terminal sends a photo in the photo sub-directory corresponding to the second terminal to the second terminal.

Because the first terminal obtains the address information of the second terminal, the first terminal may send the photo in the photo sub-directory corresponding to the second terminal to the second terminal according to the address information of the second terminal.

When there is one second terminal, the first terminal sends a photo in a photo sub-directory corresponding to the second terminal to the second terminal; and when there are multiple second terminals, the first terminal sends a photo in a photo sub-directory corresponding to each second terminal to the corresponding terminal.

In this embodiment, when a photo sub-directory does not correspond to any one of the second terminals, the first terminal may send a photo in the photo sub-directory to the second terminal. When there is one second terminal, the first terminal sends the photo in the photo sub-directory to the terminal; and when there are multiple second terminals, the first terminal separately sends the photo in the photo sub-directory to the multiple second terminals, which is not limited herein.

1711: The first terminal receives associated reference facial pictures sent by a third terminal.

In this embodiment, the third terminal also shares a photo. The third terminal determines a directory of a to-be-shared photo of the third terminal, performs image analysis on each photo in the photo directory to generate multiple photo sub-directories, places photos having a same facial feature in one photo sub-directory, and generates one associated reference facial picture for each photo sub-directory. The third terminal sends the generated associated reference facial photos to the first terminal, so that the first terminal selects an associated reference facial photo corresponding to the first terminal.

In this embodiment, there may be one third terminal, or multiple third terminals, which is not limited herein.

1712: The first terminal selects an associated reference facial picture corresponding to the first terminal, and returns associated reference facial picture selection information to the third terminal.

After receiving the associated reference facial pictures sent by the third terminal, the first terminal selects the associated reference facial picture corresponding to the first terminal, and returns the associated reference facial picture selection information to the third terminal.

The third terminal determines, according to the received associated reference facial picture selection information sent by the first terminal, a photo sub-directory corresponding to the first terminal. The third terminal sends a photo in the photo sub-directory corresponding to the first terminal to the first terminal.

1713: The first terminal receives a photo sent by the third terminal.

It should be noted that, in this embodiment, step 1711 to step 1713 and steps before step 1711 are two independent processes, and it is not limited that step 1711 to step 1713 are performed after step 1710.

In this embodiment, a terminal performs image analysis on a to-be-shared photo of the terminal to generate multiple photo sub-directories, and sends associated reference facial pictures to a second terminal, so that the second terminal selects an associated reference facial picture corresponding to the second terminal and returns associated reference facial picture selection information to the first terminal. The first terminal determines, according to the associated reference facial picture selection information, a photo sub-directory corresponding to the second terminal, and delivers the photo sub-directory to the second terminal. Because a first terminal in a photo sharing group may automatically perform image analysis on a to-be-shared photo in the sharing group and intelligently distribute the photo to a corresponding terminal, each terminal can obtain a photo required by the terminal, so that photos can be intelligently distributed, which is simple, convenient, and efficient.

Second, a specific implementation process in which in addition to the first terminal, the third terminal also shares a photo is described, so that when multiple terminals share photos, intelligent photo distribution can be implemented.

Figure 18:
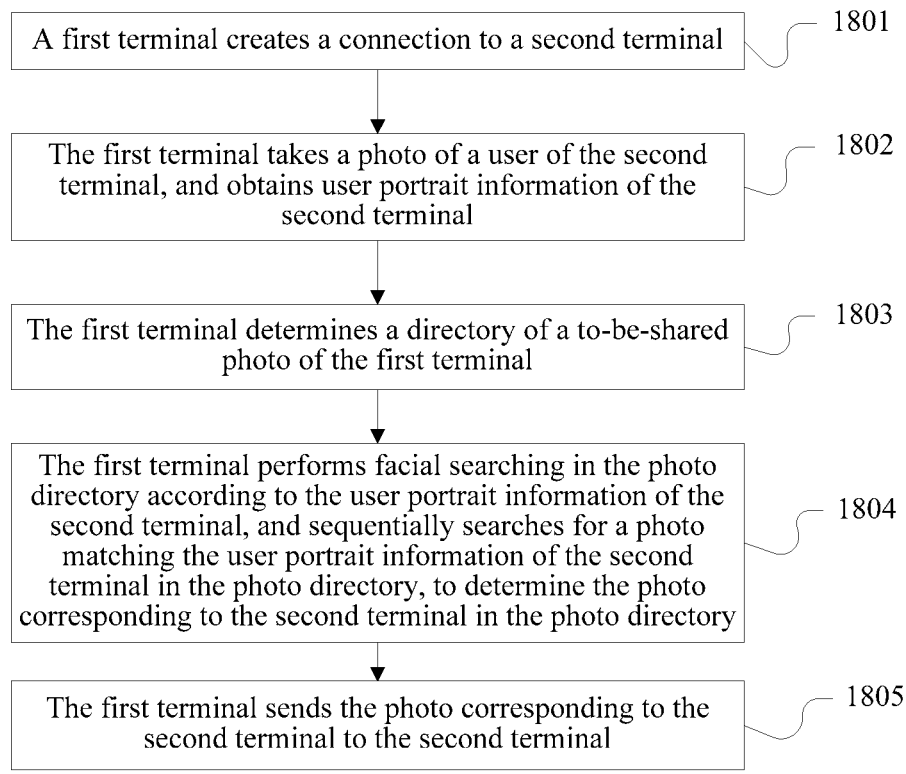
FIG. 18 is a schematic diagram of another embodiment of a photo distribution method according to an embodiment of the present disclosure.

The photo distribution method in the present disclosure may also be: Two terminals directly create a connection; after taking a photo of the other user, a first terminal performs facial searching on a to-be-shared photo of the first terminal, searches for a photo matching user portrait information of a second terminal, determines a photo corresponding to the second terminal in a photo directory, and sends the photo corresponding to the second terminal to the second terminal. The following gives a detailed description by using a specific embodiment. Referring to FIG. 18, another embodiment of a photo distribution method according to an embodiment of the present disclosure includes the following steps

1801: A first terminal creates a connection to a second terminal.

In this embodiment, the first terminal creates a connection to the second terminal in many manners. The first terminal may establish a Wi-Fi connection or a Bluetooth connection by means of NFC touching, or the first terminal may establish a Wi-Fi connection or a Bluetooth connection by means of an acoustic wave, where the acoustic wave may be an ultra-acoustic wave having a frequency of over 20000 HZ, or may be an acoustic wave having a frequency of below 20000 HZ, which is not limited herein.

1802: The first terminal takes a photo of a user of the second terminal, and obtains user portrait information of the second terminal.

The first terminal may directly take the photo of the user of the second terminal, and obtain the user portrait information of the second terminal.

1803: The first terminal determines a directory of a to-be-shared photo of the first terminal.

1804: The first terminal performs facial searching in the photo directory according to the user portrait information of the second terminal, and sequentially searches for a photo matching the user portrait information of the second terminal in the photo directory, to determine the photo corresponding to the second terminal in the photo directory.

The first terminal performs facial searching in the photo directory according to the user portrait information of the second terminal, and sequentially searches for a photo on which a face matching the user portrait information can be recognized in the photo directory, that is, sequentially searches for the photo matching the user portrait information of the second terminal in the photo directory. After the searching, the first terminal may determine the photo corresponding to the second terminal in the photo directory.

1805: The first terminal sends the photo corresponding to the second terminal to the second terminal.

When there is one second terminal, the first terminal sends a photo corresponding to the second terminal to the second terminal; and when there are multiple second terminals, the first terminal sends a photo corresponding to each second terminal to the corresponding terminal.

In this embodiment, the first terminal may further send a photo that does not correspond to the second terminal in the to-be-shared photo to the second terminal, which is not limited herein.

Figure 19:
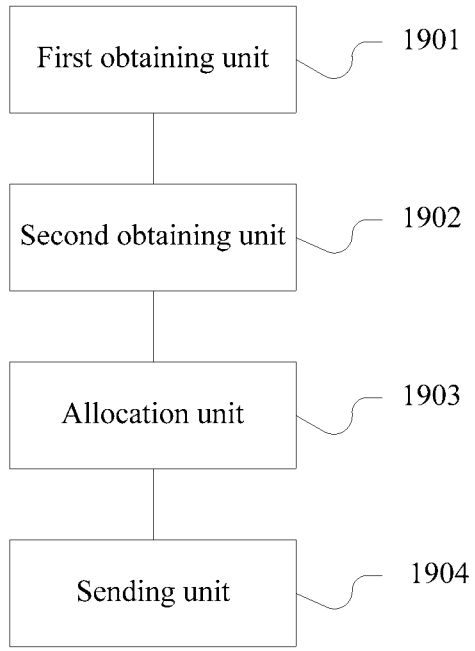
FIG. 19 is a schematic diagram of an embodiment of a terminal according to an embodiment of the present disclosure.

The following describes terminal embodiments in the embodiments of the present disclosure. Referring to FIG. 19, an embodiment of a terminal provided in an embodiment of the present disclosure includes:

a first obtaining unit 1901, configured to obtain user portrait information and address information of a second terminal in a same photo sharing group of the terminal;

a second obtaining unit 1902, configured to obtain first index information that is created by a sharing terminal and that is of a to-be-shared photo, where the sharing terminal includes at least one of the terminal or a third terminal in the sharing group;

an allocation unit 1903, configured to: segment the first index information obtained by the second obtaining unit 1902 into N pieces of second index information, and respectively allocate the N pieces of second index information to N processing terminals, where the processing terminals include a fourth terminal in the sharing group or the fourth terminal and the terminal, and N≥2; and a sending unit 1904, configured to send the user portrait information and the address information of the second terminal that are obtained by the first obtaining unit 1901 to the processing terminals, so that the processing terminals perform facial recognition on the corresponding to-be-shared photo in the second index information according to the second index information and the user portrait information of the second terminal, to determine a photo matching the user portrait information of the second terminal, and send the photo to the second terminal.

In this embodiment, after the first obtaining unit 1901 and the second obtaining unit 1902 respectively obtain user portrait information and address information of a second terminal and first index information that is created by a sharing terminal, the allocation unit 1903 segments and allocates the first index information to processing terminals, and the processing terminals perform facial recognition on a photo needing to be shared by the sharing terminal, determine a second terminal corresponding to the to-be-shared photo, and delivers the photo to the second terminal. Because a terminal joining a photo sharing group may automatically perform image analysis on a to-be-shared photo in the sharing group and intelligently distribute the photo to a corresponding terminal, each terminal can obtain a photo required by the terminal, so that photos can be intelligently distributed, which is simple, fast, and efficient.

Figure 20:
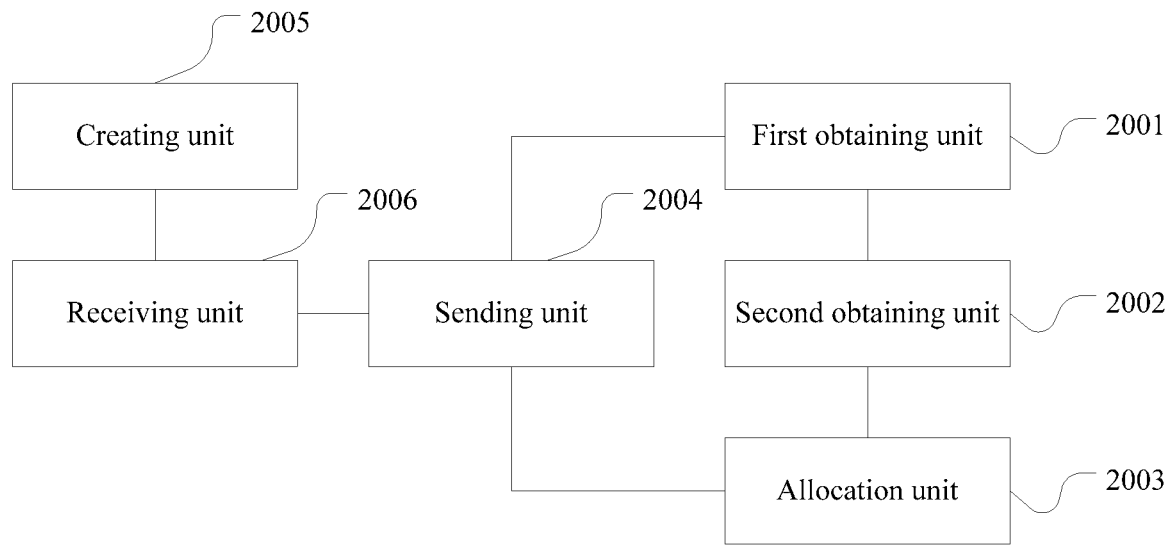
FIG. 20 is a schematic diagram of another embodiment of a terminal according to an embodiment of the present disclosure.

Referring to FIG. 20, another embodiment of a terminal provided in an embodiment of the present disclosure includes:

a first obtaining unit 2001, configured to obtain user portrait information and address information of a second terminal in a same photo sharing group of the terminal;

a second obtaining unit 2002, configured to obtain first index information that is created by a sharing terminal and that is of a to-be-shared photo, where the sharing terminal includes at least one of the terminal or a third terminal in the sharing group;

an allocation unit 2003, configured to: segment the first index information obtained by the second obtaining unit 2002 into N pieces of second index information, and respectively allocate the N pieces of second index information to N processing terminals, where the processing terminals include a fourth terminal in the sharing group or the fourth terminal and the terminal, and N≥2; and a sending unit 2004, configured to send the user portrait information and the address information of the second terminal that are obtained by the first obtaining unit 2001 to the processing terminals, so that the processing terminals perform facial recognition on the corresponding to-be-shared photo in the second index information according to the second index information and the user portrait information of the second terminal, to determine a photo matching the user portrait information of the second terminal, and send the photo to the second terminal.

The terminal provided in this embodiment may further include:

a creating unit 2005, configured to: before the first obtaining unit 2001 obtains the user portrait information and the address information of the second terminal in the sharing group, create the photo sharing group; and a receiving unit 2006, configured to receive a request that is sent by the second terminal and that is of joining the photo sharing group, where the sending unit 2004 is further configured to return a joining response message to the second terminal, where the response message includes address information of the terminal.

In some embodiments of the present disclosure, the terminal may further include:

an establishment unit, configured to: when the terminal creates the photo sharing group, establish a Wi-Fi hotspot, so that after receiving the response message, the second terminal connects to the Wi-Fi hotspot.

In some embodiments of the present disclosure, the second obtaining unit 2002 may be specifically configured to: when the sharing terminal includes the terminal, determine a directory of a to-be-shared photo of the terminal, create third index information according to the photo directory, and obtain the third index information, where the third index information includes photo information and address information of the first terminal, and the photo information includes a quantity of to-shared-photos, an ID of each photo, and a path of each photo.

In some embodiments of the present disclosure, the second obtaining unit 2002 is specifically configured to obtain fourth index information created by the third terminal in the sharing group, where the fourth index information includes photo information and address information of the third terminal, and the photo information includes a quantity of to-be-shared photos, an ID of each photo, and a path of each photo.

In some embodiments of the present disclosure, the allocation unit 2003 may be specifically configured to: segment the first index information into N pieces of second index information equally according to the quantity of the to-be-shared photos, and respectively allocate the N pieces of second index information to the N processing terminals.

In some embodiments of the present disclosure, the allocation unit 2003 may be specifically configured to: respectively receive terminal processing capability information sent by the processing terminals, segment the first index information into N pieces of second index information according to the quantity of the photos and the terminal processing capability information of the N processing terminals, and respectively allocate the N pieces of second index information to the N processing terminals.

In some embodiments of the present disclosure, the terminal may further include:

a determining unit, configured to: when the processing terminals include the terminal and the fourth terminal, perform facial recognition on the corresponding photo in the second index information according to the second index information and the user portrait information of the second terminal, to determine the photo matching the user portrait information of the second terminal, where the sending unit 2004 is further configured to send the photo matching the user portrait information of the second terminal to the second terminal according to the address information of the second terminal.

The determining unit is specifically configured to: obtain a task photo copy from the sharing terminal according to the second index information, and perform facial recognition on each task photo copy according to the user portrait information of the second terminal, to determine a photo matching the user portrait information of the second terminal.

In some embodiments of the present disclosure, the sending unit 2004 may be further configured to send a photo that does not match the user portrait information of the second terminal to the second terminal.

Based on the embodiment shown in FIG. 19, in this embodiment, the terminal further includes the creating unit 2005, the receiving unit 2006, and the sending unit 2004, where the sending unit 2004 is further configured to return a joining response message to the second terminal, where the response message includes the address information of the terminal. Therefore, the structure of the terminal is more flexible.

Figure 21:
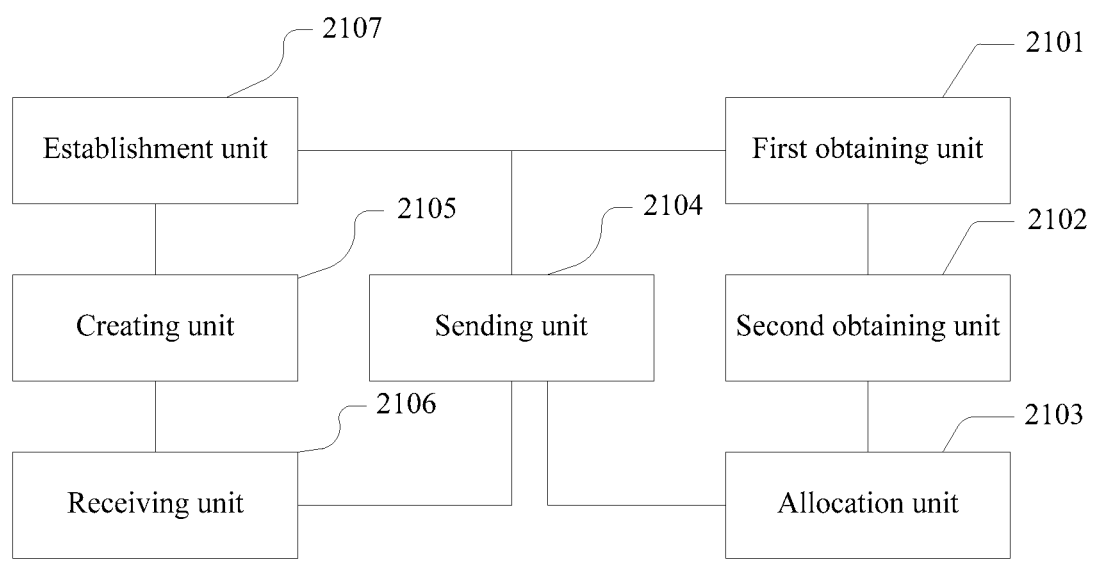
FIG. 21 is a schematic diagram of another embodiment of a terminal according to an embodiment of the present disclosure.

Referring to FIG. 21, another embodiment of a terminal provided in an embodiment of the present disclosure includes:

a first obtaining unit 2101, configured to obtain user portrait information and address information of a second terminal in a same photo sharing group of the terminal;

a second obtaining unit 2102, configured to obtain first index information that is created by a sharing terminal and that is of a to-be-shared photo, where the sharing terminal includes at least one of the terminal or a third terminal in the sharing group;

an allocation unit 2103, configured to: segment the first index information obtained by the second obtaining unit 2102 into N pieces of second index information, and respectively allocate the N pieces of second index information to N processing terminals, where the processing terminals include a fourth terminal in the sharing group or the fourth terminal and the terminal, and N≥2; and a sending unit 2104, configured to send the user portrait information and the address information of the second terminal that are obtained by the first obtaining unit 2101 to the processing terminals, so that the processing terminals perform facial recognition on the corresponding to-be-shared photo in the second index information according to the second index information and the user portrait information of the second terminal, to determine a photo matching the user portrait information of the second terminal, and send the photo to the second terminal.

The terminal provided in this embodiment may further include:

a creating unit 2105, configured to: before the first obtaining unit obtains the user portrait information and the address information of the second terminal in the sharing group, create the photo sharing group; and a receiving unit 2106, configured to receive a request that is sent by the second terminal and that is of joining the photo sharing group, where the sending unit 2104 is further configured to return a joining response message to the second terminal, where the response message includes address information of the terminal.

In some embodiments of the present disclosure, the terminal may further include: an establishment unit 2107, configured to: when the terminal creates the photo sharing group, establish a Wi-Fi hotspot, so that after receiving the response message, the second terminal connects to the Wi-Fi hotspot.

In some embodiments of the present disclosure, the second obtaining unit 2102 may be specifically configured to: when the sharing terminal includes the terminal, determine a directory of a to-be-shared photo of the terminal, create third index information according to the photo directory, and obtain the third index information, where the third index information includes photo information and address information of the first terminal, and the photo information includes a quantity of the to-shared-photos, an ID of each photo, and a path of each photo.

In some embodiments of the present disclosure, the second obtaining unit 2102 is specifically configured to obtain fourth index information created by the third terminal in the sharing group, where the fourth index information includes photo information and address information of the third terminal, and the photo information includes a quantity of to-be-shared photos, an ID of each photo, and a path of each photo.

In some embodiments of the present disclosure, the allocation unit 2103 may be specifically configured to: segment the first index information into N pieces of second index information equally according to the quantity of the to-be-shared photos, and respectively allocate the N pieces of second index information to the N processing terminals.

In some embodiments of the present disclosure, the allocation unit 2103 may be specifically configured to: respectively receive terminal processing capability information sent by the processing terminals, segment the first index information into N pieces of second index information according to the quantity of the photos and the terminal processing capability information of the N processing terminals, and respectively allocate the N pieces of second index information to the N processing terminals.

In some embodiments of the present disclosure, the terminal may further include:

a determining unit, configured to: when the processing terminals include the terminal and the fourth terminal, perform facial recognition on the corresponding photo in the second index information according to the second index information and the user portrait information of the second terminal, to determine the photo matching the user portrait information of the second terminal; and the sending unit 2104 is further configured to send the photo matching the user portrait information of the second terminal to the second terminal according to the address information of the second terminal.

The determining unit is specifically configured to: obtain a task photo copy from the sharing terminal according to the second index information, and perform facial recognition on each task photo copy according to the user portrait information of the second terminal, to determine a photo matching the user portrait information of the second terminal.

In some embodiments of the present disclosure, the sending unit 2104 may be further configured to send a photo that does not match the user portrait information of the second terminal to the second terminal.

Figure 22:
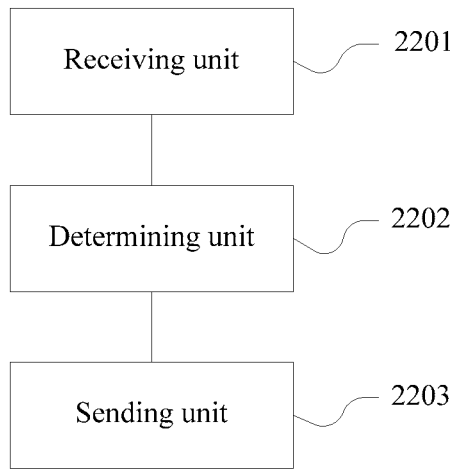
FIG. 22 is a schematic diagram of another embodiment of a terminal according to an embodiment of the present disclosure.

The following describes terminal embodiments in the embodiments of the present disclosure on another side (a fourth terminal side). Referring to FIG. 22, another embodiment of a terminal provided in an embodiment of the present disclosure includes:

a receiving unit 2201, configured to receive second index information sent by a first terminal in a same photo sharing group of the terminal, where the second index information is a part of a first index of a to-be-shared photo, where the receiving 2201 is further configured to receive user portrait information and address information of a second terminal that are sent by the first terminal;

a determining unit 2202, configured to perform facial recognition on the corresponding to-be-shared photo in the second index information according to the second index information and the user portrait information of the second terminal that are received by the receiving unit 2201, to determine a photo matching the user portrait information of the second terminal; and a sending unit 2203, configured to send the photo matching the user portrait information of the second terminal to the second terminal according to the address information of the second terminal.

In some embodiments of the present disclosure, the determining unit 2202 may be specifically configured to: obtain a task photo copy from the sharing terminal according to the second index information, and perform facial recognition on each task photo copy according to the user portrait information of the second terminal, to determine a photo matching the user portrait information of the second terminal.

In this embodiment, the determining unit 2202 performs facial recognition according to the second index information and the user portrait information and the address information of the second terminal that are received by the receiving unit 2201, so that photos can be intelligently distributed, which is simple, fast, and efficient.

Figure 23:
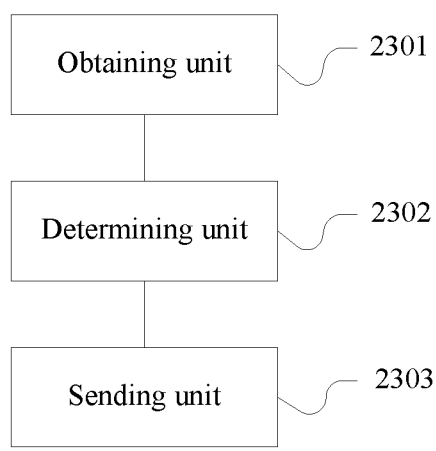
FIG. 23 is a schematic diagram of another embodiment of a terminal according to an embodiment of the present disclosure.

The following describes an embodiment of the first terminal in another scenario in the embodiments of the present disclosure. Referring to FIG. 23, another embodiment of a terminal provided in an embodiment of the present disclosure includes:

an obtaining unit 2301, configured to obtain user portrait information and address information of a second terminal in a same photo sharing group of the terminal;

a determining unit 2302, configured to perform image analysis on a to-be-shared photo of the terminal according to the user portrait information of the second terminal, to determine a photo corresponding to the second terminal in the to-be-shared photo; and a sending unit 2303, configured to send the to-be-shared photo to the corresponding second terminal according to the address information of the second terminal.

In this embodiment of the present disclosure, the determining unit 2302 may perform image analysis on a to-be-shared photo of the terminal, determines a second terminal corresponding to the to-be-shared photo, and sends the determined to-be-shared photo to the corresponding second terminal according to address information of the second terminal obtained by the obtaining unit 2301. Because a terminal joining a photo sharing group may automatically perform image analysis on a to-be-shared photo in the sharing group and intelligently distribute the photo to a corresponding terminal, each terminal can obtain a photo required by the terminal, so that photos can be intelligently distributed, which is simple, fast, and efficient.

Figure 24:
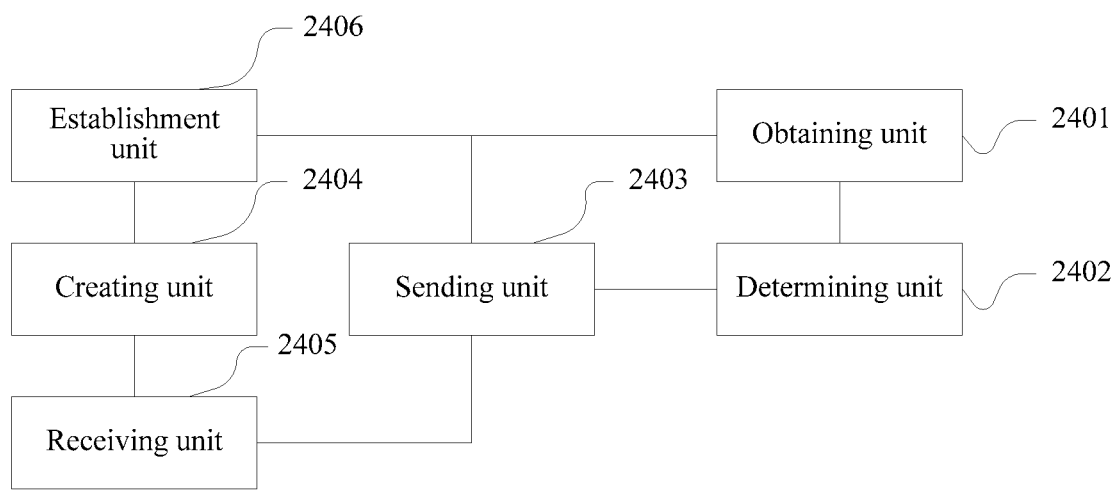
FIG. 24 is a schematic diagram of another embodiment of a terminal according to an embodiment of the present disclosure.

Referring to FIG. 24, another embodiment of a terminal provided in an embodiment of the present disclosure includes:

an obtaining unit 2401, configured to obtain user portrait information and address information of a second terminal in a same photo sharing group of the terminal;

a determining unit 2402, configured to perform image analysis on a to-be-shared photo of the terminal according to the user portrait information of the second terminal, to determine a photo corresponding to the second terminal in the to-be-shared photo; and a sending unit 2403, configured to send the to-be-shared photo to the corresponding second terminal according to the address information of the second terminal.

The terminal may further include:

a creating unit 2404, configured to: before the terminal in the photo sharing group obtains the user portrait information and the address information of the second terminal in the sharing group, create the photo sharing group; and a receiving unit 2405, configured to receive a request that is sent by the second terminal and that is of joining the photo sharing group, where the sending unit 2403 may be further configured to return a joining response message to the second terminal, where the response message includes address information of the first terminal.

Optionally, the terminal may further include:

an establishment unit 2406, configured to: when the terminal creates the photo sharing group, establish a Wi-Fi hotspot, so that after receiving the response message, the second terminal connects to the Wi-Fi hotspot.

In some embodiments of the present disclosure, the determining unit 2402 may be specifically configured to: determine a directory of a to-be-shared photo of the terminal; perform image analysis on each photo in the photo directory to generate multiple photo sub-directories; place photos having a same facial feature in one photo sub-directory; generate one associated reference facial picture for each photo sub-directory; perform, according to the user portrait information of the second terminal, image matching analysis on the associated reference facial pictures corresponding to the photo sub-directories; and determine that a photo sub-directory matching the user portrait information of the second terminal is a photo sub-directory corresponding to the second terminal; and the sending unit 2403 may be specifically configured to send a photo in the photo sub-directory corresponding to the second terminal to the second terminal according to the address information of the second terminal.

In some embodiments of the present disclosure, the determining unit 2402 may be specifically configured to: determine a directory of a to-be-shared photo of the terminal; perform facial searching in the photo directory according to the user portrait information of the second terminal; and sequentially search for a photo matching the user portrait information of the second terminal in the photo directory, to determine a photo corresponding to the second terminal in the photo directory.

In some embodiments of the present disclosure, the determining unit 2402 may be specifically configured to: create a photo directory corresponding to the second terminal; obtain a group of a photo taken by the terminal; perform image matching analysis on the photo in the photo group according to the user portrait information of the second terminal; sequentially determine whether the photo in the photo group matches the user portrait information corresponding to the second terminal; and if yes, place the photo matching the user portrait information corresponding to the second terminal in the photo group, in the photo directory corresponding to the second terminal; and the sending unit 2403 is specifically configured to send a photo in the photo directory corresponding to the second terminal to the second terminal according to the address information of the second terminal.

In some embodiments of the present disclosure, the determining unit 2402 may be specifically configured to: obtain a photo taken by the terminal; perform image matching analysis on the taken photo according to the user portrait information of the second terminal; determine whether the taken photo matches the user portrait information of the second terminal; and if yes, determine that the taken photo is a photo corresponding to the second terminal; and the sending unit 2403 is specifically configured to: when the taken photo matches the user portrait information of the second terminal, send the taken photo to the corresponding second terminal according to the address information of the second terminal.

In some embodiments of the present disclosure, the terminal may further receive a photo sent by another terminal;

the receiving unit 2405 is further configured to receive a request that is sent by a fourth terminal and that is of obtaining the user portrait information and the address information of the second terminal;

the sending unit 2403 is further configured to send the user portrait information and the address information of the second terminal to the fourth terminal; and the receiving unit 2405 is further configured to receive a photo sent by the fourth terminal.

In some embodiments of the present disclosure, the sending unit 2403 may be further configured to send a photo that does not correspond to the second terminal in the to-be-shared photo to the second terminal.

Figure 25:
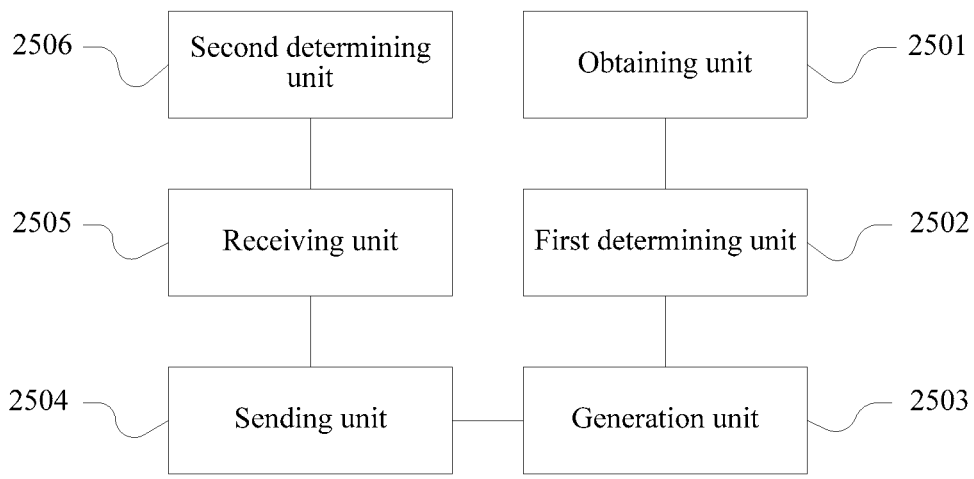
FIG. 25 is a schematic diagram of another embodiment of a terminal according to an embodiment of the present disclosure.

Referring to FIG. 25, another embodiment of a terminal provided in an embodiment of the present disclosure includes:

an obtaining unit 2501, configured to obtain address information of a second terminal in a same photo sharing group of the terminal;

a first determining unit 2502, configured to determine a directory of a to-be-shared photo of the terminal;

a generation unit 2503, configured to: perform image analysis on each photo in the photo directory to generate multiple photo sub-directories, place photos having a same facial feature in one photo sub-directory, and generate one associated reference facial picture for each photo sub-directory;

a sending unit 2504, configured to send the associated reference facial pictures to the second terminal, so that the second terminal selects an associated reference facial picture corresponding to the second terminal, and returns associated reference facial picture selection information to the first terminal;

a receiving unit 2505, configured to receive the associated reference facial picture selection information returned by the second terminal; and a second determining unit 2506, configured to determine, according to the associated reference facial picture selection information, a photo sub-directory corresponding to the second terminal, where the sending unit 2504 is further configured to send a photo in the photo sub-directory corresponding to the second terminal to the second terminal.

In this embodiment of the present disclosure, the determining unit 2502 may perform image analysis on a to-be-shared photo of the terminal, and generate multiple photo sub-directories; the sending unit 2504 sends an associated reference facial picture corresponding to each photo sub-directory to the second terminal, so that the second terminal selects a reference facial photo corresponding to the second terminal; and the sending unit 2504 may intelligently distribute a photo to the corresponding second terminal according to the reference facial photo selected by the second terminal, so that photos can be intelligently distributed, which is simple, fast, and efficient.

Figure 26:
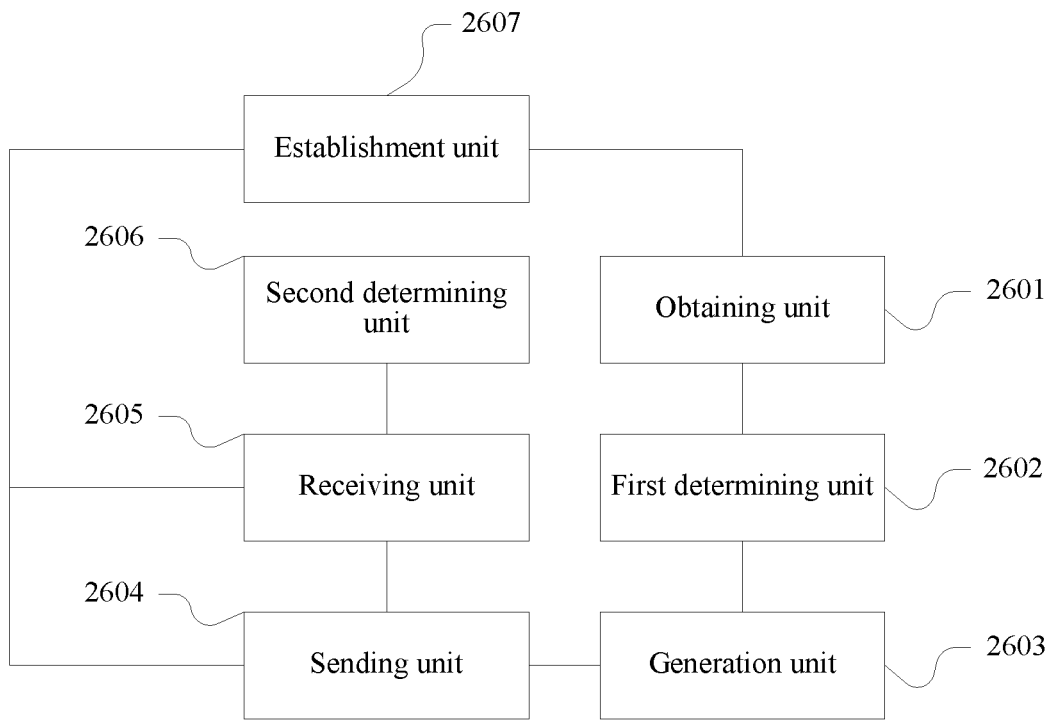
FIG. 26 is a schematic diagram of another embodiment of a terminal according to an embodiment of the present disclosure.

Referring to FIG. 26, another embodiment of a terminal provided in an embodiment of the present disclosure includes:

an obtaining unit 2601, configured to obtain address information of a second terminal in a same photo sharing group of the terminal;

a first determining unit 2602, configured to determine a directory of a to-be-shared photo of the terminal;

a generation unit 2603, configured to: perform image analysis on each photo in the photo directory to generate multiple photo sub-directories, place photos having a same facial feature in one photo sub-directory, and generate one associated reference facial picture for each photo sub-directory;

a sending unit 2604, configured to send the associated reference facial pictures to the second terminal, so that the second terminal selects an associated reference facial picture corresponding to the second terminal, and returns associated reference facial picture selection information to a first terminal;

a receiving unit 2605, configured to receive the associated reference facial picture selection information returned by the second terminal; and a second determining unit 2606, configured to determine, according to the associated reference facial picture selection information, a photo sub-directory corresponding to the second terminal, where the sending unit 2604 is further configured to send a photo in the photo sub-directory corresponding to the second terminal to the second terminal.

The terminal may further include:

a creating unit 2607, configured to create the photo sharing group, where the receiving unit 2605 is further configured to receive a request that is sent by the second terminal and that is of joining the photo sharing group.

In some embodiments of the present disclosure, the sending unit 2604 may be further configured to return a joining response message to the second terminal, where the response message includes address information of the first terminal;

the receiving unit 2605 may be further configured to receive associated reference facial pictures sent by a third terminal;

the sending unit 2604 may be further configured to: select an associated reference facial picture corresponding to the terminal, and return associated reference facial picture selection information to the third terminal; and the receiving unit 2605 may be further configured to receive a photo sent by the third terminal.

In some embodiments of the present disclosure, the sending unit 2604 may be further configured to send a photo that does not correspond to the second terminal in the to-be-shared photo to the second terminal.

In some embodiments of the present disclosure, the terminal may further include:

an establishment unit, configured to: when the creating unit creates the photo sharing group, establish a Wi-Fi hotspot, so that after receiving the response message, the second terminal connects to the Wi-Fi hotspot.

Figure 27:
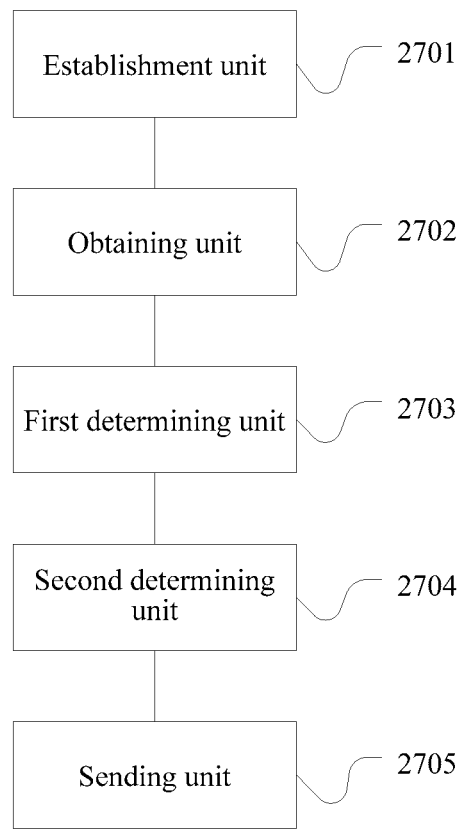
FIG. 27 is a schematic diagram of another embodiment of a terminal according to an embodiment of the present disclosure.

Referring to FIG. 27, another embodiment of a terminal provided in an embodiment of the present disclosure includes:

an establishment unit 2701, configured to create a connection to a second terminal;

an obtaining unit 2702, configured to: take a photo of a user of the second terminal and obtain user portrait information of the second terminal;

a first determining unit 2703, configured to determine a directory of a to-be-shared photo of the terminal;

a second determining unit 2704, configured to: perform facial searching in the photo directory according to the user portrait information of the second terminal, and sequentially search for a photo matching the user portrait information of the second terminal in the photo directory, to determine a photo corresponding to the second terminal in the photo directory; and a sending unit 2705, configured to send a photo corresponding to the second terminal to the second terminal.

The establishment unit 2701 may be further specifically configured to establish a Wi-Fi connection or a Bluetooth connection by means of NFC touching.

The establishment unit 2701 may be further specifically configured to establish a Wi-Fi connection or a Bluetooth connection by means of an acoustic wave.

The sending unit 2705 may be further configured to send a photo that does not correspond to the second terminal in the to-be-shared photo to the second terminal.

For the convenience of understanding, the following describes an internal operation process of the terminal in this embodiment by using a specific application scenario as an example:

the establishment unit 2701 creates a connection to a second terminal;

the obtaining unit 2702 takes a photo of a user of the second terminal and obtains user portrait information of the second terminal;

the first determining unit 2703 determines a directory of a to-be-shared photo of the terminal;

the second determining unit 2704 performs facial searching in the photo directory according to the user portrait information of the second terminal, and sequentially searches for a photo matching the user portrait information of the second terminal in the photo directory, to determine the photo corresponding to the second terminal in the photo directory; and the sending unit 2705 sends a photo corresponding to the second terminal to the second terminal.

When there is one second terminal, the first terminal sends a photo corresponding to the second terminal to the second terminal; and when there are multiple second terminals, the first terminal sends a photo corresponding to each second terminal to the corresponding terminal.

The establishment unit 2701 creates a connection to the second terminal, and may specifically establish a Wi-Fi connection or a Bluetooth connection by means of NFC touching.

The establishment unit 2701 creates a connection to the second terminal, and may specifically establish a Wi-Fi connection or a Bluetooth connection by means of an acoustic wave, where the "acoustic wave" may be an ultra-acoustic wave having a frequency of over 20000 HZ, or may be an acoustic wave having a frequency of below 20000 HZ.

The sending unit 2705 may further send a photo that does not correspond to the second terminal in the to-be-shared photo to the second terminal.

Figure 28:
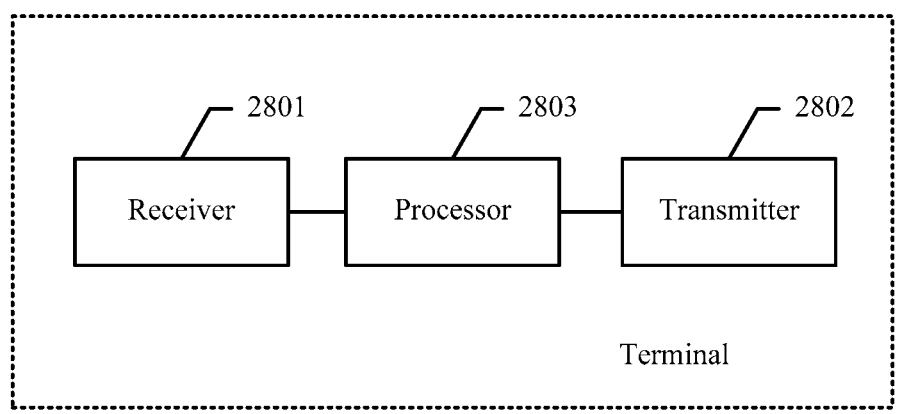
FIG. 28 is a schematic diagram of another embodiment of a terminal according to an embodiment of the present disclosure.

The following describes, from the perspective of hardware with reference to the embodiment shown in FIG. 21, a terminal provided in an embodiment of the present disclosure. Referring to FIG. 28, the terminal includes a receiver 2801, a transmitter 2802, and a processor 2803 (there may be one or more processors).

The receiver 2801 is configured to perform the following operation:

receiving user portrait information and address information of a second terminal in a same photo sharing group of the terminal;

the receiver 2801 is further configured to perform the following operation:

receiving first index information that is created by a sharing terminal and that is of a to-be-shared photo, where the sharing terminal includes at least one of the terminal or a third terminal in the sharing group;

the processor 2803 is configured to perform the following operation:

segmenting the first index information obtained by the receiver 2801 into N pieces of second index information, and respectively allocating the N pieces of second index information to N processing terminals, where the processing terminals include a fourth terminal in the sharing group or the fourth terminal and the terminal, and N≥2; and the transmitter 2802 is configured to perform the following operation:

sending the user portrait information and the address information of the second terminal that are received by the receiver 2801 to the processing terminals, so that the processing terminals perform facial recognition on the corresponding to-be-shared photo in the second index information according to the second index information and the user portrait information of the second terminal, to determine a photo matching the user portrait information of the second terminal, and send the photo to the second terminal.

The processor 2803 may be further configured to perform the following operation:

before the receiver 2801 receives the user portrait information and the address information of the second terminal in the sharing group, create the photo sharing group;

the receiver 2801 is further configured to perform the following operation:

receiving a request that is sent by the second terminal and that is of joining the photo sharing group; and the transmitter 2802 is further configured to perform the following operation:

returning a joining response message to the second terminal, where the response message includes address information of the terminal.

The processor 2803 may be further configured to perform the following operation:

when the terminal creates the photo sharing group, creating a Wi-Fi hotspot, so that after receiving the response message, the second terminal connects to the Wi-Fi hotspot.

The receiver 2801 may be further configured to perform the following operation:

before the transmitter 2802 sends the user portrait information and the address information of the second terminal to the processing terminals, receiving requests that are sent by the processing terminals and that are of obtaining the user portrait information and the address information of the second terminal.

The processor 2803 may be further configured to perform the following operation:

when the sharing terminal includes the terminal, determining a directory of a to-be-shared photo of the terminal, creating third index information according to the photo directory, and obtaining the third index information, where the third index information includes photo information and address information of the first terminal, and the photo information includes a quantity of to-shared-photos, an ID of each photo, and a path of each photo;

The receiver 2801 may be further configured to perform the following operation:

obtaining fourth index information created by the third terminal in the sharing group, where the fourth index information includes photo information and address information of the third terminal, and the photo information includes a quantity of to-be-shared photos, an ID of each photo, and a path of each photo.

The processor 2803 may be further configured to perform the following operation:

segmenting the first index information into N pieces of second index information equally according to a quantity of photos, and respectively allocating the N pieces of second index information to the N processing terminals.

The receiver 2801 may be further configured to perform the following operation:

receiving terminal processing capability information sent by the processing terminals.

The processor 2803 may be further configured to perform the following operation:

segmenting the first index information into N pieces of second index information equally according to a quantity of photos and the terminal processing capability information of the processing terminals that is received by the receiver 2801, and respectively allocating the N pieces of second index information to the N processing terminals.

The processor 2803 may be further configured to perform the following operation:

when the processing terminals include the terminal and the fourth terminal, performing facial recognition on the corresponding photo in the second index information according to the second index information and the user portrait information of the second terminal, to determine a photo matching the user portrait information of the second terminal.

The transmitter 2802 may be further configured to perform the following operation:

sending the photo matching the user portrait information of the second terminal to the second terminal according to the address information of the second terminal.

The processor 2803 may be further configured to perform the following operation:

obtaining a task photo copy from the sharing terminal according to the second index information, and performing facial recognition on each task photo copy according to the user portrait information of the second terminal, to determine a photo matching the user portrait information of the second terminal.

The transmitter 2802 may be further configured to perform the following operation:

sending a photo that does not match the user portrait information of the second terminal to the second terminal.

The terminal in all embodiments of the present disclosure may be various terminals, such as a mobile phone, a tablet computer, or an intelligent camera, which is not specifically limited herein. The address information may be IP address information or MAC address information, which is not limited herein.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for distributing photos, the method comprising:
    obtaining, by a first terminal in a photo sharing group, user portrait information and address information of a second terminal in the photo sharing group;
    obtaining, by the first terminal, first index information that is created by the sharing terminal and that is of a to-be-shared photo, wherein the sharing terminal comprises at least one of the first terminal or a third terminal in the photo sharing group;
    segmenting, by the first terminal, the first index information into N pieces of second index information, and respectively allocating the N pieces of second index information to N processing terminals, wherein the processing terminals comprise a fourth terminal in the photo sharing group, and N≥2; and
    sending, by the first terminal, the user portrait information and the address information of the second terminal to the processing terminals, so that the processing terminals perform facial recognition on the corresponding to-be-shared photo in the second index information according to the second index information and the user portrait information of the second terminal, to determine a photo matching the user portrait information of the second terminal, and send the photo to the second terminal.

2. The method according to claim 1, further comprising, before obtaining, by the first terminal in the photo sharing group, the user portrait information and address information of the second terminal in the photo sharing group:

creating, by the first terminal, the photo sharing group;

receiving, by the first terminal, a request that is sent by the second terminal and that is of joining the photo sharing group; and returning, by the first terminal, a joining response message to the second terminal, wherein the response message comprises address information of the first terminal.

3. The method according to claim 2, wherein the processing terminals further comprise the first terminal.

4. The method according to claim 1, wherein the sharing terminal comprises the first terminal, and wherein obtaining, by the first terminal, first index information that is created by the sharing terminal and that is of the to-be-shared photo comprises determining, by the first terminal, a directory of the to-be-shared photo of the first terminal, and creating third index information according to a photo directory, wherein the third index information comprises photo information and the address information of the first terminal, and the photo information comprises a quantity of the to-be-shared photos, an ID of each photo, and a path of each photo and obtaining, by the first terminal, the third index information.

5. The method according to claim 1, wherein the sharing terminal comprises the third terminal, and wherein obtaining, by the first terminal, first index information that is created by the sharing terminal and that is of the to-be-shared photo comprises obtaining, by the first terminal, fourth index information created by the third terminal in the photo sharing group, wherein the fourth index information comprises photo information and address information of the third terminal, and the photo information comprises a quantity of to-be-shared photos, an ID of each photo, and a path of each photo.

6. The method according to claim 4, wherein segmenting, by the first terminal, the first index information into N pieces of second index information, and respectively allocating the N pieces of second index information to N processing terminals comprises segmenting, by the first terminal, the first index information into N pieces of second index information equally according to a quantity of photos, and respectively allocating the N pieces of second index information to the N processing terminals.

7. The method according to claim 4, wherein segmenting, by the first terminal, the first index information into N pieces of second index information, and respectively allocating the N pieces of second index information to N processing terminals comprises:

separately receiving, by the first terminal, terminal processing capability information sent by the processing terminals; and segmenting, by the first terminal, the first index information into N pieces of second index information equally according to a quantity of photos and the terminal processing capability information of the processing terminals, and respectively allocating the N pieces of second index information to the N processing terminals.

8. The method according to claim 1, wherein the processing terminals comprise the first terminal and the fourth terminal, and wherein the processing terminals perform the facial recognition on the corresponding to-be-shared photo in the second index information according to the second index information and the user portrait information of the second terminal, to determine a photo matching the user portrait information of the second terminal, and send the photo to the second terminal comprises:

performing, by the first terminal, facial recognition on the corresponding photo in the second index information according to the second index information and the user portrait information of the second terminal, to determine the photo matching the user portrait information of the second terminal; and sending, by the first terminal, the photo matching the user portrait information of the second terminal to the second terminal according to the address information of the second terminal.

9. The method according to claim 8, wherein performing, by the first terminal, the facial recognition on the corresponding photo in the second index information according to the second index information and the user portrait information of the second terminal, to determine the photo matching the user portrait information of the second terminal comprises:

obtaining, by the first terminal, a task photo copy from the sharing terminal according to the second index information; and performing, by the first terminal, facial recognition on each task photo copy according to the user portrait information of the second terminal, to determine the photo matching the user portrait information of the second terminal.

10. The method according to claim 8, further comprising sending, by the first terminal, a photo that does not match the user portrait information of the second terminal to the second terminal.

11. A first terminal comprising:

a receiver configured to:

receive user portrait information and address information of a second terminal in a photo sharing group, wherein the photo sharing group comprises the first terminal; and receive first index information that is created by a sharing terminal and that is of a to-be-shared photo, wherein the sharing terminal comprises at least one of the first terminal or a third terminal in the photo sharing group;

at least one processor configured to segment the first index information into N pieces of second index information, and respectively allocating the N pieces of second index information to N processing terminals, wherein the processing terminals comprise a fourth terminal in the photo sharing group, and N≥2; and a transmitter configured to send the user portrait information and the address information of the second terminal to the processing terminals, so that the processing terminals perform facial recognition on the corresponding to-be-shared photo in the second index information according to the second index information and the user portrait information of the second terminal, to determine a photo matching the user portrait information of the second terminal, and send the photo to the second terminal.

12. The first terminal according to claim 11, wherein the at least one processor is further configured to create the photo sharing group, wherein the receiver is further configured to receive a request that is sent by the second terminal and that is of joining the photo sharing group, and wherein the transmitter is further configured to return a joining response message to the second terminal, wherein the response message comprises address information of the first terminal.

13. The first terminal according to claim 11, wherein the processing terminals further comprise the first terminal.

14. The first terminal according to claim 11, wherein the sharing terminal comprises the first terminal, and wherein the at least one processor is further configured to:
   determine a directory of the to-be-shared photo of the first terminal; and
   create third index information according to a photo directory, wherein the third index information comprises photo information and the address information of the first terminal, and the photo information comprises a quantity of the to-be-shared photos, an ID of each photo, and a path of each photo.

15. The first terminal according to claim 11, wherein the sharing terminal comprises the third terminal, and wherein the receiver is further configured to receive fourth index information created by the third terminal in the photo sharing group, wherein the fourth index information comprises photo information and address information of the third terminal, and the photo information comprises a quantity of to-be-shared photos, an ID of each photo, and a path of each photo.

16. The first terminal according to claim 14, wherein the at least one processor is further configured to:
   segment the first index information into N pieces of second index information equally according to a quantity of photos; and
   respectively allocate the N pieces of second index information to the N processing terminals.

17. The first terminal according to claim 14, wherein the at least one processor is further configured to:
   segment, by the first terminal, the first index information into N pieces of second index information equally according to a quantity of photos and terminal processing capability information of the processing terminals; and
   respectively allocate the N pieces of second index information to the N processing terminals.

18. The first terminal according to claim 13, wherein the at least one processor is further configured to perform facial recognition on the corresponding photo in the second index information according to the second index information and the user portrait information of the second terminal, to determine the photo matching the user portrait information of the second terminal, and wherein the transmitter is further configured to send the photo matching the user portrait information of the second terminal to the second terminal according to the address information of the second terminal.

19. The first terminal according to claim 18, wherein the receiver is further configured to receive a task photo copy from the sharing terminal according to the second index information, and wherein the at least one processor is further configured to perform facial recognition on each task photo copy according to the user portrait information of the second terminal, to determine the photo matching the user portrait information of the second terminal.

20. The first terminal according to claim 11, wherein the transmitter is further configured to send a photo that does not match the user portrait information of the second terminal to the second terminal.

* * * * *